US010367765B2

(12) United States Patent
Jung et al.

(10) Patent No.: US 10,367,765 B2
(45) Date of Patent: *Jul. 30, 2019

(54) USER TERMINAL AND METHOD OF DISPLAYING LOCK SCREEN THEREOF

(71) Applicant: SAMSUNG ELECTRONICS CO., LTD., Suwon-si, Gyeonggi-do (KR)

(72) Inventors: Ji-su Jung, Yongin-si (KR); Sunah Kim, Seongnam-si (KR); Jin-young Lee, Suwon-si (KR); Ga-hyun Joo, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/658,164

(22) Filed: Jul. 24, 2017

(65) Prior Publication Data

US 2017/0324687 A1    Nov. 9, 2017

Related U.S. Application Data

(63) Continuation of application No. 14/855,246, filed on Sep. 15, 2015, now Pat. No. 9,749,269, which is a
(Continued)

(30) Foreign Application Priority Data

Apr. 25, 2014    (KR) .................... 10-2014-0050177

(51) Int. Cl.
*H04L 12/58*    (2006.01)
*G06F 3/0482*    (2013.01)
(Continued)

(52) U.S. Cl.
CPC .......... *H04L 51/046* (2013.01); *G06F 3/0481* (2013.01); *G06F 3/0482* (2013.01);
(Continued)

(58) Field of Classification Search
CPC ....... H04L 12/58; H04L 51/10; H04L 51/046; G06F 21/31; G06F 3/0481; G06F 3/0482;
(Continued)

(56) References Cited

U.S. PATENT DOCUMENTS 7,894,833 B2    2/2011    Sohn et al.
8,630,623 B2 *    1/2014    Park .................. G06F 3/0488
                                                         455/411
(Continued)

FOREIGN PATENT DOCUMENTS

CN    101788880    7/2010
CN    103135967    6/2013
(Continued)

OTHER PUBLICATIONS

Office Action dated Mar. 2, 2018 in counterpart Chinese Patent Application No. 201580001433.1 and English-language translation.
(Continued)

*Primary Examiner* — Thanhnga B Truong
(74) *Attorney, Agent, or Firm* — Nixon & Vanderhye, P.C.

(57) ABSTRACT

An example user terminal device includes a display unit, including a display, configured to display a lock screen. The lock screen includes content representative information representing content included in a message that is provided by an acquaintance of a user of the user terminal device, and a first user interface element. A control unit, including a processor, is configured to, when a user input signal is received via the first user interface element, execute an application capable of reproducing the content and to reproduce the content.

7 Claims, 44 Drawing Sheets

Related U.S. Application Data continuation of application No. PCT/KR2015/004166, filed on Apr. 27, 2015.

(51) Int. Cl.
    *G06F 3/0484*     (2013.01)
    *G06F 21/31*     (2013.01)
    *G06Q 10/10*     (2012.01)
    *G06Q 50/00*     (2012.01)
    *G06F 3/0481*     (2013.01)
    *G06F 3/0488*     (2013.01)

(52) U.S. Cl.
    CPC ...... *G06F 3/04842* (2013.01); *G06F 3/04883* (2013.01); *G06F 3/04886* (2013.01); *G06F 21/31* (2013.01); *G06Q 10/10* (2013.01); *G06Q 50/01* (2013.01); *H04L 51/10* (2013.01); *G06F 2221/2149* (2013.01)

(58) Field of Classification Search
    CPC .. G06F 3/0484; G06F 3/0488; G06F 3/04842; G06F 3/04886; G06F 3/04883; G06F 9/44; G06Q 10/10; G06Q 50/01; G06Q 50/00; H04M 1/725; H04M 1/66; H04Q 7/20; H04W 40/00
    USPC ......... 726/19, 26, 27, 28; 719/328; 715/741, 715/808, 833, 835, 863; 345/173; 455/418, 550, 566
    See application file for complete search history.

(56) References Cited

U.S. PATENT DOCUMENTS

| | | | | |
|---|---|---|---|---|
| 8,776,095 B2* | 7/2014 | Huang | ................ | G06F 21/6209 715/741 |
| 8,982,098 B2 | 3/2015 | Kim et al. | | |
| 9,781,249 B2 | 10/2017 | Peng et al. | | |
| 2007/0281716 A1* | 12/2007 | Altman | ................... | H04L 51/20 455/466 |
| 2010/0146384 A1 | 6/2010 | Peev et al. | | |
| 2011/0294467 A1 | 12/2011 | Kim et al. | | |
| 2012/0084734 A1 | 4/2012 | Wilairat | | |
| 2012/0331548 A1 | 12/2012 | Tseng et al. | | |
| 2013/0069962 A1 | 3/2013 | Nealer et al. | | |
| 2014/0012654 A1 | 1/2014 | Stewart et al. | | |
| 2014/0019253 A1 | 1/2014 | Ricasata | | |
| 2014/0040035 A1 | 2/2014 | Cusack | | |
| 2014/0282047 A1* | 9/2014 | Lee | ....................... | G06F 3/0488 715/741 |
| 2015/0004939 A1* | 1/2015 | Higashibeppu | ......... | H04M 1/67 455/411 |
| 2015/0133199 A1* | 5/2015 | Lee | .................... | G06Q 30/0241 455/566 |

FOREIGN PATENT DOCUMENTS

| | | |
|---|---|---|
| CN | 103369101 | 10/2013 |
| KR | 10-2011-0129574 | 12/2011 |
| KR | 10-2013-0069151 | 6/2013 |
| KR | 10-2013-1294148 | 8/2013 |
| KR | 10-2013-0124854 | 11/2013 |
| WO | 2013/168885 | 11/2013 |

OTHER PUBLICATIONS

International Search Report dated Jun. 25, 2015 in counterpart PCT/KR2015/004166.
Extended European Search Report dated May 23, 2016 in counterpart European Patent Application No. 15778598.1.
Communication Pursuant to Article 94(3) EPC dated Jan. 27, 2017 in counterpart European Patent Application No. 15778598.1.
Summons to Attend Oral Proceedings dated Sep. 22, 2017 in counterpart European Patent Application No. 15778598.1.
Extended Search Report dated Oct. 11, 2018 in counterpart European Patent Application No. 18192285.7.
Decision to Refuse dated Jul. 3, 2018 in counterpart European Patent Application No. 15778598.1.

* cited by examiner

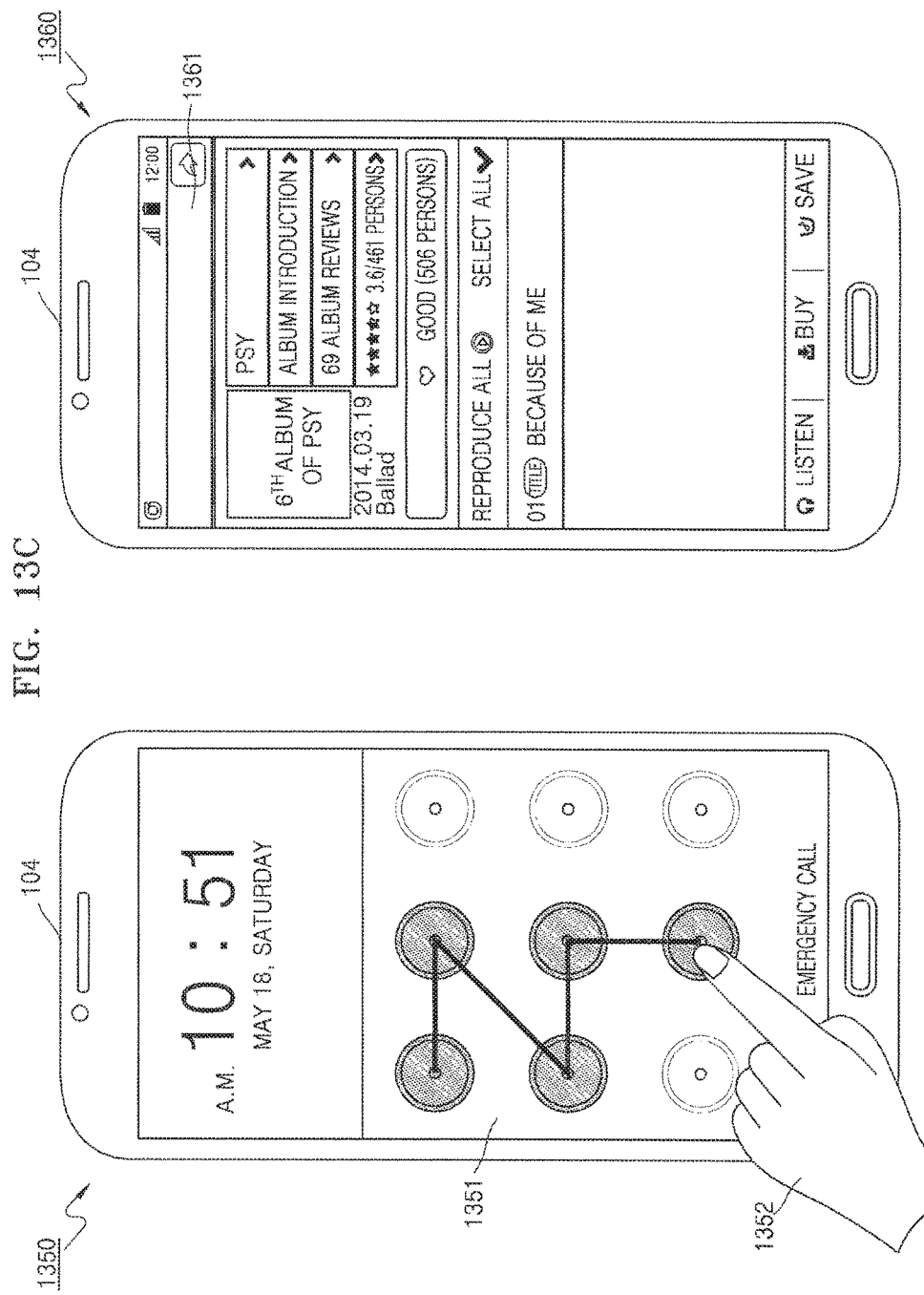

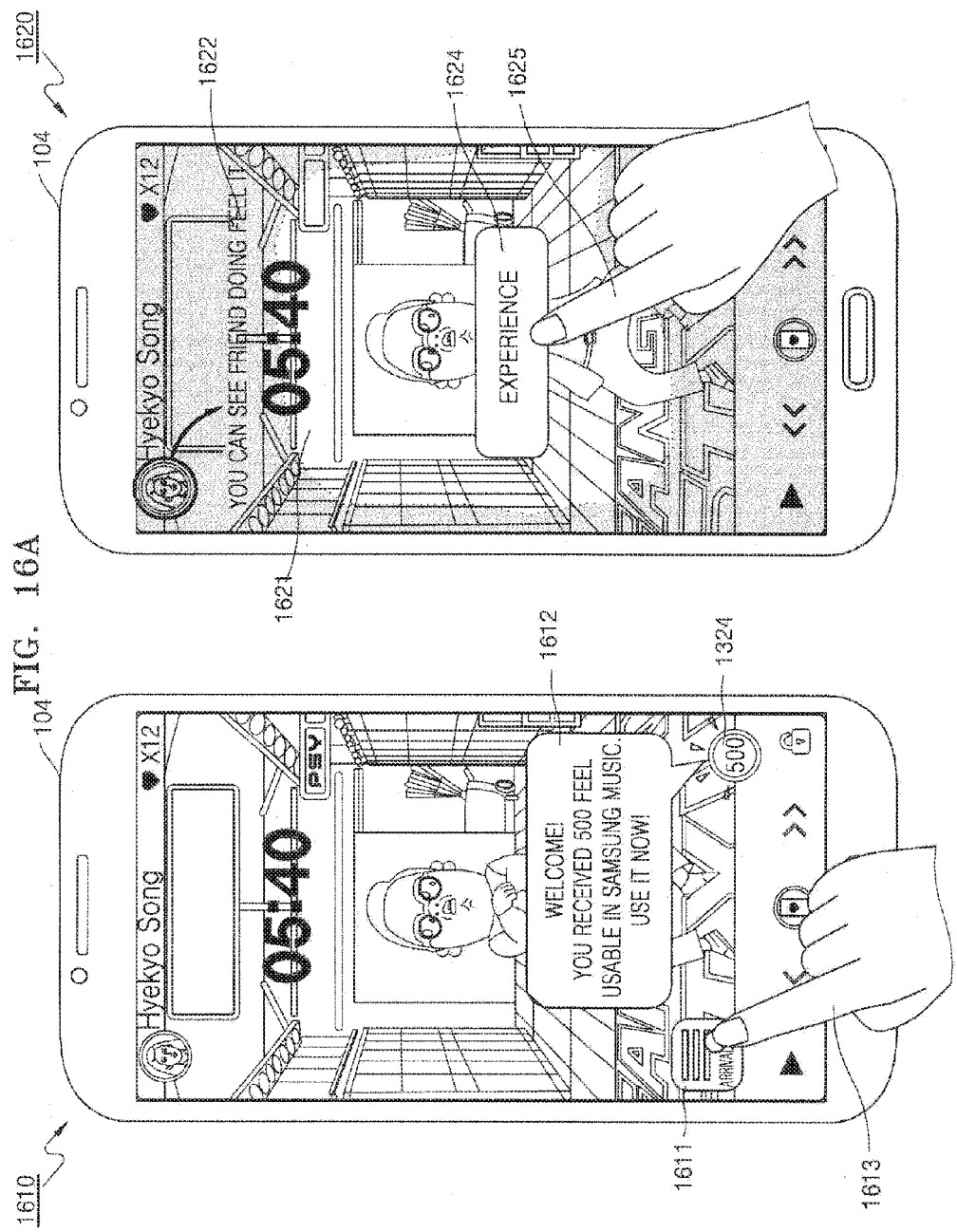

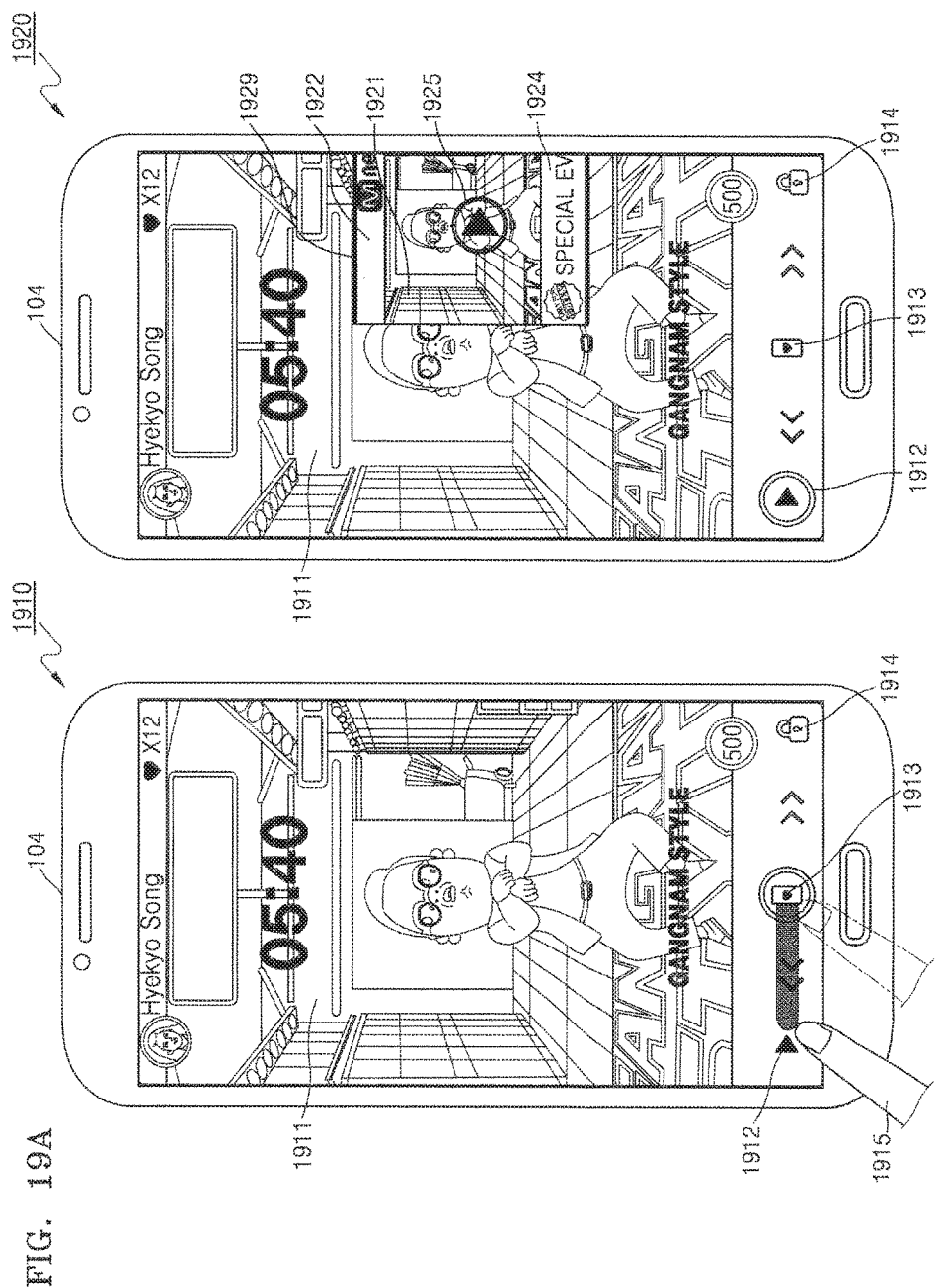

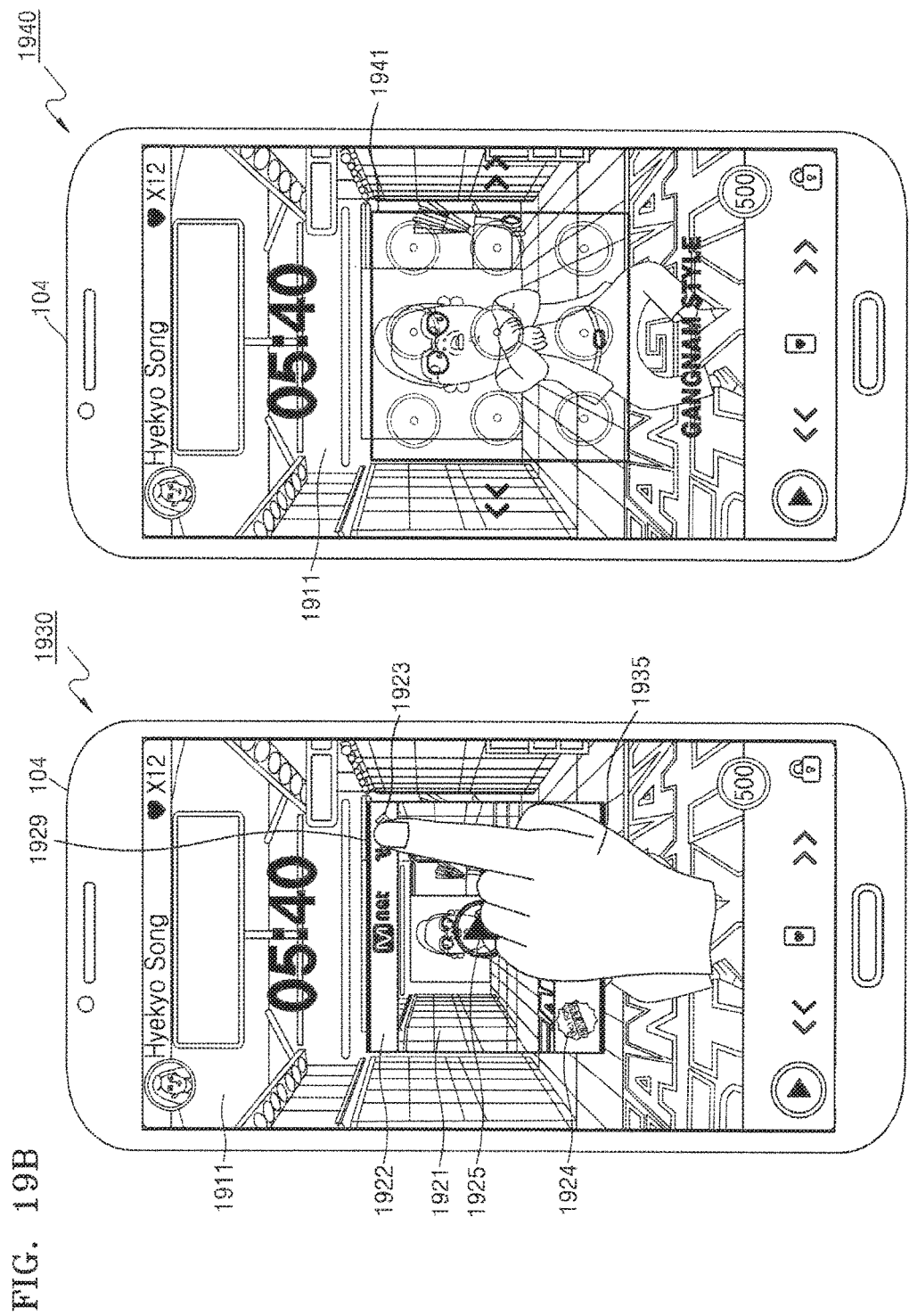

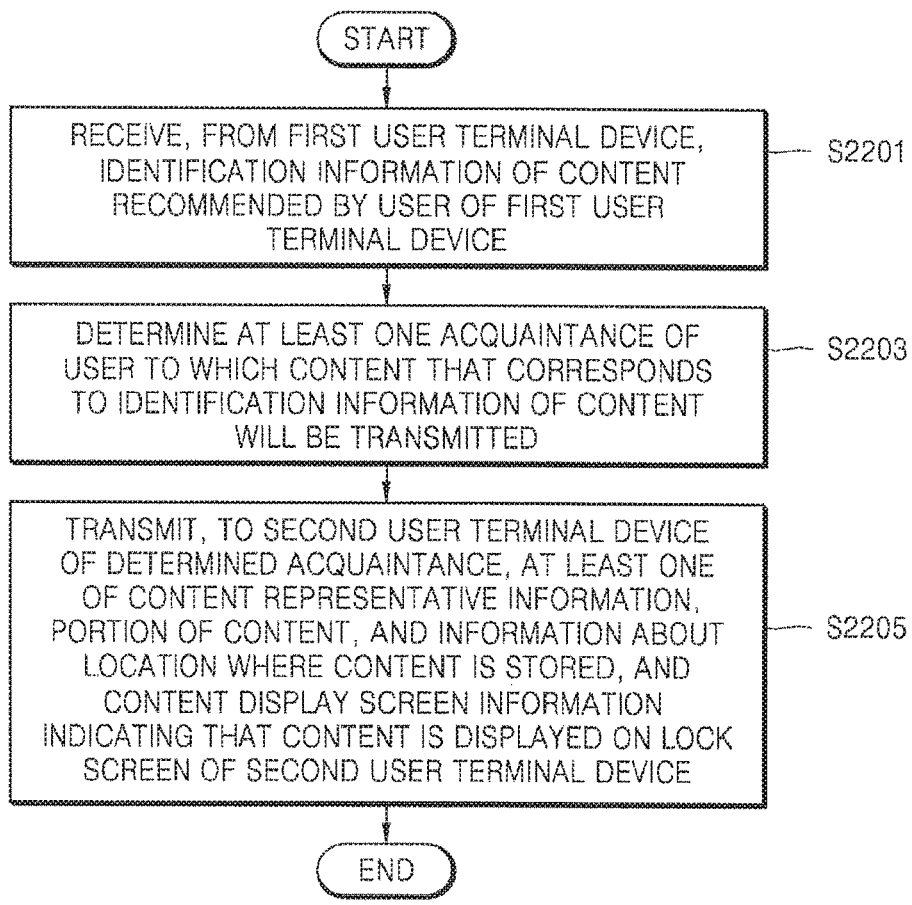

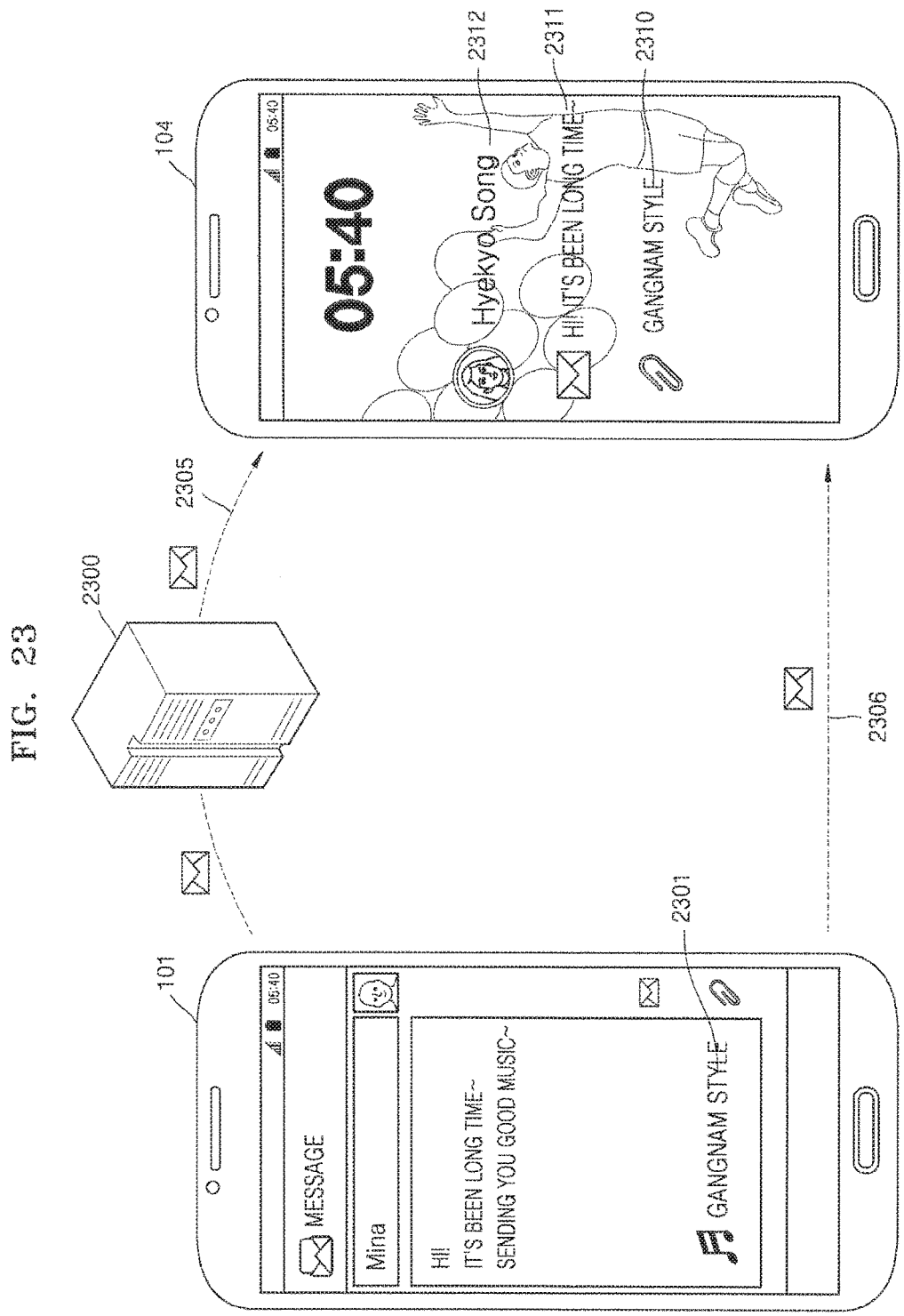

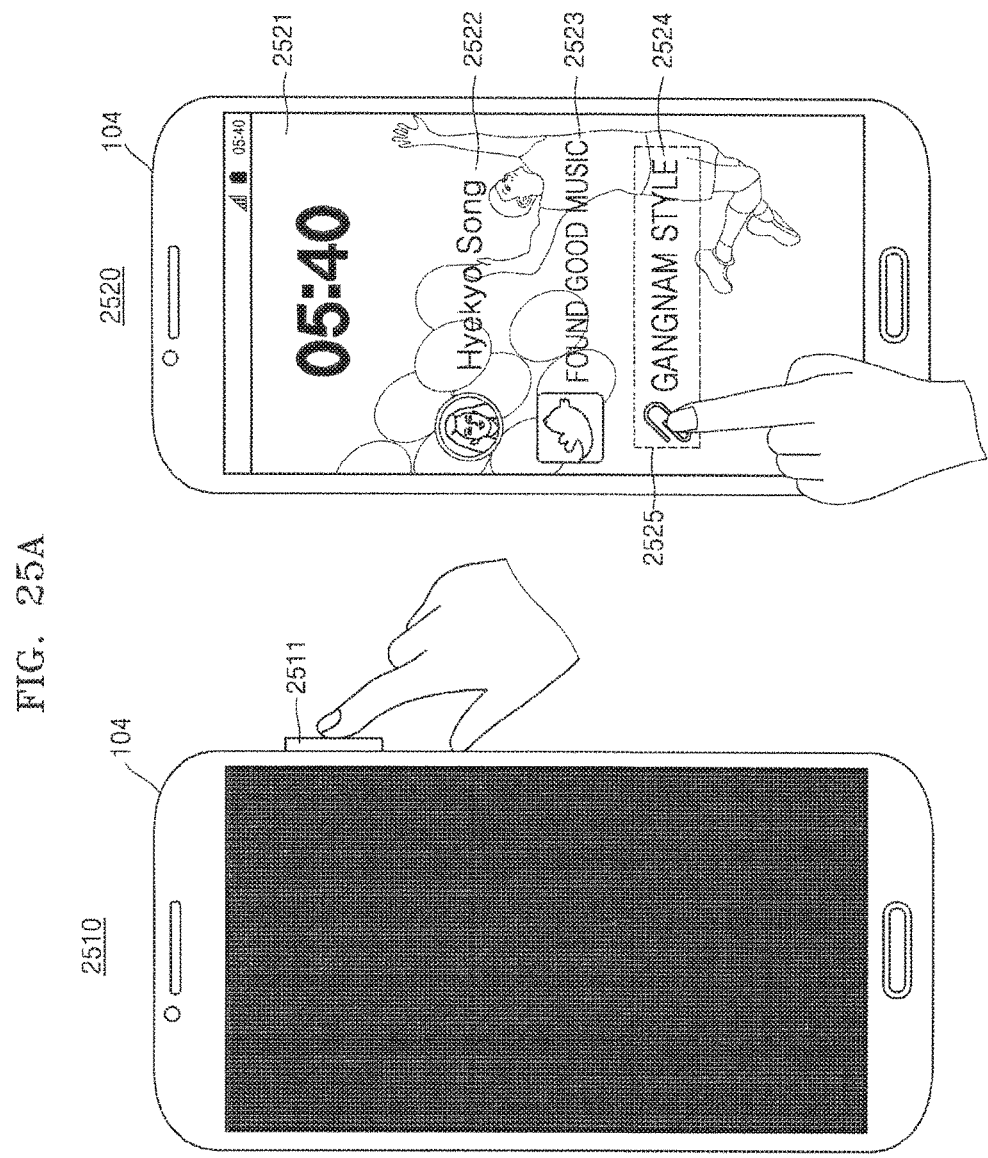

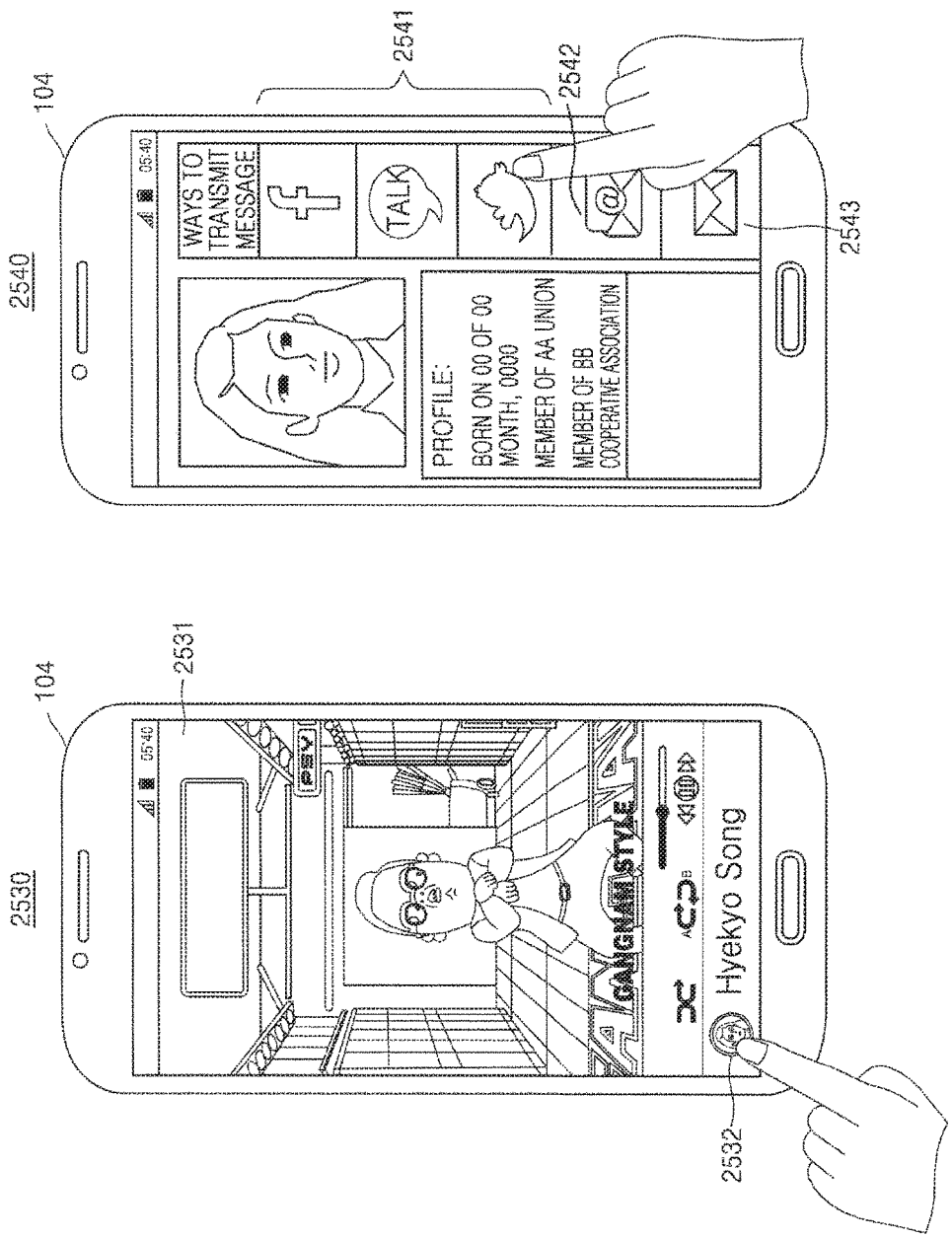

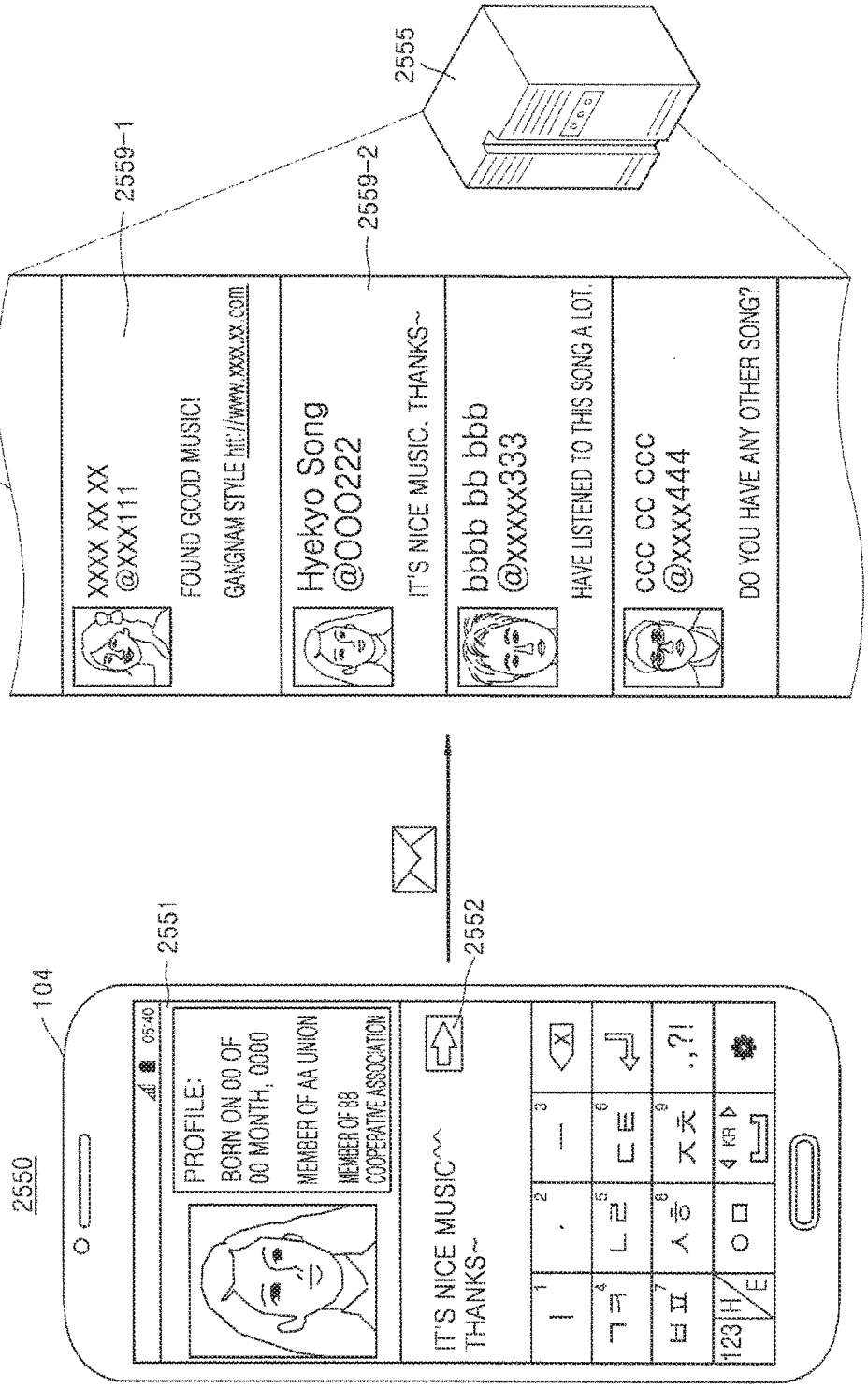

USER TERMINAL AND METHOD OF DISPLAYING LOCK SCREEN THEREOF

CROSS-REFERENCE TO RELATED APPLICATIONS

This application is a continuation of U.S. application Ser. No. 14/855,246, filed on Sep. 15, 2015, which is a continuation of PCT International Patent Application No. PCT/KR2015/004166, filed Apr. 27, 2015, which designates the United States, which claims priority to Korean Patent Application No. 10-2014-0050177, filed on Apr. 25, 2014. The contents of each of these applications are incorporated by reference herein in their entirety.

BACKGROUND AND SUMMARY

The concepts described herein relate to a user terminal device and a method of displaying a lock screen of the user terminal device, and more particularly, to a method of displaying content on the lock screen of the user terminal device.

When, for example, a button disposed on a side of a user terminal device is pressed, a lock screen may be provided to a display unit of the user terminal device. Generally speaking, a lock screen controls access to the user terminal device by requiring a user to provide a certain input (e.g., a code, a password, a gesture, a biometric input, and the like) in order to "unlock" the device.

Content may be displayed on the lock screen. The content may be a landscape image or a portrait image, and the image may be same as an image of a background screen for the user terminal device.

A user may input a password or a gesture on the lock screen to "unlock" the device, and may then proceed to a home screen that is an unlock screen. A shortcut icon(s) to an application(s) or a widget(s) may be included in the home screen.

When a password is set in the user terminal device, a user interface element for receiving an input of the password may be provided along with the content on the lock screen. For example, the password may be a particular pattern, an access number, a fingerprint recognition, etc.

When the password is not set in the user terminal device, a user interface element leading to the home screen may be provided on the lock screen. Here, the user interface element may be visually displayed or may not be displayed on the lock screen.

As mentioned, a lock screen is a screen that a user is required to pass in order to proceed to a home screen. According to statistics, the user enters the home screen via the lock screen about 100 to 150 times a day on average. However, use of current lock screens is generally limited to preventing another person from easily accessing a home screen. Even if content is displayed on the lock screen, the content is usually limited to a particular image stored in a memory of the user terminal. Such images are generally the same as an image of a background screen, so that the user repeatedly encounters a constant and uninteresting image on the lock screen.

Therefore, a method of more efficiently using the lock screen may be desirable.

DESCRIPTION OF THE DRAWINGS

FIGS. 13A, 13B and 13C illustrate screens displayed on a display unit of a second user terminal device according to example embodiments.

FIGS. 16A, 16B, 16C, 16D and 16E illustrate help screens of the second user terminal device according to example embodiments.

FIGS. 19A and 19B illustrate screens displayed on the display unit of the second user terminal device according to other example embodiments.

FIG. 22 is a flowchart illustrating a method of providing locked content, the method performed by the lock screen management server, according to an example embodiment.

FIG. 23 is a diagram illustrating a system according to another example embodiment.

FIGS. 25A, 25B and 25C illustrate screens that display content representative information on a lock screen according to example embodiments.

DETAILED DESCRIPTION

Figure 1:
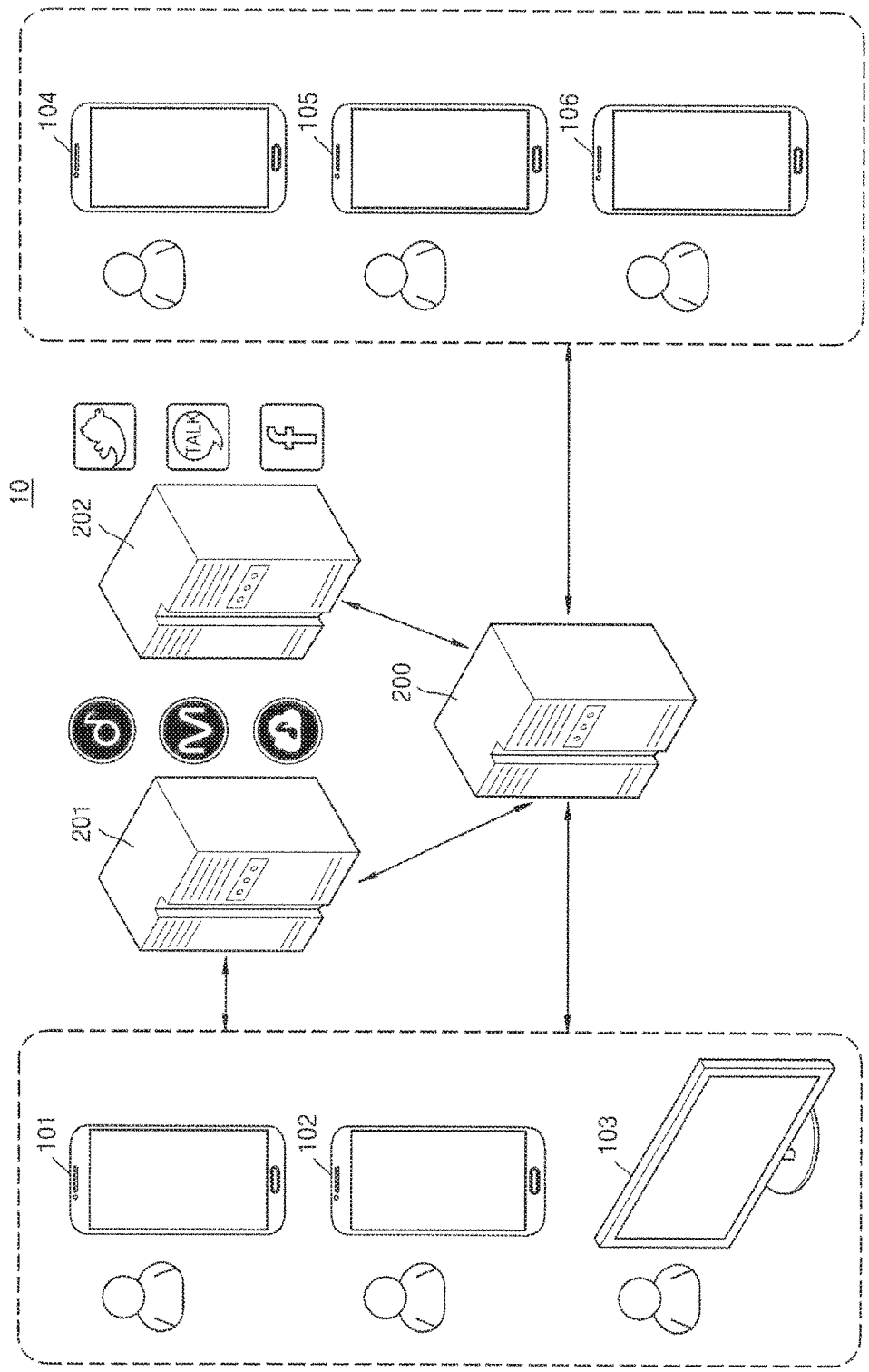
FIG. 1 is a diagram illustrating a system 10 according to an example embodiment.

According to an aspect of the systems, methods and devices described herein, a method of displaying a lock screen, performed by a user terminal device, includes receiving a signal for activating a display unit of the user terminal device, and, in response to the signal, displaying a lock screen on the display unit, wherein the lock screen includes representative information of content recommended by an acquaintance of a user who uses the user terminal device, a first user interface element, and a second user interface element. When a user input signal is received via the first user interface element, a portion of the content and a third user interface element related to purchasing the content are displayed on the display unit. When a user input signal is received via the second user interface element, an unlock (or home) screen including respective shortcut icons of respective applications, or a password input screen for receiving an input of a password for entering the unlock screen, is displayed on the display unit.

The lock screen may further include at least one of information about the acquaintance who recommends the content and information about points accumulated according to contents purchased by the acquaintance.

The method may further include displaying advertisement information related to purchasing the content or information about a service company who provides the content.

The method may further include providing a voice comment or a text comment with respect to the content.

The method may further include receiving a user input signal via the third user interface element related to purchasing the content, and displaying a shortcut icon of at least one purchase application capable of and operable for purchasing the content or an execution screen of a purchase application capable of and operable for purchasing the content.

The method may further include, when a user input signal is received via the first user interface element, providing a fourth user interface element for controlling a portion of the content on the display unit. A user input signal is received via the fourth user interface element for pausing reproduction of the portion of the content, reproducing the paused content, rapidly reproducing the portion of the content, or slowly reproducing the portion of the content.

The lock screen may include the fourth user interface element that displays representative information of other content recommended by the acquaintance or by another acquaintance of the user, and the method may further include, when a user input signal is received via the fourth user interface element, displaying the representative information of the other content on the display unit.

The lock screen may include a fourth user interface element that removes representative information of content, and the method may further include, when a user input signal is received via the fourth user interface element, displaying representative information of other content recommended by the acquaintance or by another acquaintance of the user, instead of the representative information of the content.

According to another aspect, there is provided a method of providing content to be displayed on a lock screen, the method performed by a server and including receiving identification information of content recommended by a user of a first user terminal device; determining at least one acquaintance of the user to which the content corresponding to the identification information of the content is to be transmitted; and transmitting, to a second user terminal device of the at least one acquaintance, at least one of representative information of the content, a portion of the content, and information about a location where the content is stored, and content display screen information indicating that the content is displayed on a lock screen of the second user terminal device.

The determining of the at least one acquaintance of the user may include obtaining an acquaintance list of the user from at least one of another server existing outside (external to) the server, the first user terminal device, and the second user terminal device; and determining the at least one acquaintance to share the content from the acquaintance list.

The determining of the at least one acquaintance of the user may include determining the at least one acquaintance of the user to which the content is to be transmitted, based on log information of the content recommended by the user of the first user terminal device, wherein the log information of the content may include at least one of user activity information, date information, time information, and location information about when the user of the first user terminal device recommends the content.

The method may further include transmitting content and template information to be displayed on the lock screen to the second user terminal device of the at least one acquaintance, wherein the template information includes at least one of information about an acquaintance who recommends the content, comment information about the content, information about points accumulated according to contents purchased by the acquaintance, advertisement information related to purchasing the content, and information about a service company that provides the content.

According to another aspect, a user terminal device that displays a lock screen and includes a user input unit configured to receive a signal for activating the display unit; and a control unit configured to control, in response to the signal, a lock screen to be displayed on the display unit, wherein the lock screen includes representative information of content shared by an acquaintance of a user who uses the user terminal device, a first user interface element, and a second user interface element. When a user input signal is received via the first user interface element, the control unit is configured to control the display unit to display a portion of the content and a third user interface element related to purchasing the content. When a user input signal is received via the second user interface element, the control unit is configured to control the display unit to display an unlock screen including respective shortcut icons of respective applications or a password input screen for receiving an input of a password for proceeding to the unlock screen.

The lock screen may further include at least one of information about the acquaintance who recommends the content and information about points accumulated according to contents purchased by the acquaintance.

The control unit may be configured to control the display unit to display advertisement information related to purchasing the content or information about a service company who provides the content.

The control unit may be configured to provide a voice comment or a text comment with respect to the content.

When a user input signal is received via the third user interface element related to purchasing the content, the control unit may be configured to control the display unit to display a shortcut icon of at least one purchase application capable of and operable for purchasing the content or an execution screen of the purchase application capable of and operable for purchasing the content.

When a user input signal is received via the first user interface element, the control unit may be configured to control the display unit to display a fourth user interface element for controlling a portion of the content. When a user input signal is received via the fourth user interface element, the control unit may be configured to pause reproduction of the portion of the content, to reproduce the stopped content, to rapidly reproduce the portion of the content, or to slowly reproduce the portion of the content.

The lock screen may include a fourth user interface element that displays representative information of other content recommended by the acquaintance or by another acquaintance of the user, and when a user input signal is received via the fourth user interface element, the control unit may be configured to control the display unit to display the representative information of the other content.

The lock screen may include a fourth user interface element that removes representative information of content, and when a user input signal is received via the fourth user interface element, the control unit may be configured to control the display unit to display representative information of other content recommended by the acquaintance or by another acquaintance of the user, instead of the representative information of the content.

According to another aspect, a server provides content to be displayed on a lock screen and includes a receiving unit configured to receive identification information of content recommended by a user of a first user terminal device; a control unit configured to determine at least one acquaintance of the user to which the content corresponding to the identification information of the content is to be transmitted; and a communication unit configured to transmit, to a second user terminal device of the at least one acquaintance, at least one of representative information of the content, a portion of the content, and information about a location where the content is stored, and content display screen information indicating that the content is displayed on a lock screen of the second user terminal device.

The control unit may be configured to obtain an acquaintance list of the user from at least one of another server existing outside (external to) the server, the first user terminal device, and the second user terminal device, and to determine the at least one acquaintance to share the content from the acquaintance list.

The control unit may be configured to determine the at least one acquaintance of the user to which the content is to be transmitted, based on log information of the content recommended by the user of the first user terminal device, wherein the log information of the content may include at least one of user activity information, date information, time information, and location information about when the user of the first user terminal device recommends the content.

The communication unit may be configured to further transmit content and template information to be displayed on the lock screen to the second user terminal device of the at least one acquaintance, wherein the template information includes at least one of information about an acquaintance who recommends the content, comment information about the content, information about points accumulated according to contents purchased by the acquaintance, advertisement information related to purchasing the content, and information about a service company that provides the content.

According to another aspect, a non-transitory, non-volatile recording medium has recorded thereon a program for displaying content on a lock screen, wherein the program displays a lock screen on a display unit, wherein the lock screen includes representative information of content recommended by an acquaintance of a user who uses the user terminal device, a first user interface element, and a second user interface element; and when a user input signal is received via the first user interface element, displays, on the display unit, a portion of the content and a third user interface element related to purchasing the content, and when a user input signal is received via the second user interface element, displays, on the display unit, an unlock screen including respective shortcut icons of respective applications or a password input screen for receiving an input of a password for proceeding to the unlock screen.

According to another aspect, a non-transitory, non-volatile recording medium has recorded thereon a program for providing content on a lock screen, wherein the program receives identification information of content recommended by a user of a first user terminal device; determines at least one acquaintance of the user to which the content corresponding to the identification information of the content is to be transmitted; and transmits, to a second user terminal device of the at least one acquaintance, at least one of representative information of the content, a portion of the content, and information about a location where the content is stored, and content display screen information indicating that the content is displayed on a lock screen of the second user terminal device.

According to another aspect, a method of displaying a lock screen, performed by a user terminal device, includes displaying a lock screen on a display unit, wherein the lock screen includes content representative information representing content included in a message that is provided by an acquaintance of a user of the user terminal device, and a first user interface element; when a user input signal is received via the first user interface element, executing an application capable of providing the content; and providing the content by using the application.

The displaying of the lock screen on the display unit may include displaying message representative information that represents and provides details of the message.

The method may further include receiving the message; and determining whether the acquaintance who provided the message is another user and the displaying of the lock screen on the display unit may include, when the other user is the acquaintance, displaying the lock screen including the content representative information representing the content included in the message that is provided by the acquaintance.

Before the operation of executing the application capable of providing the content, when the user input signal is received via the first user interface element, the method may further include displaying a password input screen for receiving an input of a password.

According to another aspect, a user terminal device displays a lock screen and includes a display unit configured to display a lock screen. The lock screen includes content representative information representing content included in a message that is provided by an acquaintance of a user of the user terminal device, and a first user interface element. A control unit is configured to, when a user input signal is received via the first user interface element, execute an application capable of providing the content and to provide the content.

The control unit may be configured to control the display unit to display message representative information representing details of the message on the lock screen.

The control unit may be configured to receive the message and to determine whether a third user who provides the message is the acquaintance, and when the third user is the acquaintance, to control the lock screen to be displayed, wherein the lock screen includes the content representative information representing the content included in the message that is provided by the acquaintance.

Before the control unit provides the content, the control unit may be configured to control a password input screen for receiving an input of a password to be displayed.

Hereinafter, the detailed description provides one or more representative example embodiments. Also, for convenience of the description, like names denote like elements that are defined. However, the names used for convenience of description are not limiting, and are applicable to a system having a similar technical background via similar or simple changes.

For the same reasons, in the drawings, some elements may be exaggerated, omitted, or roughly illustrated, and the size of each element does not exactly correspond to an actual size of each element. The disclosed embodiments are not limited to relative sizes or gaps illustrated in the drawings.

Throughout the specification, a singular form may include plural forms, unless there is a particular description contrary thereto.

Throughout the specification, terms such as " . . . unit", "module", or the like indicate a unit for processing at least one function or operation, wherein the unit and the module may be embodied as hardware or software or embodied by combining hardware and software.

Hereinafter, the disclosed embodiments will now be described more fully with reference to the accompanying drawings.

FIG. 1 is a diagram illustrating a system 10, including user terminal devices 101 through 106, a lock screen management server 200, a content providing server 201, and an acquaintance list server 202, according to an example embodiment.

The user terminal devices 101 through 106 may be classified into first user terminal devices 101 through 103 that provide contents, and second user terminal devices 104 through 106 that receive contents.

For example, when users of the first user terminal devices 101 through 103 recommend contents, the second user terminal devices 104 through 106 may provide the recommended contents, or representative information of the contents, via a lock screen. Examples in which the second user terminal devices 104 through 106 provide the recommended contents or the representative information of the contents via the lock screen will be described in detail with reference to FIGS. 1 through 22.

As another example, when the users of the first user terminal devices 101 through 103 transmit contents, the second user terminal devices 104 through 106 may provide the recommended contents or representative information of the contents that are received via the lock screen. In more detail, when the users of the first user terminal devices 101 through 103 transmit a message including contents, the second user terminal devices 104 through 106 may provide the contents included in the message via the lock screen. Examples in which the second user terminal devices 104 through 106 provide the contents included in the message via the lock screen will be described in detail with reference to FIGS. 23 through 32.

As another example, when the users of the first user terminal devices 101 through 103 register contents in a social server, the second user terminal devices 104 through 106 may provide the contents registered in the social server, or representative information of the contents, via the lock screen. In more detail, when the users of the first user terminal devices 101 through 103 register a message including contents in the social server, users of the second user terminal devices 104 through 106 may provide, via the lock screen, the contents included in the message that is registered in the social server. Examples in which the second user terminal devices 104 through 106 provide the contents included in the message via the lock screen will be described in detail with reference to FIGS. 23 through 32.

Hereinafter, example embodiments are described with reference to the first user terminal device 101 representing the first user terminal devices 101 through 103, and the second user terminal device 104 representing the second user terminal devices 104 through 106.

The description of the operation of the first user terminal device 101 may be equally applied to the first user terminal devices 102 and 103 of FIG. 1, and the description of the operation of the second user terminal device 104 may be equally applied to the second user terminal devices 105 and 106 of FIG. 1.

The lock screen management server 200 may be a server that manages contents displayed on a lock screen of the second user terminal device 104. When the user of the first user terminal device 101 recommends content, the lock screen management server 200 may determine, from an acquaintance list of the user, an acquaintance to whom the recommended content will be distributed, and may control the content to be provided to the second user terminal device 104 that is a user terminal device of the determined acquaintance.

The content providing server 201 is a server that provides contents, and for example, may be a Melon server, a Bugs server, a Netflix server, a Pandora server, or a YouTube server. The content providing server 201 may provide a portion of the contents to the second user terminal device 104 or the lock screen management server 200, according to a request of the lock screen management server 200. Alternatively, the content providing server 201 may refer to link information of contents received from the second user terminal devices 104 through 106, and may transmit the contents connected to or associated with the link information to the second user terminal devices 104 through 106 or the lock screen management server 200.

The acquaintance list server 202 is a server that provides an acquaintance list, and for example, may be a social server such as a KakaoTalk server, a line server, ChatOn server, a Facebook server, or a Twitter server that manages the acquaintance list. The acquaintance list server 202 may transmit an acquaintance list of the user of the first user terminal device 101 or a user of the second user terminal device 104 to the lock screen management server 200, according to a request of the lock screen management server 200.

Figure 2:
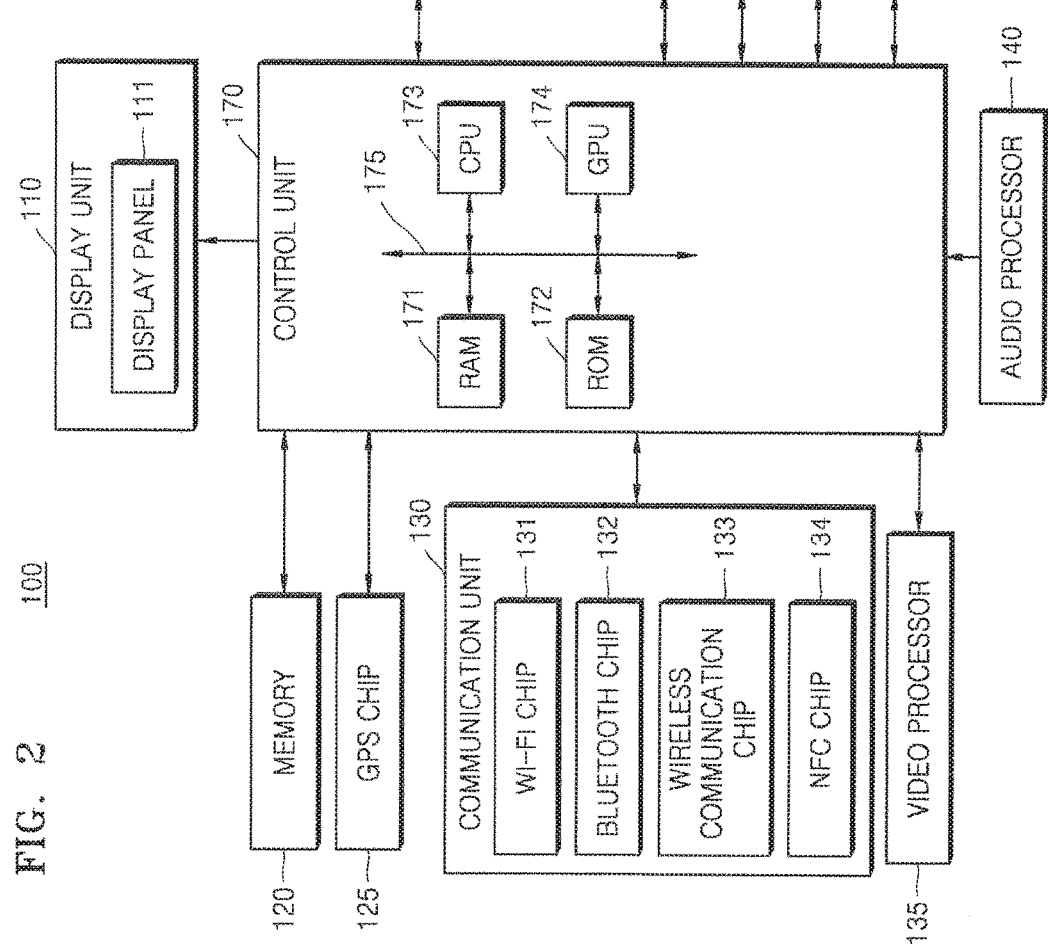
FIG. 2 is a block diagram illustrating a configuration of a user terminal device 100 according to an example embodiment.

FIG. 2 is a block diagram illustrating a configuration of a user terminal device 100, according to an example embodiment, and the configuration of the user terminal device 100 shown in FIG. 2 is applicable to all of the user terminal devices 101 through 106 of FIG. 1.

The configuration of a user terminal device 100 may correspond to a mobile phone, a tablet personal computer (PC), a PC, a smart television (TV), a personal digital assistant (PDA), a laptop computer, a media player, an MP3 player, a microserver, a global positioning system (GPS) device, an electronic book terminal, a terminal for digital broadcasting, a kiosk, an electronic photoframe, a navigation device, a digital TV, a wearable device such as head-mounted display (HMD) or a wristwatch, and other mobile or non-mobile computing devices.

Referring to FIG. 2, the user terminal device 100 may include at least one of a display unit 110, a control unit 170, a memory 120, a GPS chip 125, a communication unit 130, a video processor 135, an audio processor 140, a user input unit 145, a microphone unit 150, an image-capturing unit 155, a speaker unit 160, and a motion detecting unit 165.

The display unit 110 may include a display panel 111 and a controller (not shown) that controls the display panel 111. The display panel 111 may be embodied as various displays including an LCD, an organic light-emitting diode (OLED) display, an active matrix OLED (AMOLED) display, a plasma display panel (PDP), or the like. The display panel 111 may be formed to be flexible, transparent, and/or wearable. The display panel 111 may be combined with a touch panel 147 of the user input unit 145, and thus may be provided as a touchscreen (not shown). For example, the touchscreen may include an integrated module having a stack structure containing the display panel 111 and the touch panel 147.

The memory 120 may include at least one of an internal memory (not shown) and an external memory (not shown).

The internal memory may include at least one of a volatile memory (e.g., a dynamic random-access memory (DRAM), a static RAM (SRAM), a synchronous dynamic RAM (SDRAM), etc.), a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, etc.), a hard disk drive (HDD), and a solid-state drive (SSD). According to the present example embodiment, the control unit 170 may load a command or data, which is received from at least one of the non-volatile memory and another element, to the volatile memory, and may process the command or the data. Also, the control unit 170 may store, in the non-volatile memory, data that is received from or is generated by another element of the device.

The external memory may include at least one of a compact flash (CF) memory, a secure digital (SD) memory, a micro secure digital (micro-SD) memory, a mini secure digital (mini-SD) memory, an extreme digital (xD) memory, and a memory stick.

The memory 120 may store various programs and data used in operations of the user terminal device 100. For example, the memory 120 may temporarily or semi-permanently store at least a portion of contents to be displayed on a lock screen.

The control unit 170 may control the display unit 110 to display the portion of the contents which is stored in the memory 120. In other words, the control unit 170 may display, on the display unit 110, the portion of the contents which is stored in the memory 120. Alternatively, when a user's gesture is performed in a region of the display unit 110, the control unit 170 may perform a control operation that corresponds to the user's gesture.

The control unit 170 may include at least one of a RAM 171, a ROM 172, a central processing unit (CPU) 173, a graphics processor unit (GPU) 174, and a bus 175. The RAM 171, the ROM 172, the CPU 173, and the GPU 174 may be connected to each other via the bus 175.

The CPU 173 may access the memory 120, and performs a booting operation by using an operating system (OS) stored in the memory 120. Also, the CPU 173 performs various operations by using the various programs, a plurality of contents, a plurality of pieces of data, etc. stored in the memory 120.

The ROM 172 stores a command set for booting up a system. For example, when a turn-on command is input to the user terminal device 100, and power is supplied to the user terminal device 100, the CPU 173 may copy the OS stored in the memory 120 to the RAM 171, according to the command stored in the ROM 172, may execute the OS, and thus may boot up the system. When the booting operation is completed, the CPU 173 copies the various programs stored in the memory 120 to the RAM 171, and performs the various operations by executing the programs copied to the RAM 171. When the user terminal device 100 is booted up, the GPU 174 displays a user interface screen in a region of the display unit 110. In more detail, the GPU 174 may generate a screen that displays an electronic document including various objects such as content, an icon, a menu, or the like. The GPU 174 calculates coordinate values of the objects that are to be displayed according to a layout of the user interface screen, and calculates attribute values of shapes, sizes, or colors of the objects. Then, the GPU 174 may generate user interface screens with various layouts including the objects based on the calculated attribute values. The user interface screen generated by the GPU 174 may be provided to the display unit 110 and thus may be displayed in regions of the display unit 110.

The GPS chip 125 may receive a GPS signal from a GPS satellite and may calculate a current position of the user terminal device 100. In a case where a navigation program is used or a current position of the user is required, the control unit 170 may calculate a position of the user by using the GPS chip 125.

The communication unit 130 may perform communication with various external devices according to various types of communication methods. The communication unit 130 may include at least one selected from a Wi-Fi chip 131, a Bluetooth chip 132, a wireless communication chip 133, and a near field communication (NFC) chip 134. The control unit 170 may perform communication with the various external devices by using the communication unit 130.

The Wi-Fi chip 131 and the Bluetooth chip 132 may perform communication by using WiFi and Bluetooth, respectively. If the Wi-Fi chip 131 or the Bluetooth chip 132 is used, the WiFi chip 131 or the Bluetooth chip 132 may first transmit and receive various types of connection information including a service set identification (SSID), a session key, or the like, may establish a connection for communication by using the connection information, and then may transmit and receive various types of information. The wireless communication chip 133 may indicate a chip that performs communication according to various communication standards such as the Institute of Electrical and Electronics Engineers (IEEE), ZigBee, $3^{rd}$ generation (3G). 3rd Generation Partnership Project (3GPP), Long Term Evolution (LTE), or the like. The NFC chip 134 indicates a chip that operates using NFC by using a 13.56 MHz band from among various radio frequency-identification (RF-ID) frequency bands such as 135 kHz, 13.56 MHz, 433 MHz, 860~960 MHz, 2.45 GHz, or the like.

The video processor 135 may process video data included in content received by using the communication unit 130 or may process video data included in content stored in the memory 120. The video processor 135 may perform various image processing operations such as decoding, scaling, noise filtering, frame rate conversion, resolution conversion, or the like on the video data.

The audio processor 140 may process audio data included in content received by using the communication unit 130 or may process audio data included in content stored in the memory 120. The audio processor 140 may perform various audio processing operations such as decoding, amplification, noise filtering, or the like on the audio data.

When a reproducing program for multimedia content is executed, the control unit 170 may reproduce the multimedia content by driving the video processor 135 and the audio processor 140. The speaker unit 160 may output audio data generated in the audio processor 140.

The user input unit 145 may receive an input of various instructions from a user. The user input unit 145 may include at least one of a key 146, a touch panel 147, and a pen recognizing panel 148.

The key 146 may be of various types such as a mechanical button, a wheel, or the like that may be formed in a front portion, a side portion, a rear portion, etc., of an external surface of a body of the user terminal device 100.

The touch panel 147 may sense a touch input by the user and may output a value of a touch event that corresponds to a signal generated by the sensed touch input. When the touch panel 147 is combined with the display panel 111 and thus is formed as a touchscreen, the touchscreen may be configured as a capacitive touchscreen, a resistive touchscreen, or a piezoelectric touchscreen by using various types of touch sensors. The capacitive touchscreen may calculate touch coordinates by sensing a small amount of electricity generated when a body part of the user touches the surface of the capacitive touchscreen, which is coated with a dielectric material. The resistive touchscreen may include two embedded electrode plates and may calculate touch coordinates by sensing a flow of current that occurs when the user touches the resistive touchscreen which causes upper and lower plates of a touched point to contact each other. The touch event that occurs on the touchscreen may be mainly generated by a finger of a person but may also be generated by an object formed of a conductive material capable of changing capacitance.

The pen recognizing panel 148 may sense a proximity input or a touch input of a touch pen (e.g., a stylus pen or a digitizer pen) which is performed by a user, and may output a sensed pen proximity event or a sensed pen touch event. The pen recognizing panel 148 may be an electromagnetic resonance (EMR)-type pen recognizing panel, and may sense the touch input or the proximity input according to changes in a strength of an electromagnetic field, which occur when the touch pen approaches or touches the touchscreen. In more detail, the pen recognizing panel 148 may include an electromagnetic induction coil sensor (not shown) having a grid structure, and an electric signal processor (not shown) for sequentially providing an alternating current (AC) signal having a predetermined frequency to each loop coil of the electromagnetic induction coil sensor. When a pen having an internal resonance circuit is positioned near a loop coil of the pen recognizing panel 148, a magnetic field transmitted from the loop coil generates a current in the resonance circuit in the pen, based on mutual electrostatic induction. Due to the current, an induction field is generated from a coil forming the resonance circuit in the pen, and the pen recognizing panel 148 detects the induction field from the loop coil capable of receiving a signal, and thus senses the touch input or the proximity input by the pen. The pen recognizing panel 148 may be arranged to occupy a preset area below the display panel 111, e.g., may have a size capable of covering a display region of the display panel 111.

The microphone unit 150 may receive an input of a user's voice or other sound and may convert the user's voice or other sound to audio data. The control unit 170 may use the user's voice, which is input via the microphone unit 150, in a call-related operation or may convert the user's voice to audio data and may store the audio data in the memory 120.

The image-capturing unit 155 (e.g., a camera) may capture a still image or a moving picture according to a control by the user. The image-capturing unit 155 may be plural in number and include a front camera, a rear camera, or the like.

If the image-capturing unit 155 and the microphone unit 150 are provided, the control unit 170 may perform a control operation according to a user's voice input via the microphone unit 150 or a user's motion recognized by the image-capturing unit 155. For example, the user terminal device 100 may operate in a motion control mode or a voice control mode. If the user terminal device 100 operates in the motion control mode, the control unit 170 may activate the image-capturing unit 155 and may capture an image of the user, may trace a change in motions of the user, and may perform a control operation corresponding thereto. If the user terminal device 100 operates in the voice control mode (i.e., a voice recognition mode), the control unit 170 may analyze a user's voice input via the microphone unit 150, and may perform a control operation according to the analyzed user's voice.

The motion detecting unit 165 may detect movement of a body of the user terminal device 100. The user terminal device 100 may rotate or may tilt in various directions. Here, the motion detecting unit 165 may detect a movement characteristic such as a rotation direction, a rotation angle, a tilted angle, or the like by using at least one of various sensors including a magnetic sensor, a gyroscope sensor, an acceleration sensor, etc.

Although not illustrated in FIG. 1, the present example embodiment may further include a universal serial bus (USB) port for connecting the user terminal device 100 and a USB connector, various external input ports including a headset, a mouse, a local area network (LAN), etc. for connection with various external terminals, a digital multimedia broadcasting (DMB) chip for receiving and processing a DMB signal, various sensors, or the like.

Names of elements in the user terminal device 100 may vary. Also, the user terminal device 100 according to the present example embodiment may include at least one selected from the aforementioned elements, or may be embodied with more or less elements than the aforementioned elements.

Figure 3:
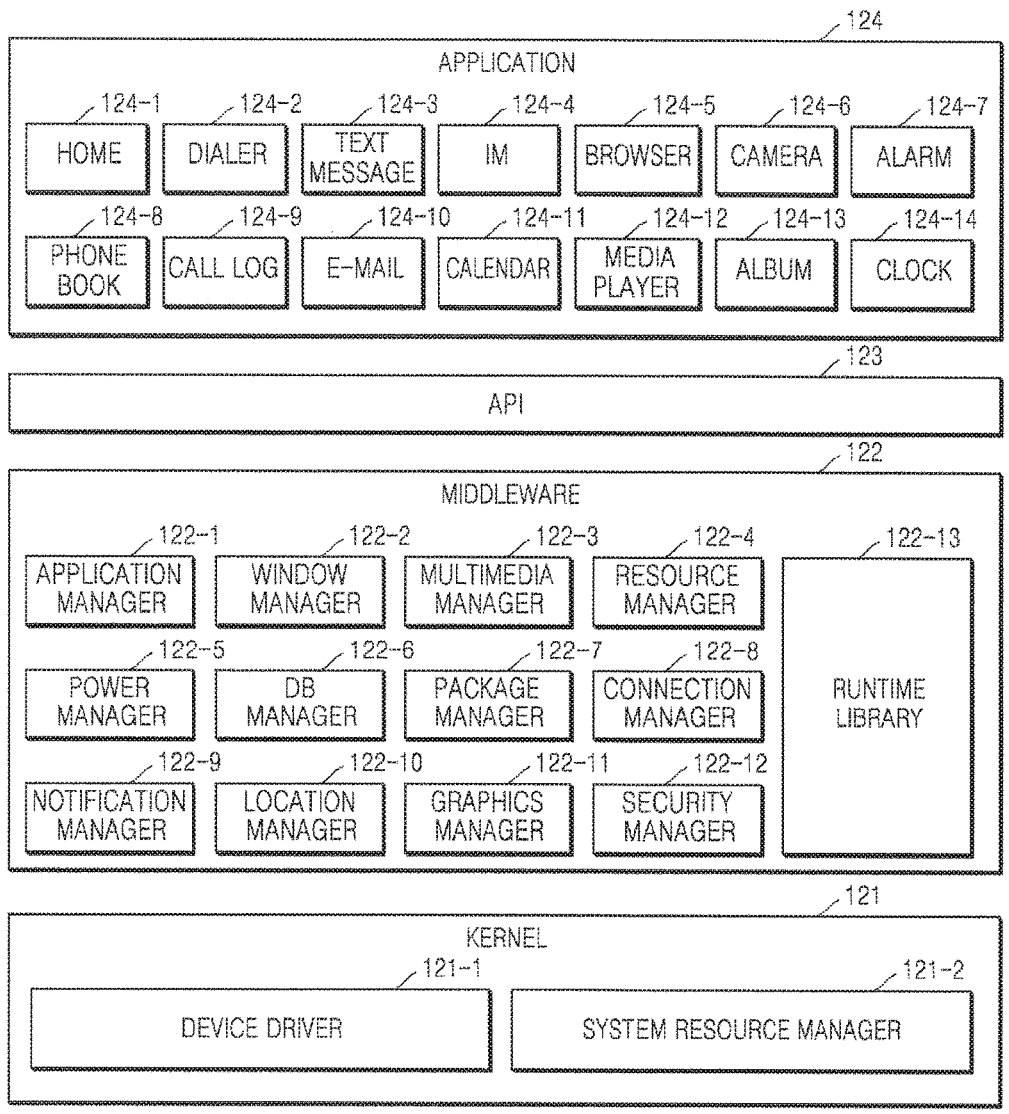
FIG. 3 is a block diagram illustrating a software configuration of the user terminal device according to an example embodiment.

FIG. 3 is a block diagram illustrating a software configuration of the user terminal device 100 according to an example embodiment.

Referring to FIG. 3, the memory 120 may store an OS for controlling resources of the user terminal device 100, an application program for an operation of an application, or the like. The OS may include a kernel 121, middleware 122, an application programming interface (API) 123, etc. Examples of the OS may include Android, iOS, Windows, Symbian, Tizen, Bada or the like.

The kernel 121 may include at least one of a device driver 121-1 and a system resource manager 121-2 that are capable of managing resources. The device driver 121-1 may allow hardware of the user terminal device 100 to be accessed and controlled by using software. To do so, the device driver 121-1 may be divided into an interface and discrete driver modules provided by discrete hardware companies. For example, the device driver 121-1 may include at least one of a display driver, a camera driver, a Bluetooth driver, a shared memory driver, an USB driver, a keypad driver, a Wi-Fi driver, an audio driver, and an inter-process communication (IPC) driver. The system resource manager 121-2 may include at least one of a process manager, a memory manager, and a file system manager. The system resource manager 121-2 may perform controlling, allocating, or retrieving system resources.

The middleware 122 may include a plurality of modules that are pre-embodied so as to provide a function that is commonly requested by various applications. The middleware 122 may provide the function via the API 123 so as to control applications 124 to efficiently use the resources of the user terminal device 100. The middleware 122 may include at least one of a plurality of modules including an application manager 122-1, a Windows manager 122-2, a multimedia manager 122-3, a resource manager 122-4, a power manager 122-5, a DB manager 122-6, a package manager 122-7, a connection manager 122-8, a notification manager 122-9, a location manager 122-10, a graphics manager 122-11, and a security manager 122-12.

The application manager 122-1 may manage a life cycle of at least one of the applications 124. The Windows manager 122-2 may manage a GUI resource used in a screen. The multimedia manager 122-3 may recognize formats for reproducing various types of multimedia files, and may encode or decode a media file by using codec for a format of the media file. The resource manager 122-4 may manage resources such as a source code, a memory, or storage spaces of at least one of the applications 124. The power manager 122-5 may interoperate with a Basic Input/Output System (BIOS), thereby managing a battery or power and providing power information for an operation. The DB manager 122-6 may manage a database, which is to be used in at least one of the applications 124, to be generated, to be searched, or to be changed. The package manager 122-7 may manage installing or updating an application that is distributed in the form of a package file. The connection manager 122-8 may manage wireless connection such as Wi-Fi, Bluetooth, or the like. The notification manager 122-9 may display or notify an event such as a received message, an appointment, an approach notification, or the like (e.g., so that a user is not disturbed by the event). The location manager 122-10 may manage location information of the user terminal device 100. The graphics manager 122-11 may manage graphics effects to be provided to the user, and a UI related to the graphics effects. The security manager 122-12 may provide general security functions requested for a system security or user authentication. If the user terminal device 100 has a phone function, the middleware 122 may further include a call manager (not shown) for managing a voice or video call function of the user terminal device 100.

The middleware 122 may further include a runtime library 122-13 or other library modules (not shown). The runtime library 122-13 is a library module used by a compiler so as to add a new function by using a programming language while an application is being executed. For example, the runtime library 122-13 may perform input/output, memory management, or a function for a mathematical function. The middleware 122 may generate and use a new middleware module by combining various functions of the aforementioned internal configuration element modules. The middleware 122 may provide a module that is specialized according to each type of the OS, so as to provide a differentiated function. The middleware 122 may dynamically delete some existing configuration elements and/or may dynamically add new configuration elements. Some configuration elements in the present example embodiment may be omitted, other configuration elements may be further included, or some of the configuration elements may be substituted with other configuration elements that have different names and perform similar functions.

The API 123 is a set of API programming functions, and may be provided with a different configuration according to each type of the OS. Android or iOS may provide one API set for each platform, and Tizen may provide at least two API sets for each platform.

The applications 124 may include at least one pre-loaded application that is installed as a default, or a third party application that is installed and used by the user while the user uses the user terminal device 100. For example, the applications 124 may include at least one of a home application 124-1 for returning to a home screen, a dialer application 124-2 for making a call with the other party, a text message application 124-3 for, e.g., receiving a message from the other party identified based on a telephone number, an instant message (IM) application 124-4, a browser application 124-5, a camera application 124-6, an alarm application 124-7, a phone-book application 124-8 for managing telephone numbers or addresses of other parties, a call log application 124-9 for managing a call log of the user, reception/transmission logs of text messages, or an unanswered call log, an e-mail application 124-10 for, e.g., receiving an e-mail from the other party identified based on an e-mail account, a calendar application 124-11, a media player application 124-12, an album application 124-13, and a clock application 124-14. Names of the aforementioned elements of software according to the present example embodiment may vary according to each type of the OS. Also, the software according to the present example embodiment may include or omit at least one of the aforementioned elements, or may further include at least one additional element.

Figure 4:
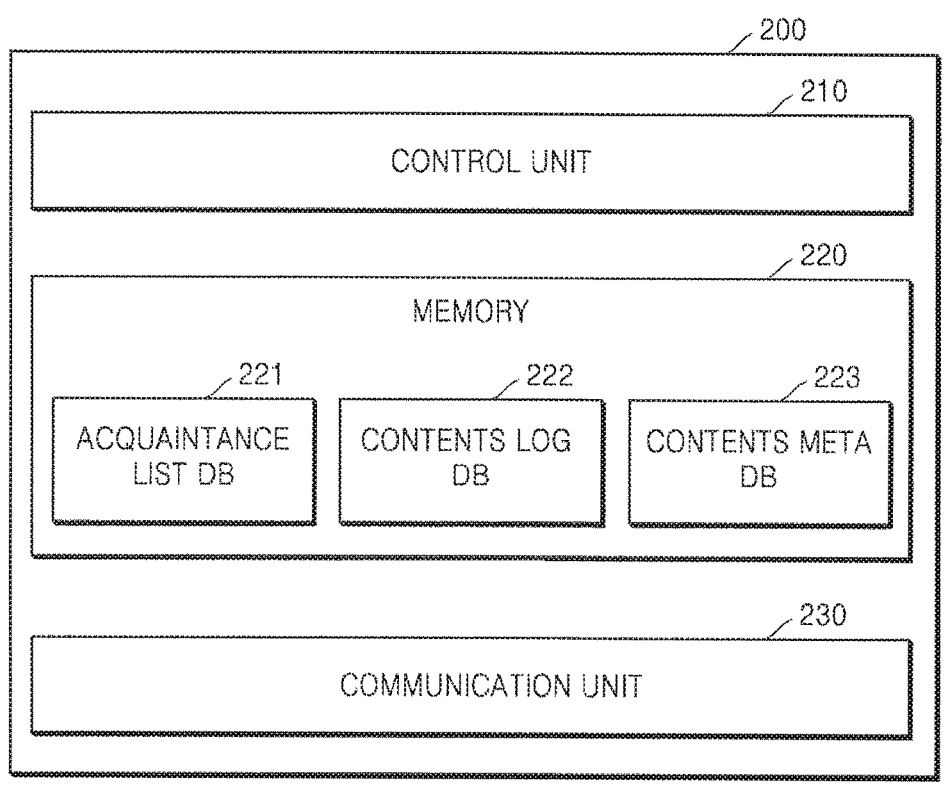
FIG. 4 is a block diagram illustrating a configuration of a lock screen management server according to an example embodiment.

FIG. 4 is a block diagram illustrating a configuration of the lock screen management server 200 according to an example embodiment.

Referring to FIG. 4, the lock screen management server 200 may include a control unit 210, a memory 220, and a communication unit 230. The memory 220 may include an acquaintance list database (DB) 221, a contents log DB 222, and a contents meta DB 223.

The acquaintance list DB 221 may include acquaintance lists of users of the user terminal devices 101 through 106, respectively. The acquaintance lists of the users that are obtained from contact lists stored in the acquaintance list server 202 or the user terminal devices 101 through 106 may be stored and updated in the acquaintance list DB 221.

The contents log DB 222 may include log information such as a number of recommendations of each content, a number of reproductions of each content, or a number of purchases. Also, the contents log DB 222 may include, as log information, user activity information, date information, time information, or user location information about when each content is executed. The user activity information may be information about whether a user walks, remains stopped or still, or runs. The user activity information may be determined, for example, based on a value measured by the motion detecting unit 165 or another sensor included in the user terminal device 100.

The contents meta DB 223 may include a portion of content and content representative information. For example, when the content is music, the content representative information may correspond to a cover art image of the music, an image of a compact disc (CD), a pre-listening sound source, a title of the music, or the like. As another example, when the content is a movie, the content representative information may correspond to a title of the movie, an image of a movie poster, a still image of the movie, a preview video, or the like. In addition, the contents meta DB 223 may further include, as detail information of the content, genre information of the content, artist information of the content, ID3 tag information, cast information of the content, rating information of the content, or the like. The portion of content and the content representative information may be frequently updated by the content providing server 201.

When the user of the first user terminal device 101 recommends content, the control unit 210 of the lock screen management server 200 may determine at least one acquaintance with whom to share the recommended content, wherein the at least one acquaintance is from the acquaintance list of the user included in the acquaintance list DB 221.

For example, the control unit 210 of the lock screen management server 200 may determine some acquaintances with whom to share the content, wherein the some acquaintances are randomly selected from among acquaintances of the user included in the acquaintance list DB 221.

As another example, the control unit 210 of the lock screen management server 200 may determine acquaintances with whom to share the content, wherein the acquaintances from among acquaintances included in the acquaintance list DB 221 have a high number of times of contacting the user.

As another example, the control unit 210 of the lock screen management server 200 may determine acquaintances with whom to share the content, wherein the acquaintances from among acquaintances included in the acquaintance list DB 221 have a history of receiving content recommended by the user. The acquaintances who received the content may have previewed/pre-listened user-recommended content via a lock screen, may have purchased the content, or may have recommended the content to a third acquaintance.

As another example, the control unit 210 of the lock screen management server 200 may determine acquaintances with whom to share the content, wherein the acquaintances from among acquaintances included in the acquaintance list DB 221 registered the user in their acquaintance lists. For example, when an acquaintance is included in a contact list of the first user terminal device 101 of the user, and the user is included in a contact list of the second user terminal device 104 of the acquaintance, the control unit 210 of the lock screen management server 200 may determine the acquaintance as an acquaintance with whom to share the content recommended by the user.

As another example, the control unit 210 of the lock screen management server 200 may determine acquaintances with whom to share the content, wherein the acquaintances are not included in the acquaintance list of the user but registered the user in their acquaintance lists. For example, when an acquaintance is not included in the contact list of the first user terminal device 101 of the user, but the user is included in the contact list of the second user terminal device 104 of the acquaintance, the control unit 210 of the lock screen management server 200 may determine the acquaintance as an acquaintance with whom to share the content recommended by the user.

As another example, when an acquaintance from among acquaintances of the user included in the acquaintance list DB 221 has log information same as or similar to log information of the recommended content, the control unit 210 of the lock screen management server 200 may determine the acquaintance as an acquaintance with whom to share the content. For example, when content is recommended in a place near a particular place, the control unit 210 of the lock screen management server 200 may determine an acquaintance, who activates a lock screen in the particular place, as an acquaintance with whom to share the content. Also, when the content is recommended on a particular date, the control unit 210 of the lock screen management server 200 may determine an acquaintance, who activates a lock screen on the particular date, as an acquaintance with whom to share the content. Also, when the content is recommended while the user runs, the control unit 210 of the lock screen management server 200 may determine an acquaintance, who activates a lock screen while the acquaintance runs, as an acquaintance with whom to share the content.

The control unit 210 of the lock screen management server 200 may selectively provide content to the second user terminal device 104 of the acquaintance, in consideration of a genre of the content. The control unit 210 of the lock screen management server 200 may provide content of a particular genre to the second user terminal device 104, according to a state of the acquaintance or the second user terminal device 104. For example, when the acquaintance activates the lock screen in an autumn night, the control unit 210 of the lock screen management server 200 may provide music content of a romantic pop or new age genre to the acquaintance or the second user terminal device 104. Also, when the acquaintance activates the lock screen during jogging, the control unit 210 of the lock screen management server 200 may provide music content having a rapid beat to the acquaintance of the second user terminal device 104.

For another example, when the user of the second user terminal device 104 may have pre-viewed/pre-listened content displayed on the lock screen or may have purchased the content, the control unit 210 of the lock screen management server 200 may obtain a list of acquaintances who recommended same content as the content. The control unit 210 of the lock screen management server 200 may select, other than the content, other content recommended by the acquaintances in the list. Here, the selected content may be content that is recommended by a number of acquaintances equal to or greater than a preset number. Also, the selected content may be content that was pre-viewed/pre-listened to or was purchased a preset number of times from among a plurality of contents recommended by the acquaintances in the list. The control unit 210 of the lock screen management server 200 may determine an acquaintance of the user to whom the selected content is to be recommended, and may provide the selected content to the second user terminal device 104 via the determined acquaintance.

The communication unit 230 of the lock screen management server 200 may transmit data to or may receive data from the content providing server 201, the acquaintance list server 202, and the user terminal device 100, according to an operation of the control unit 210. For example, the communication unit 230 of the lock screen management server 200 may transmit (i) at least one of information about a location where content is stored, a portion of the content, and (ii) content display screen information to the second user terminal device 104 of the acquaintance determined by the control unit 210 of the lock screen management server 200.

Figure 5:
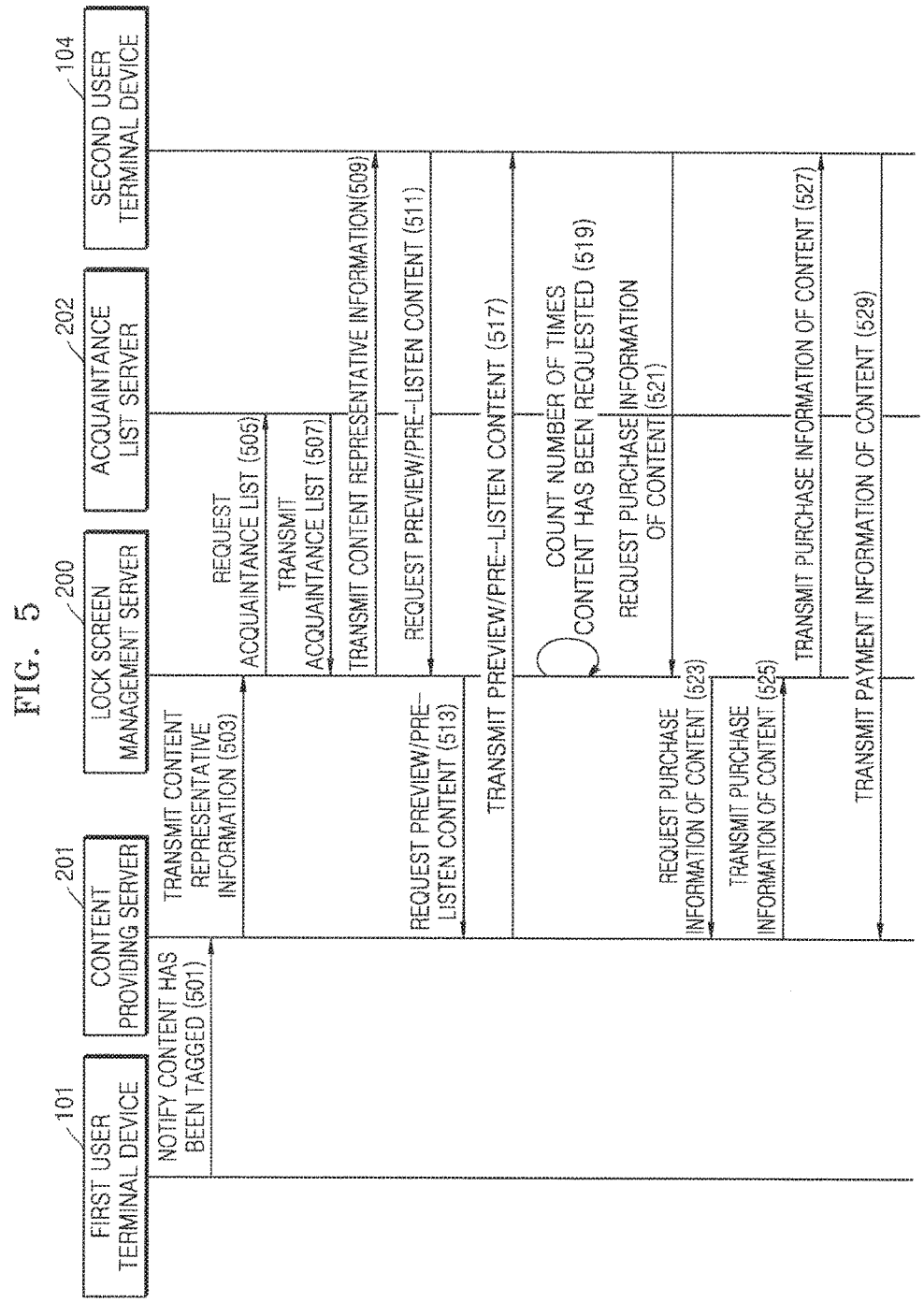
FIGS. 5, 6, 7, 8, 9 and 10 are flowcharts illustrating operations of the system according to example embodiments.

FIG. 5 is a flowchart illustrating operations of the system 10 of FIG. 1, according to an example embodiment.

The first user terminal device 101 may receive a user input signal for tagging content in order to recommend the content. According to a user input for tagging the content, the first user terminal device 101 may tag the content, but is not limited thereto. When content is used for a predetermined purpose by a user, the first user terminal device 102 may tag the content according to a preset method. For example, when content is reproduced over a preset number of times, the first user terminal device 102 may tag the content. Also, when content is tagged, the first user terminal device 101 may transmit, to the content providing server 201, a signal for notifying that the content has been tagged (501). In response to the content tagging signal, the content providing server 201 may transmit at least one of content representative information and user information of the first user terminal device 101 to the lock screen management server 200 (503).

The lock screen management server 200 may store the received content representative information, and may request the acquaintance list server 202 for a social friend list of the user of the user terminal device 100 (505). In response to the request of the lock screen management server 200, the acquaintance list server 202 may transmit the social friend list to the lock screen management server 200 (507). The lock screen management server 200 may determine, from the social friend list, at least one social friend to share the received content representative information. For example, the lock screen management server 200 may provide the social friend list to the first user terminal device 101, may receive a list of friends selected by the first user terminal device 101 from the first user terminal device 101, and thus may determine the at least one social friend to share the content representative information. However, the disclosed embodiments are not limited in this respect. Also, when the social friend is determined, the lock screen management server 200 may transmit the content representative information to the second user terminal device 104 of the social friend (509).

In the present example embodiment, the lock screen management server 200 may transmit content display screen information with the content representative information to the second user terminal device 104. The content display screen information may be information indicating a screen on which content received by the second user terminal device 104 is to be displayed. For example, the content display screen information may indicate that the content received by the second user terminal device 104 is to be displayed on a lock screen.

In another example embodiment, the lock screen management server 200 may transmit the content representative information with template information to be displayed on the lock screen to the second user terminal device 104. The template information may include at least one of information about a social friend who recommended content, comment information about the content, information about points accumulated according to a purchase of the content, advertisement information related to purchasing the content, and information about a service company who provides the content. The examples of the template information will be described below in detail with reference to FIGS. 13 through 15.

The second user terminal device 104 may display the content representative information via the display unit 110. The social friend may refer to the content representative information, and may perform a gesture of requesting preview/pre-listen (preview or pre-listen) content. In response to the user's gesture, the second user terminal device 104 may request the lock screen management server 200 for the preview/pre-listen content that corresponds to the content representative information (511). Here, the preview/pre-listen content may be a portion of the content that a user can consume before the user purchases the content. In response to the request of the second user terminal device 104, the lock screen management server 200 may request the preview/pre-listen content from the content providing server 201 (513). In response to the request of the lock screen management server 200, the content providing server 201 may transmit the preview/pre-listen content to the second user terminal device 104 (517).

When the lock screen management server 200 receives a request for the preview/pre-listen content from the second user terminal device 104 (511), the lock screen management server 200 may count a number of times that the preview/pre-listen content has been requested and may store the number in the contents log DB 222 (519).

The second user terminal device 104 may reproduce the preview/pre-listen content. The user is provided the preview/pre-listen content, and if the user wants to purchase the content, the user may perform a gesture for requesting purchase information of the content. In response to the user's gesture, the second user terminal device 104 may transmit a signal for requesting the purchase information of the content to the lock screen management server 200 (521). In response to the request for the purchase information, by the second user terminal device 104, the lock screen management server 200 may transmit a signal for requesting the purchase information of the content to the content providing server 201 (523). In response to the request for the purchase information, by the lock screen management server 200, the content providing server 201 may transmit the purchase information of the content to the lock screen management server 200 (525). The purchase information of the content may be information requested for a purchase of the content, and for example, may include a price of the content, a payment means for the content, a payment method for the content, and/or the like. The lock screen management server 200 may transmit the received purchase information of the content to the second user terminal device 104 (527).

The second user terminal device 104 may display the purchase information of the content. The user may refer to the purchase information of the content, and may determine whether to purchase the content. When the user determines to purchase the content and performs a payment, the second user terminal device 104 may transmit payment information to the content providing server 201 (529). The payment information may include a credit card number of the user, a valid date of a credit card, and/or a secret code of the credit card. Also, the second user terminal device 104 may perform the payment of the content by transmitting the payment information to a payment server (not shown), and may also provide the content providing server 201 with information indicating a payment result from the payment server.

Referring to FIG. 5, a profit creation system may be formed among the first user terminal device 101, the content providing server 201, the lock screen management server 200, the acquaintance list server 202, and the second user terminal device 104. For example, when the first user terminal device 101 tags content so as to recommend the content or receives an advertisement provided by the content providing server 201, the content providing server 201 may provide points to the first user terminal device 101 or the user of the first user terminal device 101. When the provided points are accumulated and thus exceed a preset number of points, the user may purchase a product, may be provided a service, or may use the accumulated points as cash.

Also, when the user of the second user terminal device 104 performs preview/pre-listen on the recommended content or purchases the recommended content, the content providing server 201 may provide points to the first user terminal device 101 or the user of the first user terminal device 101. Also, when the user of the second user terminal device 104 purchases the recommended content, the content providing server 201 may provide points to the first user terminal device 101 or the user of the first user terminal device 101.

The lock screen management server 200 may interoperate with the content providing server 201, and may manage and provide a point provision summary and a point accumulation summary for each user. For example, in operation 517 of FIG. 5, when the user of the second user terminal device 104 is provided the preview/pre-listen content from the content providing server 201 or the lock screen management server 200, the lock screen management server 200 may transmit the point provision summary or the point accumulation summary to the first user terminal device 101. The first user terminal device 101 may provide the user with the received point provision summary or the received point accumulation summary via the display unit 110.

As a result of recommending the content, the user of the first user terminal device 101 may be provided the points or a monetary reward. Also, the user of the second user terminal device 104 may be rapidly provided recent content information preferred by acquaintances.

The content providing server 201 may use the lock screen as a means of providing content, so that the content providing server 201 may easily induce the second user terminal device 104 to access and to purchase the contents. In other words, the content providing server 201 may easily realize marketing of a contents providing service by using recommendation of an acquaintance of the user.

When content is purchased via the lock screen, the lock screen management server 200 may receive a portion of content profit from the content providing server 201. Also, the lock screen management server 200 may collect content recommendation and purchase histories of users, and thus may recognize a content consumption trend of the users, and familiarity among the users.

According to a user's intention of expanding an acquaintance list so as to recommend contents to many acquaintances, the acquaintance list server 202 may increase a frequency of users who access the acquaintance list server 202. Also, information about the contents consumption trend of the users and the familiarity among the users may be provided from the lock screen management server 200.

Figure 6:
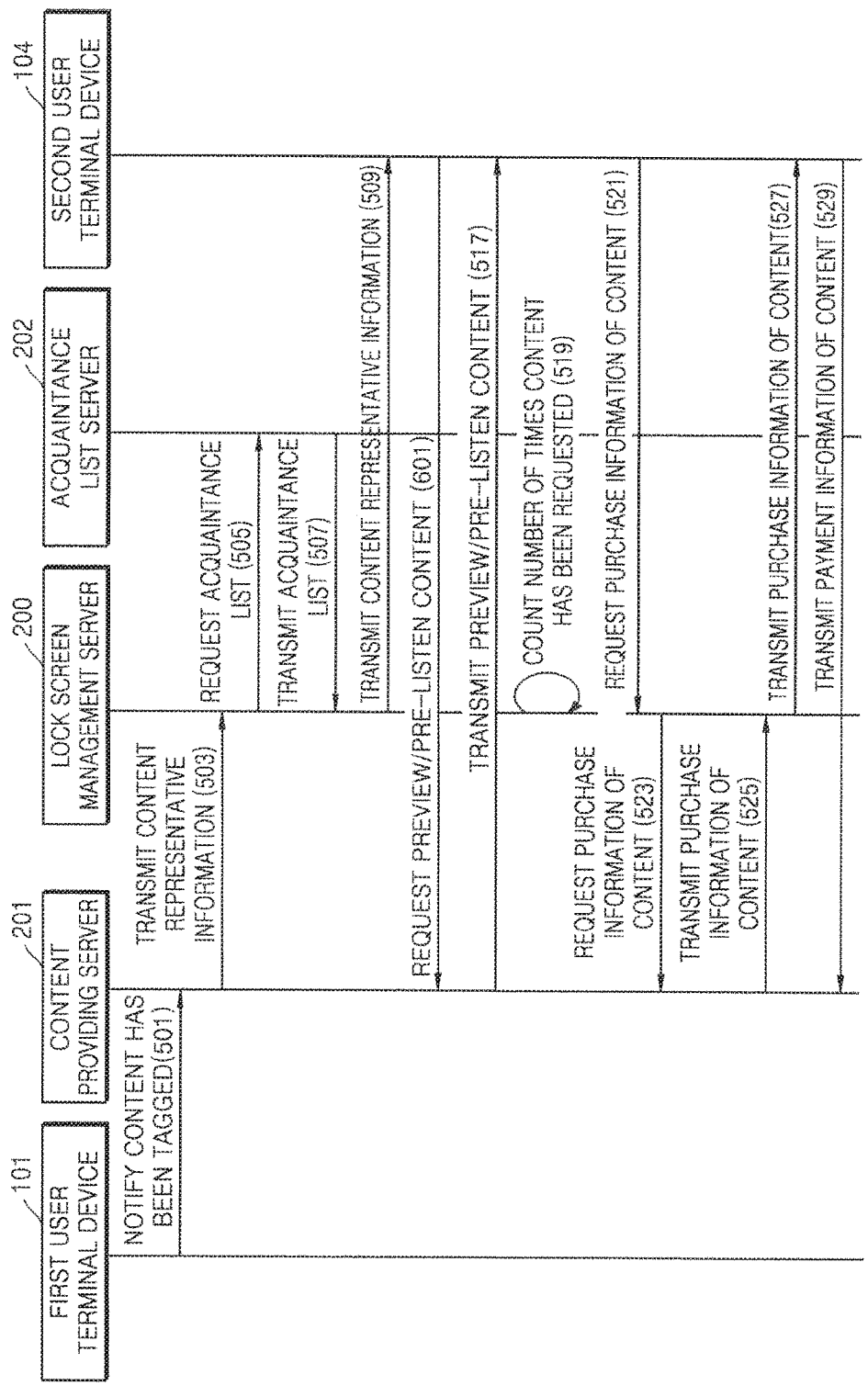

FIG. 6 is a flowchart illustrating operations of the system 10 of FIG. 1 according to another example embodiment.

Referring to FIG. 6, instead of the operations 511 and 513 of FIG. 5, an operation 601 may be performed.

In the operation 601 of FIG. 6, in response to a user's gesture for requesting preview/pre-listen content by referring to content representative information, the second user terminal device 104 may request the content providing server 201 for the preview/pre-listen content that corresponds to the content representative information (601). In response to the request of the second user terminal device 104, the content providing server 201 may transmit the preview/pre-listen content to the second user terminal device 104 (517). Operations before and after the operation 601 are same as the respective operations of FIG. 5, and thus detailed descriptions thereof are omitted here.

Figure 7:
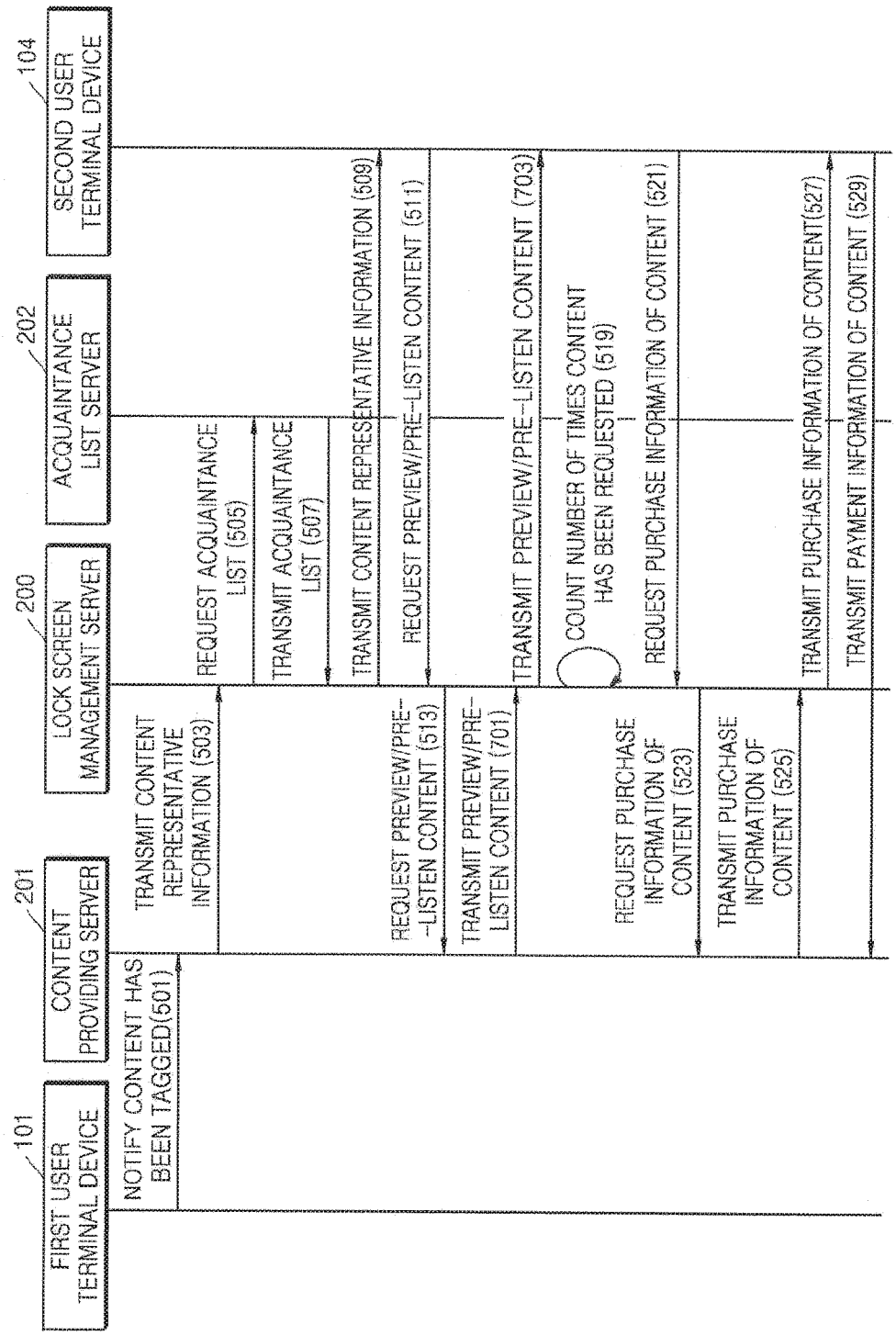

FIG. 7 is a flowchart illustrating operations of the system 10 of FIG. 1, according to another example embodiment.

Referring to FIG. 7, instead of the operation 517 of FIG. 5, operations 701 and 703 may be performed.

In the operation 701 of FIG. 7, in response to a request of the lock screen management server 200, the content providing server 201 may transmit preview/pre-listen content to the lock screen management server 200 (701). The lock screen management server 200 may retransmit the received preview/pre-listen content to the second user terminal device 104 (703). Operations before and after the operations 701 and 703 are same as the respective operations of FIG. 5, and thus detailed descriptions thereof are omitted here.

Figure 8:
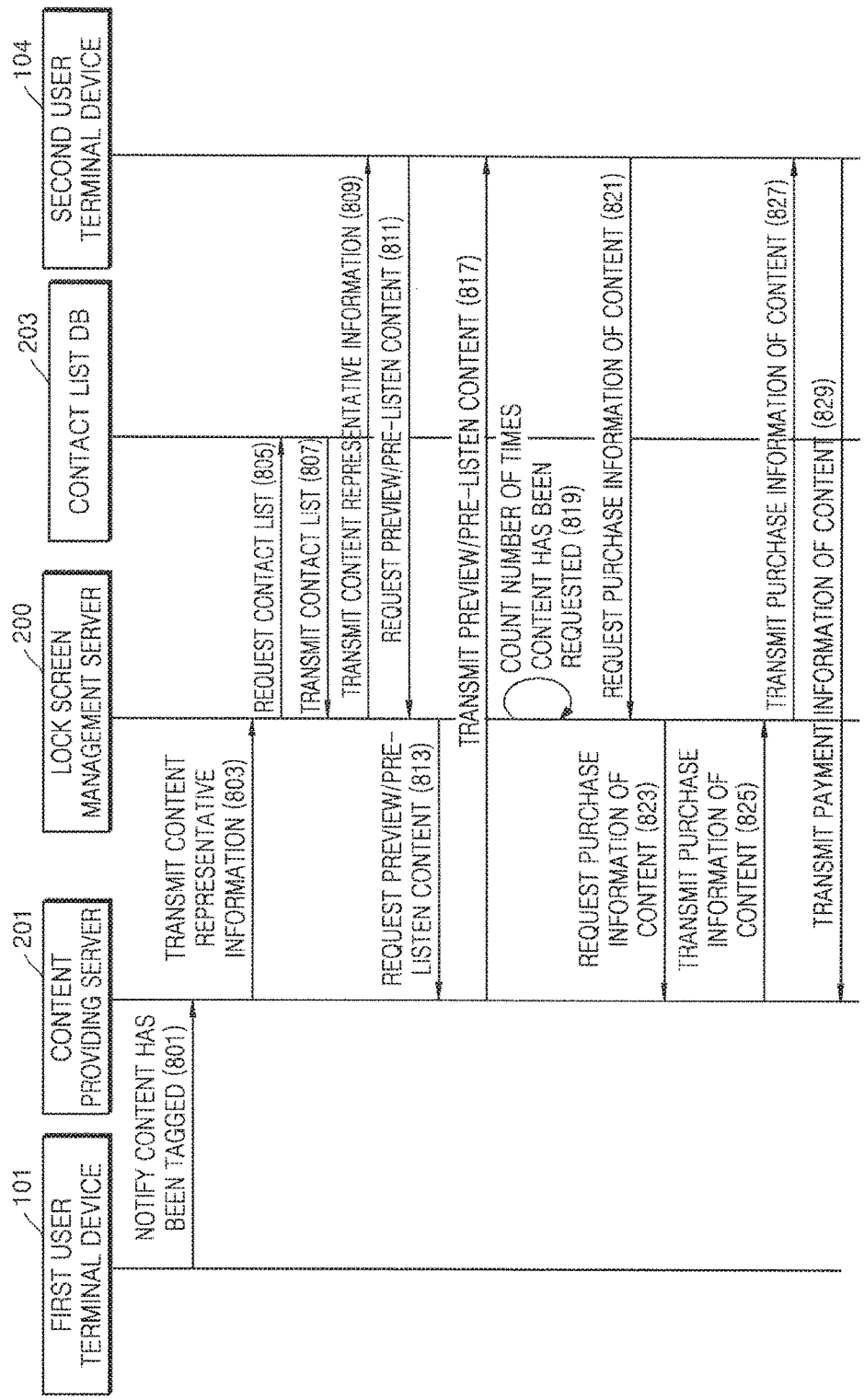

FIG. 8 is a flowchart illustrating operations of the system 10 of FIG. 1, according to another example embodiment.

Referring to FIG. 8, a contact list DB 203 may perform a role of the acquaintance list server 202 of the system 10 of FIG. 1. The contact list DB 203 may correspond to the memory 120 of the first user terminal device 101. The memory 120 of the first user terminal device 101 may include, as a list of acquaintances of a user, a contact list that is managed by telephone numbers. The user may call or may transmit a text to the acquaintances by using the contact list. Also, the contact list DB 203 may correspond to the memory 120 of the second user terminal device 104.

The first user terminal device 101 may transmit, to the content providing server 201, a signal for notifying that content has been tagged (801). In response to the content tagging signal, the content providing server 201 may transmit at least one of content representative information and user information of the first user terminal device 101 to the lock screen management server 200 (803).

The lock screen management server 200 may store the received content representative information, and may request the first user terminal device 101 including the contact list DB 203 for a contact list of the user (805). In response to the request of the lock screen management server 200, the first user terminal device 101 including the contact list DB 203 may transmit the contact list to the lock screen management server 200 (807). The lock screen management server 200 may determine, from the contact list, at least one contact-target subject to share the received content representative information. When the contact-target subject is determined, the lock screen management server 200 may transmit the content representative information to the second user terminal device 104 of the contact-target subject (809).

The second user terminal device 104 may display the content representative information via the display unit 110. The contact-target subject may refer to the content representative information, and may perform a gesture of requesting preview/pre-listen content. In response to the user's gesture, the second user terminal device 104 may request the lock screen management server 200 for the preview/pre-listen content that corresponds to the content representative information (811). In response to the request of the second user terminal device 104, the lock screen management server 200 may request the preview/pre-listen content from the content providing server 201 (813). In response to the request of the lock screen management server 200, the content providing server 201 may transmit the preview/pre-listen content to the second user terminal device 104 (817).

When the lock screen management server 200 receives a request for the preview/pre-listen content from the second user terminal device 104 (811), the lock screen management server 200 may additionally count a number of times that the preview/pre-listen content has been requested and may store the number in the contents log DB 222 (819).

The second user terminal device 104 may reproduce the received preview/pre-listen content. The contact-target subject may be provided the preview/pre-listen content, and if the contact-target subject wants to purchase the content, the contact-target subject may perform a gesture of requesting purchase information of the content. In response to the user's gesture, the second user terminal device 104 may transmit a signal for requesting the purchase information of the content to the lock screen management server 200 (821). In response to the request for the purchase information, by the second user terminal device 104, the lock screen management server 200 may transmit a signal for requesting the purchase information of the content to the content providing server 201 (823). In response to the request for the purchase information, by the lock screen management server 200, the content providing server 201 may transmit the purchase information of the content to the lock screen management server 200 (825). The lock screen management server 200 may transmit the received purchase information of the content to the second user terminal device 104 (827).

The second user terminal device 104 may display the purchase information of the content. The user may refer to the purchase information of the content provided by the second user terminal device 104, and may determine whether to purchase the content. When the user determines to purchase the content and performs a payment, the second user terminal device 104 may transmit payment information to the content providing server 201 (829).

Figure 9:
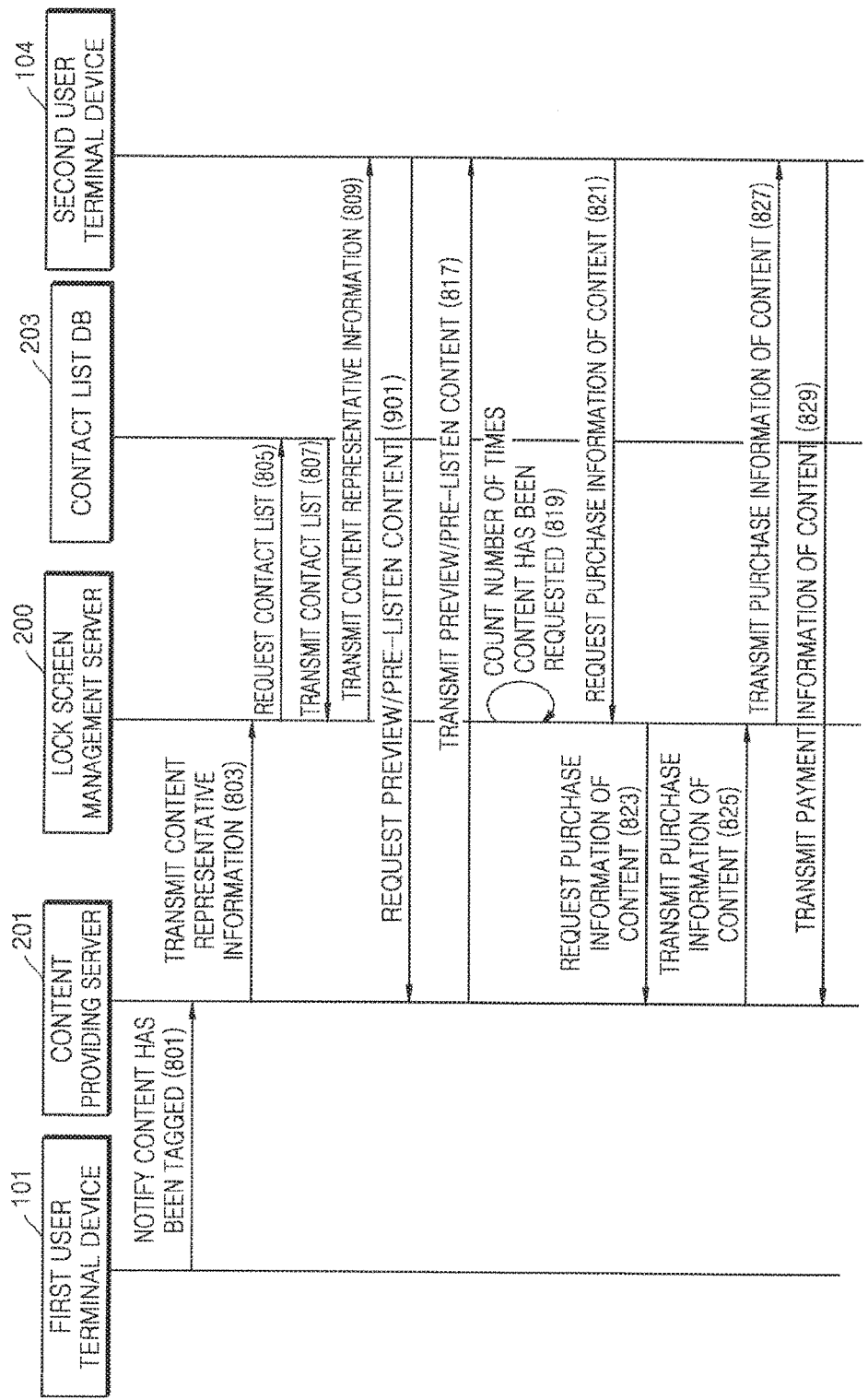

FIG. 9 is a flowchart illustrating operations of the system 10 of FIG. 1, according to another example embodiment.

Referring to FIG. 9, instead of the operations 811 and 813 of FIG. 8, an operation 901 may be performed.

In the operation 901 of FIG. 9, in response to a user's gesture of requesting preview/pre-listen content by referring to content representative information, the second user terminal device 104 may request the content providing server 201 for the preview/pre-listen content that corresponds to the content representative information (901). In response to the request of the second user terminal device 104, the content providing server 201 may transmit the preview/pre-listen content to the second user terminal device 104 (817). Operations before and after the operation 901 are same as the respective operations of FIG. 8, and thus detailed descriptions thereof are omitted here.

Figure 10:
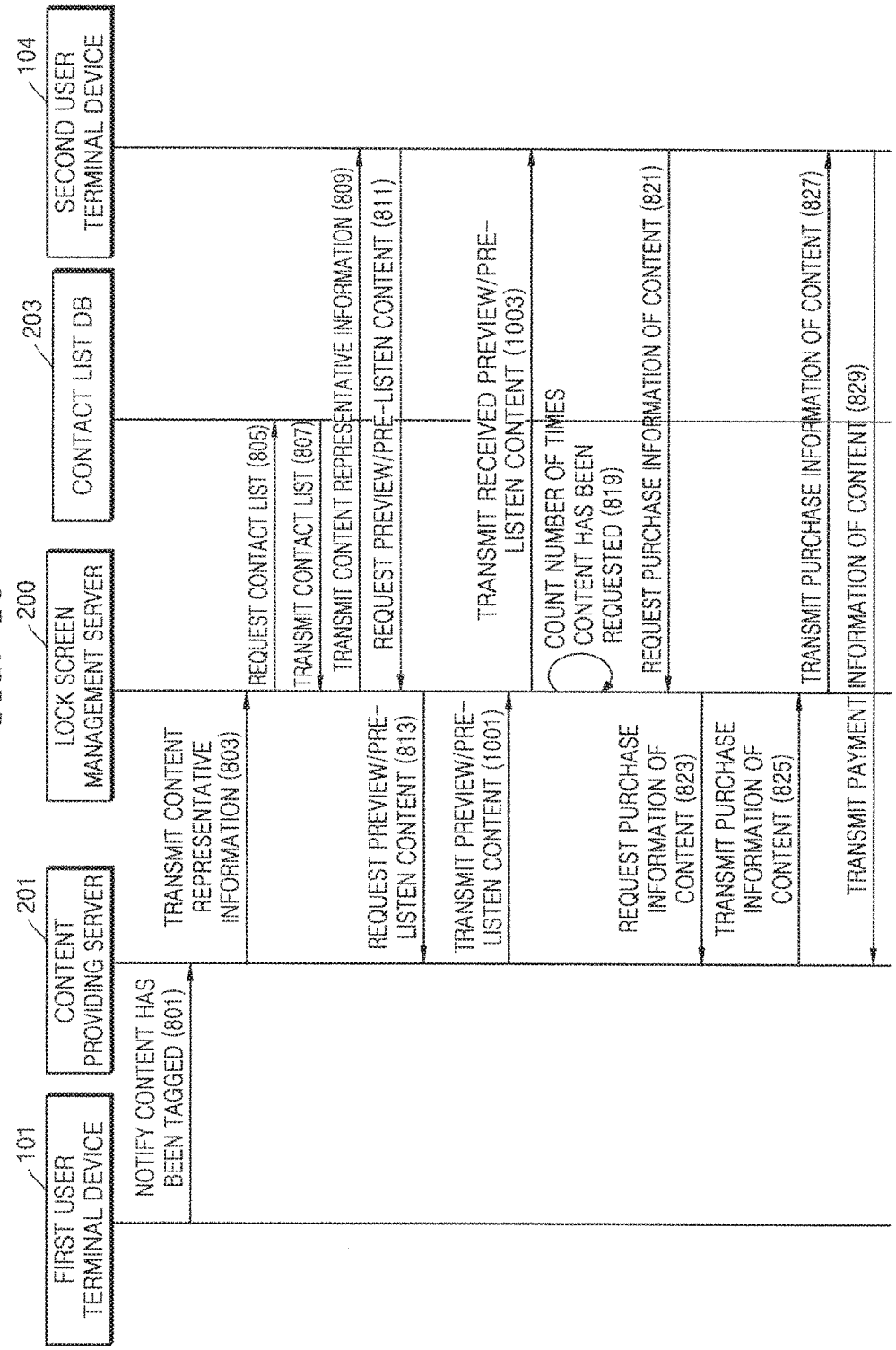

FIG. 10 is a flowchart illustrating operations of the system 10 of FIG. 1, according to another example embodiment.

Referring to FIG. 10, instead of the operation 817 of FIG. 8, operations 1001 and 1003 may be performed.

In the operation 1001 of FIG. 10, in response to a request of the lock screen management server 200, the content providing server 201 may transmit preview/pre-listen content to the lock screen management server 200 (1001). The lock screen management server 200 may retransmit the received preview/pre-listen content to the second user terminal device 104 (1003). Operations before and after the operations 1001 and 1003 are same as the respective operations of FIG. 8, and thus detailed descriptions thereof are omitted here.

Referring to FIGS. 8 through 10, a profit creation system may be formed among the first user terminal device 101, the content providing server 201, the lock screen management server 200, and the second user terminal device 104. This is similar to the profit creation system formed among the first user terminal device 101, the content providing server 201, the lock screen management server 200, the acquaintance list server 202, and the second user terminal device 104, thus, detailed descriptions thereof are omitted here.

The lock screen management server 200 may interoperate with the content providing server 201, and may manage a point provision summary and a point accumulation summary for each user. For example, when the user of the second user terminal device 104 is provided the preview/pre-listen content, the lock screen management server 200 may transmit the point provision summary or the point accumulation summary to the first user terminal device 101.

Figure 11:
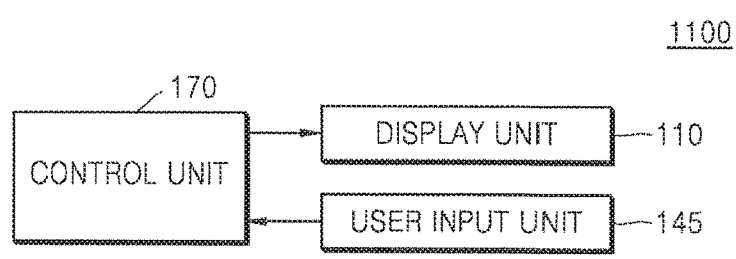
FIG. 11 is a block diagram illustrating a configuration of a user terminal device 1100 according to another example embodiment.

FIG. 11 is a block diagram illustrating a configuration of a user terminal device 1100 according to another example embodiment.

Referring to FIG. 11, a user terminal device 1100 includes the control unit 170, the display unit 110, and the user input unit 145. Examples of structures of the control unit 170, the display unit 110, and the user input unit 145 are already described and detailed descriptions thereof are omitted here.

Referring to FIG. 11, the user input unit 145 may receive an input signal for activating the display unit 110.

Here, the activation of the display unit 110 may include, for example, the display unit 110 changing from a black screen (e.g., non-display) state to a (display) state in which information is provided. Alternatively, a state in which the display unit 110 is reset and is turned on may be included.

The control unit 170, in response to the input signal via the user input unit 145, may control the display unit 110 to display a lock screen. Here, the lock screen may include representative information of content shared by an acquaintance of a user who uses the user terminal device 1100, a first user interface element, and a second user interface element.

When a user input signal is received via the first user interface element, the control unit 170 may control the display unit 110 to display a portion of content and a third user interface element related to purchasing the content.

Also, when a user input signal is received via the second user interface element, the control unit 170 may control the display unit 110 to display an unlock screen or a password input screen, wherein the unlock (e.g., home) screen includes respective shortcut icons of respective applications, and the password input screen is configured to receive an input of a password for proceeding to the unlock screen. The unlock screen may be a screen displayed on the display unit 110 of the first user terminal device 101 when the first user terminal device 101 is "unlocked." Also, for example, the password may include a text and/or a number, but is not limited thereto. For example, the password may be a predetermined pattern.

Figure 12:
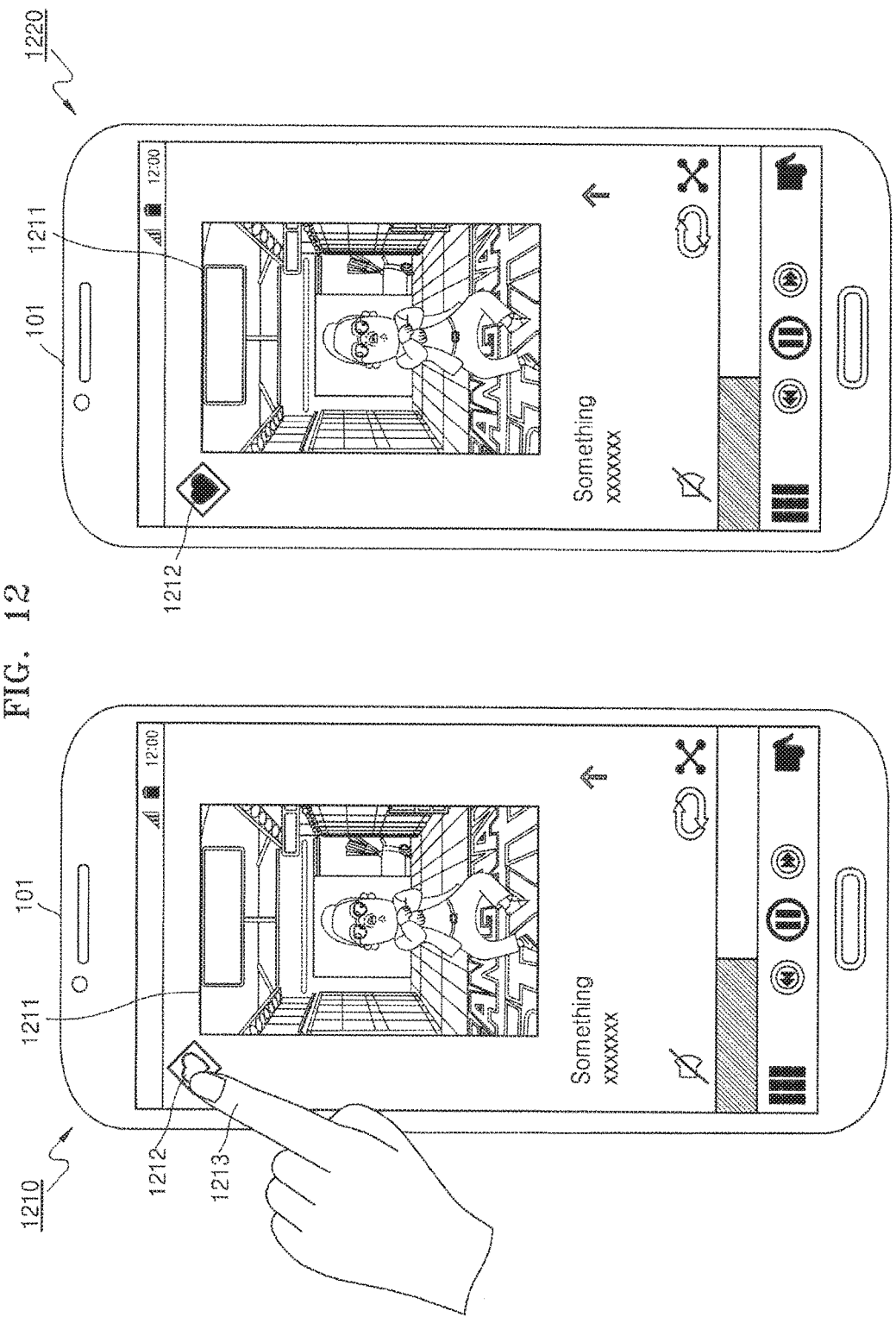
FIG. 12 illustrates screens displayed on a display unit of a first user terminal device according to an example embodiment.

FIG. 12 illustrates screens displayed on the display unit 110 of the first user terminal device 101 according to an example embodiment.

Referring to a reference numeral 1210 of FIG. 12, the control unit 170 of the first user terminal device 101 may display content 1211 on the display unit 110. For example, the content 1211 may be an image, a moving picture, or text. A user interface element 1212 for recommending the content 1211 may be included on the display unit 110 of the first user terminal device 101. For example, the user interface element 1212 may correspond to a 'Feel it' button 1212. 'Feel it' may mean an activity of sharing content that a user wants to enjoy with acquaintances of the user. The control unit 170 of the first user terminal device 101 may receive an input signal for selecting the 'Feel it' button 1212. For example, the input signal may be a signal generated in the touch panel 147 so as to correspond to a tap or touch gesture 1213 of the user on the 'Feel it' button 1212.

Referring to a reference numeral 1220 of FIG. 12, in response to the received input signal, the control unit 170 of the first user terminal device 101 may provide a visual effect indicating recommendation of the content 1211. For example, the control unit 170 of the first user terminal device 101 may display the 'Feel it' button 1212 by varying a color or brightness of the 'Feel it' button 1212 or by highlighting the 'Feel it' button 1212.

In response to 'Feel it' by the user of the first user terminal device 101, a user of the second user terminal device 104 who is an acquaintance of the user may be provided content representative information of the content 1211 that is recommended via a lock screen of the second user terminal device 104. When the user of the second user terminal device 104 purchases recommended content, a predetermined point(s) may be provided to the user of the first user terminal device 101.

Figure 13A:
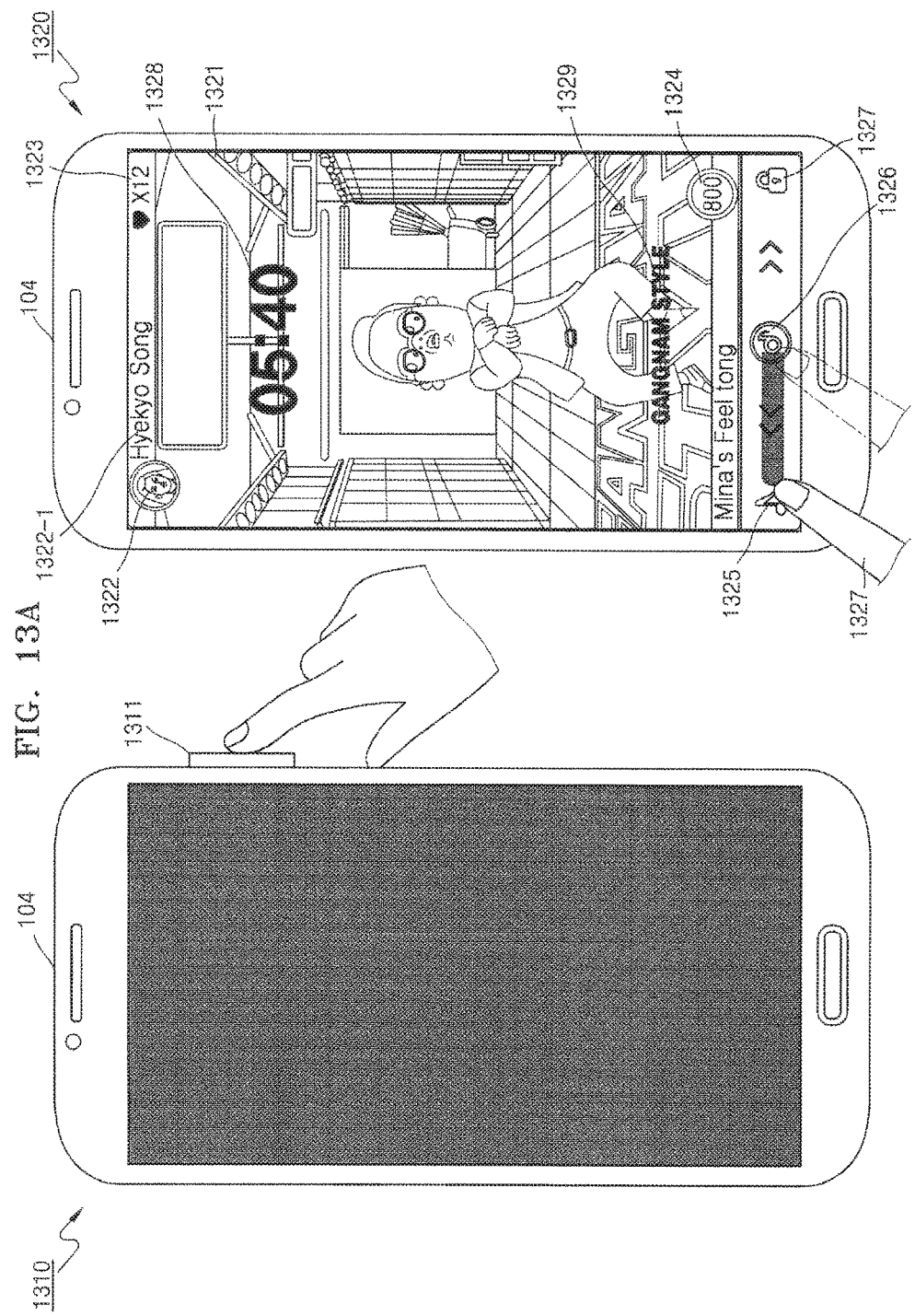
Figure 13B:
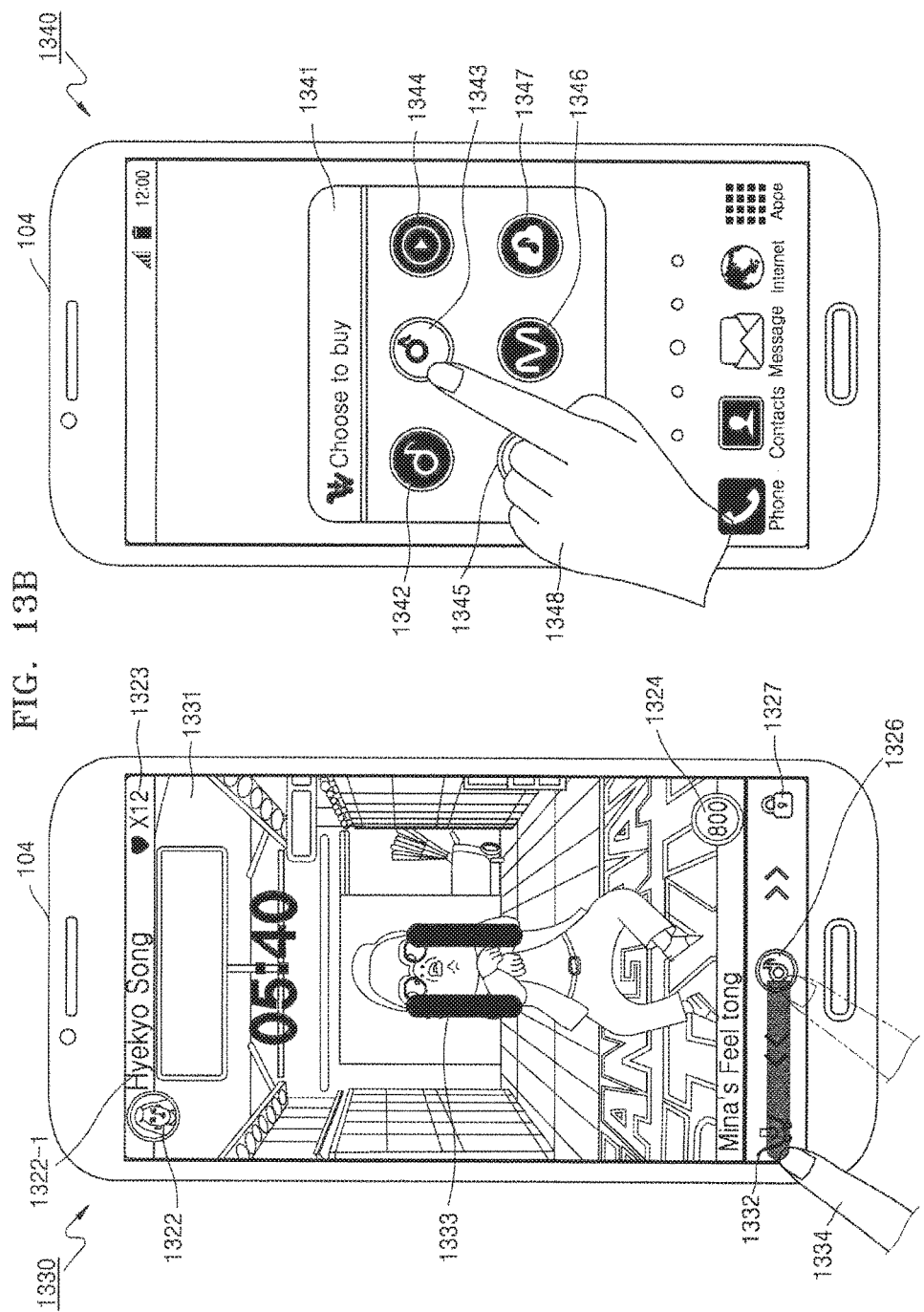

FIGS. 13A through 13C illustrate screens displayed on the display unit 110 of the second user terminal device 104 according to example embodiments.

Referring to a screen 1310 of FIG. 13A, the control unit 170 of the second user terminal device 104 may receive an input of a signal for activating the display unit 110 of the second user terminal device 104. For example, the control unit 170 of the second user terminal device 104 may receive an input signal of selecting (e.g., pressing) a button 1311 arranged on a side of the second user terminal device 104.

Referring to a screen 1320 of FIG. 13A, in response to the received input signal, the control unit 170 of the second user terminal device 104 may display a lock screen on the display unit 110. Here, content representative information 1321 of content recommended by a user of the first user terminal device 101 may be displayed on the lock screen. For example, when the content is music, the content representative information 1321 may correspond to a cover art image 1321 of the music. Also, a clock 1328 that displays current time information, and a title 1329 of the content recommended by the user may be displayed on the lock screen.

The lock screen may include user information 1322 and 1322-1 of the user of the first user terminal device 101 who recommended content. For example, the user information of the first user terminal device 101 may be an image 1322 of the user, a name 1322-1 of the user, a nickname of the user, or the like.

In the present example embodiment, when a user of the second user terminal device 104 selects the image 1322 of the user of the first user terminal device 101, acquaintances' comments about the content displayed on the lock screen may be provided. The comments may be provided as text comments or voice comments. Since the text comments may obstruct an area of the display unit 110 while the content is displayed, the voice comments may be provided via the speaker unit 160 of the second user terminal device 104. The voice comments may be automatically provided when the content representative information 1321 is displayed.

In another example embodiment, when the user of the second user terminal device 104 selects the image 1322 of the user of the first user terminal device 101, a list of other contents recommended by the user of the first user terminal device 101 may be displayed on the display unit 110. For example, when the user selects the image 1322 of the user of the first user terminal device 101, and performs a flick (or swipe) gesture in a downward direction, the other contents on the list recommended by the user of the first user terminal device 101 may be sequentially provided on the display unit 110, according to the flick gesture of the user.

The lock screen may include frequency information 1323 related to the content. The frequency information 1323 may indicate the number of acquaintances who performed previewing/pre-listening of the content displayed on the lock screen. Alternatively, the frequency information 1323 may indicate the number of times the content displayed on the lock screen was recommended by acquaintances. The frequency information 1323 may be counted and managed by the lock screen management server 200.

The lock screen may include point information 1324 of the user of the second user terminal device 104. For example, when the user of the second user terminal device 104 performs previewing/pre-listening of recommended content, or purchases the recommended content, the user may be provided a point(s) from the content providing server 201 or the lock screen management server 200. The point information 1324 may include a point summary and a point accumulation summary about provided points.

The lock screen may include a user interface element (or be configured to receive a user input/gesture) for passing the lock screen and proceeding to a home screen. When an input signal is received via the user interface element, the control unit 170 of the second user terminal device 104 may unlock the second user terminal device 104. Here, for example, an input signal via a first user interface element may correspond to a signal generated in the touch panel 147 by a flick gesture of the user that starts at a contents providing company icon 1326 and moves toward a lock-screen unlock icon 1327, wherein the contents providing company icon 1326 indicates a service company that provides contents.

When a password is not set in the second user terminal device 104, the control unit 170 of the second user terminal device 104 may unlock the device in response to the received input signal, and may display, on the display unit 110, an unlock screen that is a home screen including shortcut icons of application(s) or widget(s). On the other hand, when a password is set in the second user terminal device 104, the control unit 170 of the second user terminal device 104 may display, in response to the received input signal, another lock screen including a user interface element for receiving an input of the password on the display unit 110.

The lock screen may include a user interface element for performing previewing/pre-listening of content. The control unit 170 of the second user terminal device 104 may receive an input signal via the user interface element. For example, the input signal may correspond to a signal generated in the touch panel 147 by a flick gesture 1327 of the user that starts at the contents providing company icon 1326 and moves toward a preview/pre-listen icon 1325.

Referring to a screen 1330 of FIG. 13B, in response to a received input signal, the control unit 170 of the second user terminal device 104 may control the display unit 110 to display a lock screen including preview/pre-listen content 1331. Here, the preview/pre-listen content 1331 may correspond to a portion of content.

The lock screen including the preview/pre-listen content 1331 may further include at least one of user information 1322 and 1322-1 of a user of the first user terminal device 101 who recommended the content, frequency information 1323 indicating the number of acquaintances who performed preview/pre-listen, point information 1324 of a user, and a user interface element for passing the lock screen and entering a home screen. Also, the lock screen on which the preview/pre-listen content 1331 is provided may include a user interface element for controlling the preview/pre-listen content 1331. For example, the user interface element may include a control button 1333 for pausing the preview/pre-listen content 1331 that is being reproduced. Alternatively, a control button for resuming reproduction of the paused preview/pre-listen content 1331 may be included. Alternatively, a control button for rapidly or slowly reproducing the preview/pre-listen content 1331 that is being reproduced may be included.

The lock screen on which the preview/pre-listen content 1331 is provided may include a user interface element for purchasing content. The control unit 170 of the second user terminal device 104 may receive an input signal via the user interface element. For example, the input signal may correspond to a signal generated in the touch panel 147 by a flick gesture 1334 of a user that starts at the contents providing company icon 1326 and moves toward a purchase icon 1332.

Referring to a screen 1340 of FIG. 13B, in response to the input signal, the control unit 170 of the second user terminal device 104 may control the display unit 110 to display a purchase window 1341 including shortcut icons 1342 through 1347 of purchase applications capable of and operable for purchasing contents. The control unit 170 of the second user terminal device 104 may receive an input signal of selecting an ion 1343 from among the shortcut icons 1342 through 1347. For example, the input signal may be a signal generated in the touch panel 147 by a user's tap or touch gesture 1348 on the ion 1343.

Referring to a screen 1350 of FIG. 13C, when a password for proceeding to a home screen is set in the second user terminal device 104, the control unit 170 of the second user terminal device 104 may control display unit 110 to display, in response to a received input signal, another lock screen 1351 including a user interface element for receiving an input of the password. For example, the other lock screen 1351 may display the user interface element for receiving an input of a pattern as the password. The control unit 170 of the second user terminal device 104 may receive an input signal for inputting the password via the user interface element. For example, the input signal may be a signal generated in the touch panel 147 by a drag gesture 1352 of a user who inputs the pattern.

In another example embodiment, when a password for entering the home screen is not set in the second user terminal device 104, the control unit 170 of the second user terminal device 104 may skip the screen 1350 of FIG. 13C, and may control display unit 110 to display, in response to the input signal of selecting the ion 1343 from the screen 1340 of FIG. 13B, a screen 1360 of FIG. 13C.

Referring to the reference numeral 1360 of FIG. 13C, in response to the received input signal, the control unit 170 of the second user terminal device 104 may execute a purchase application corresponding to the icon 1343 selected by the user from the screen 1340 of FIG. 13B, and may provide a purchase screen 1361 for purchasing content to the display unit 110. The user may purchase, via the purchase screen 1361, the content that was provided on the lock screen.

In another example embodiment, when a password for entering the home screen is not set, the control unit 170 of the second user terminal device 104 may skip the screen 1350 of FIG. 13C.

That is, the control unit 170 of the second user terminal device 104 may execute a purchase application corresponding to the selected icon 1343, in response to the input signal for selecting the icon 1343 from the screen 1340 of FIG. 13B, and may directly provide, on the display unit 110, the purchase screen 1361 for allowing the user to purchase the content.

In another example embodiment, when a purchase application capable of purchasing content is previously determined, the control unit 170 of the second user terminal device 104 may skip the screen 1340 of FIG. 13B and the screen 1350 of FIG. 13C.

That is, in response to the flick gesture 1334 of the user on the screen 1330 of FIG. 13B, the control unit 170 of the second user terminal device 104 may directly provide, on the display unit 110, the purchase screen 1361 for allowing the user to purchase content.

According to the descriptions, contents are directly purchased, by using the user interface elements provided on the lock screens by the second user terminal device 104, but are not limited thereto. The second user terminal device 104 may display, on a lock screen, a user interface element for storing content in a wish list, and may store the content in the wish list, based on a user input via the displayed user interface element. In this case, a predetermined purchase application for storing the content in the wish list may be executed.

Figure 14:
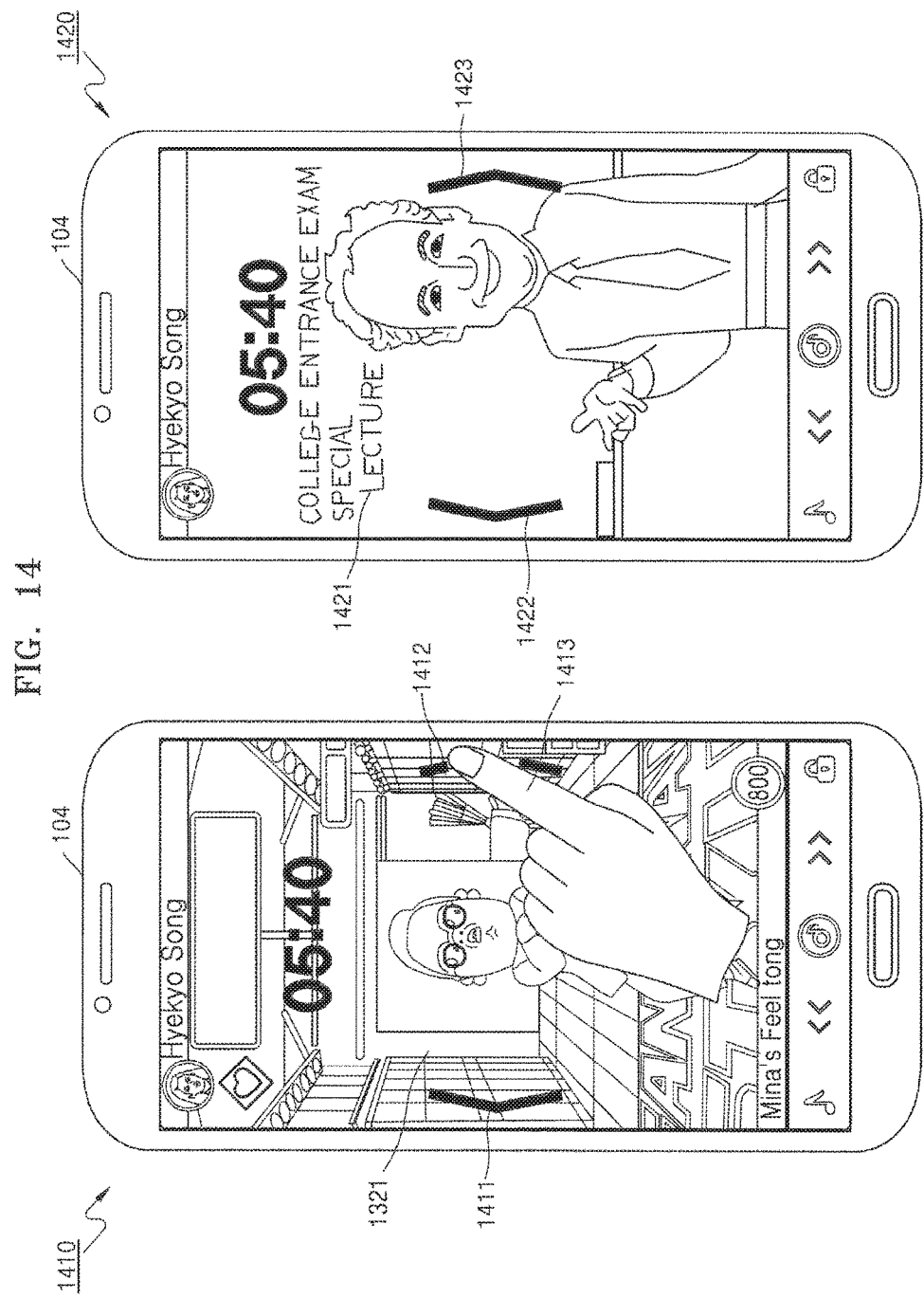
FIG. 14 illustrates screens displayed on the display unit of the second user terminal device according to another example embodiment.

FIG. 14 illustrates screens displayed on the display unit 110 of the second user terminal device 104 according to another example embodiment.

Referring to a screen 1410 of FIG. 14, the control unit 170 of the second user terminal device 104 may display a lock screen on the display unit 110. Content representative information 1321 of content recommended by a user of the first user terminal device 101 may be displayed on the lock screen. Also, the lock screen may include content representative information conversion buttons 1411 and 1412 for receiving other content representative information. The control unit 170 of the second user terminal device 104 may receive an input signal for selecting one of the content representative information conversion buttons 1411 and 1412. For example, the input signal may correspond to a signal generated in the touch panel 147 by a tap or touch gesture 1413 of the user on the content representative information conversion button 1412.

Referring to a screen 1420 of FIG. 14, in response to the input signal, the control unit 170 of the second user terminal device 104 may display other content representative information 1421 on the display unit 110. The other content representative information 1421 may be content recommended by the user of the first user terminal device 101, or may be content recommended by another acquaintance. Also, contents may indicate various types of multimedia content. For example, the content may be one of music, sports, user-created contents (UCC), education, a recipe, a video-on-demand (VOD), a music video, webtoon, news, podcast, a coupon, a book, e-commerce contents, and social contents.

Content representative information may be updated. For example, the content representative information may be periodically updated at regular intervals, or may be updated when the user activates the display unit 110 of the first user terminal device 101.

The control unit 170 of the second user terminal device 104 may display content representative conversion buttons 1422 and 1423 for receiving other content representative information on the display unit 110. When the user selects the content representative conversion button 1423, the control unit 170 of the second user terminal device 104 may display the other content representative information on the display unit 110. On the other hand, when the user selects the content representative conversion button 1422, the control unit 170 of the second user terminal device 104 may re-display the content representative information 1321 that was displayed on the display unit 110 before the other content representative information 1421 is displayed.

In the present example embodiment, a plurality of pieces of content representative information may be previously stored in the memory 120 of the second user terminal device 104, or when the user selects one of the content representative conversion buttons 1422 and 1423, the plurality of pieces of content representative information may be obtained from the lock screen management server 200 or the content providing server 201 and may be displayed on the display unit 110.

In another example embodiment, the plurality of pieces of content representative information may be sequentially displayed in correspondence with user's selection of the content representative conversion buttons 1422 and 1423. However, when the display unit 110 is deactivated and then is reactivated, the plurality of pieces of content representative information may be provided in a random order on the lock screen displayed on the display unit 110.

Figure 15A:
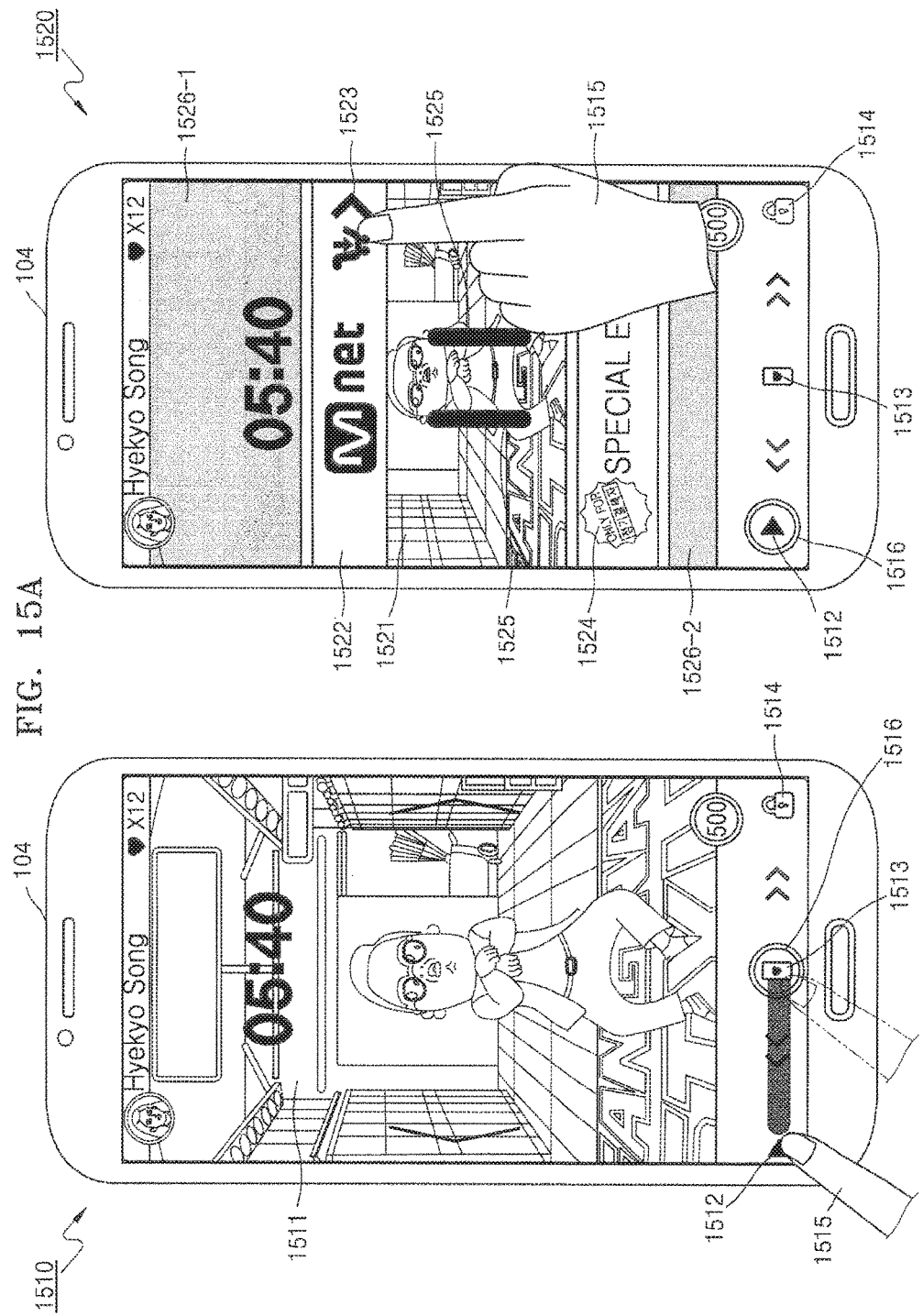
FIGS. 15A and 15B illustrate screens displayed on the display unit of the second user terminal device according to other example embodiments.
Figure 15B:
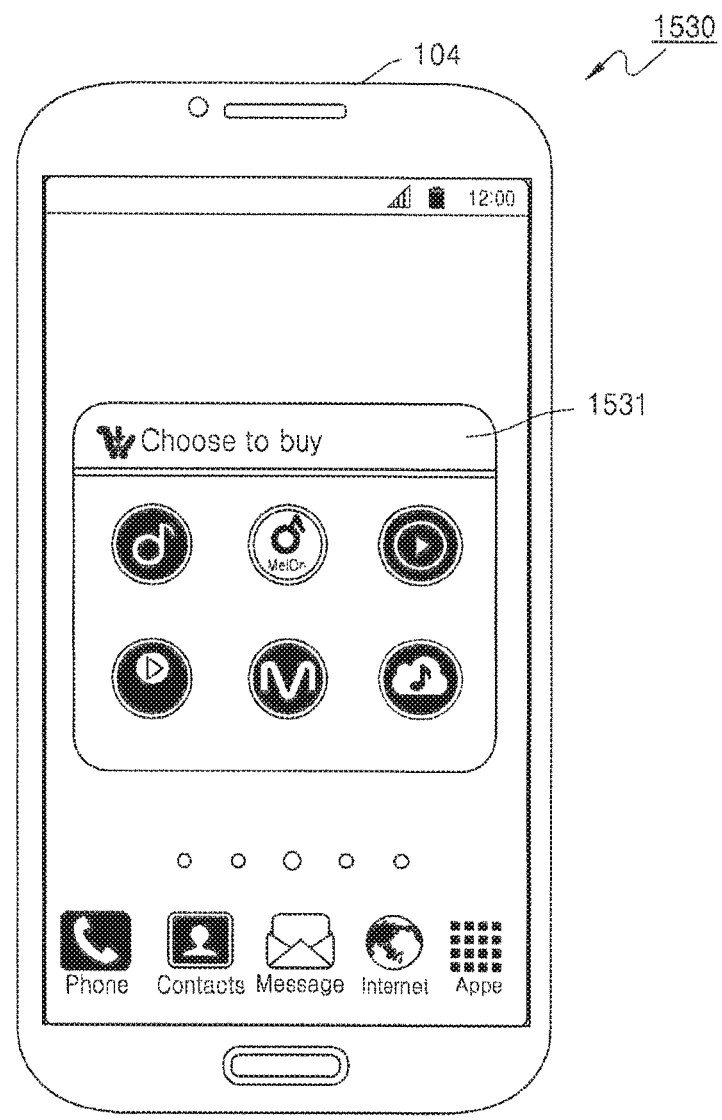

FIGS. 15A and 15B illustrate screens displayed on the display unit 110 of the second user terminal device 104 according to other example embodiments.

Referring to a screen 1510 of FIG. 15A, the control unit 170 of the second user terminal device 104 may display a lock screen on the display unit 110. Content representative information 1511 of content recommended by a user of the first user terminal device 101 may be displayed on the lock screen. Also, the lock screen may include a preview/pre-listen icon 1512, a content representative information display icon 1513, and a lock-screen unlock icon 1514.

The lock screen may include a user interface element for performing previewing/pre-listening of content. The control unit 170 of the second user terminal device 104 may receive an input signal via the user interface element. For example, the input signal may correspond to a signal generated in the touch panel 147 by a flick gesture 1515 of a user that starts at the content representative information display icon 1513 and moves toward the preview/pre-listen icon 1512.

Referring to a screen 1520 of FIG. 15A, in response to the received input signal, the control unit 170 of the second user terminal device 104 may provide the lock screen including preview/pre-listen content 1521 to the display unit 110. Here, a graphic pattern 1516 that was displayed around the content representative information display icon 1513 according to the flick gesture 1515 of the user may be displayed around the preview/pre-listen icon 1512. The graphic pattern 1516 may be moved together according to the flick gesture 1515 of the user, and may indicate a state of a screen displayed on the display unit 110 of the second user terminal device 104. For example, when the graphic pattern 1516 is displayed around the content representative information display icon 1513, content representative information may be displayed on the display unit 110 of the second user terminal device 104. Also, when the graphic pattern 1516 is displayed around the preview/pre-listen icon 1512, preview/pre-listen content may be displayed on the display unit 110 of the second user terminal device 104.

The control unit 170 of the second user terminal device 104 may display at least one of content provision information 1522 and advertisement information 1524 on the display unit 110 of the second user terminal device 104. When the content provision information 1522 and the advertisement information 1524 are displayed together, an area of the preview/pre-listen content 1521 displayed on the display unit 110 may be decreased. Also, in background areas 1526-1 and 1526-2 of the lock screen, the content representative information 1511, and the content representative information 1511 to which a filter effect (e.g., a dim effect or blur) is applied may be displayed.

The content provision information 1522 may include information related to a service company that provides contents or a server that provides contents. For example, the information related to the service company or the server may be a company name, a logo, a website address, or application information. Also, the content provision information 1522 may include a user interface element 1523 for purchasing contents. For example, the user interface element 1523 may correspond to a purchase button 1523.

For example, the advertisement information 1524 may include advertisement information related to contents. For example, the advertisement information 1524 may include event information 1524 or coupon information for purchasing contents with a discount.

Also, the control unit 170 of the second user terminal device 104 may display a user interface element 1525 for controlling the preview/pre-listen content 1331 on the display unit 110. In the present example embodiment, when reproduction of the preview/pre-listen content 1331 is paused via the user interface element 1525, the content provision information 1522 or the advertisement information 1524 may be displayed on the display unit 110. When the preview/pre-listen content 1331 is being reproduced, the content provision information 1522 or the advertisement information 1524 may be removed from the display unit 110.

The control unit 170 of the second user terminal device 104 may receive an input signal for selecting the purchase button 1523. The input signal may correspond to a signal generated in the touch panel 147 by a tap or touch gesture 1515 of the user on the purchase button 1523.

Referring to a screen 1530 of FIG. 15B, in response to the received input signal, the control unit 170 of the second user terminal device 104 may display, on the display unit 110, a purchase window 1531 including shortcut icons of purchase applications capable of and operable for purchasing the contents.

In the present example embodiment, in the screen 1520 of FIG. 15A, when an input signal of selecting the content representative information display icon 1513 is received, the control unit 170 of the second user terminal device 104 may re-display the content representative information 1511 on the display unit 110.

FIGS. 16A through 16E illustrate help screens displayed on display unit 110 of the second user terminal device 104 according to example embodiments.

Referring to a screen 1610 of FIG. 16A, when a setting for providing acquaintance-recommended content via a lock screen is completed, the control unit 170 of the second user terminal device 104 may display a button 1611 for providing a help screen or help 1612 for providing detailed information about information displayed on the lock screen. For example, the help 1612 may include a service company or a contents providing server where points may be used, and points usage information, as detailed information about the point information 1324. In the present example embodiment, when the lock screen that provides the acquaintance-recommended content is first activated, the point information 1324 may include point scores that are provided as a default.

The control unit 170 of the second user terminal device 104 may receive an input signal for selecting the button 1611 for providing a help screen. For example, the input signal may correspond to a signal generated in the touch panel 147 by a tap or touch gesture 1613 of a user on the button 1611.

Referring to a screen 1620 of FIG. 16A, in response to the received input signal, the control unit 170 of the second user terminal device 104 may provide a help screen 1621 to the display unit 110. The help screen 1621 may include help 1622 that explains information displayed on the lock screen. The help screen 1621 may include an experience button 1624 that provides a procedure of experiencing the present example embodiment.

The control unit 170 of the second user terminal device 104 may receive an input signal for selecting the experience button 1624. For example, the input signal may correspond to a signal generated in the touch panel 147 by a tap or touch gesture 1625 of a user on the experience button 1624.

Figure 16B:
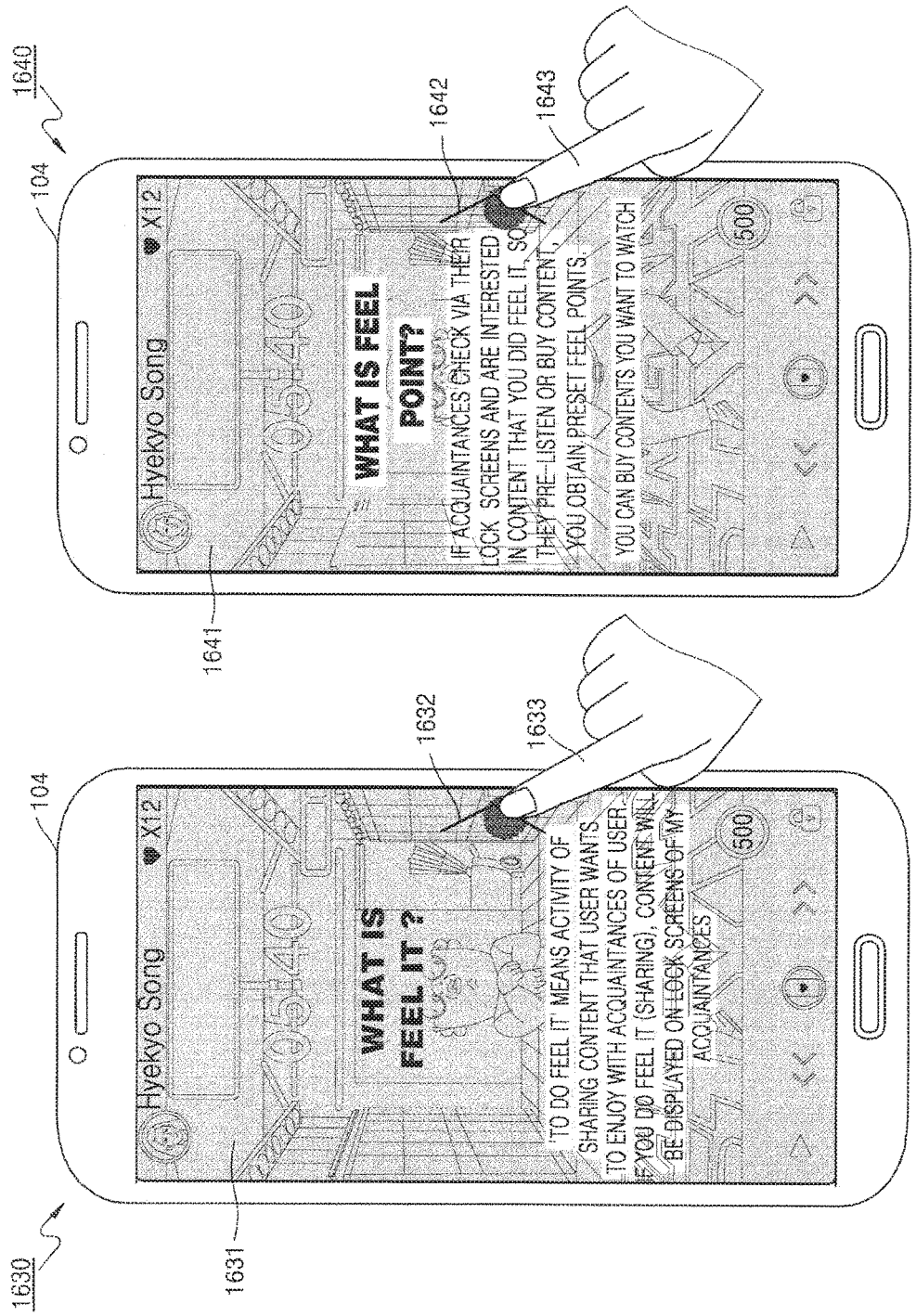

Referring to a screen 1630 of FIG. 16B, in response to the received input signal, the control unit 170 of the second user terminal device 104 may provide a help screen 1631 to the display unit 110. For example, the help screen 1631 may include help for explaining a meaning of 'Feel it' as an activity of the user who recommends contents. The help screen 1631 may include a next experience button 1632 for providing a next help screen.

The control unit 170 of the second user terminal device 104 may receive an input signal of selecting the next experience button 1632. For example, the input signal may correspond to a signal generated in the touch panel 147 by a tap or touch gesture 1633 of the user on the next experience button 1632.

Referring to a screen 1640 of FIG. 16B, in response to the received input signal, the control unit 170 of the second user terminal device 104 may provide a next help screen 1641 to the display unit 110. For example, the next help screen 1641 may include help for explaining a meaning of 'Feel Point' that is provided when content is previewed/pre-listened or is purchased. The help screen 1641 may include a next experience button 1642 for providing a next help screen.

The control unit 170 of the second user terminal device 104 may receive an input signal for selecting the next experience button 1642. For example, the input signal may correspond to a signal generated in the touch panel 147 by a tap or touch gesture 1643 of the user on the next experience button 1642.

Figure 16C:
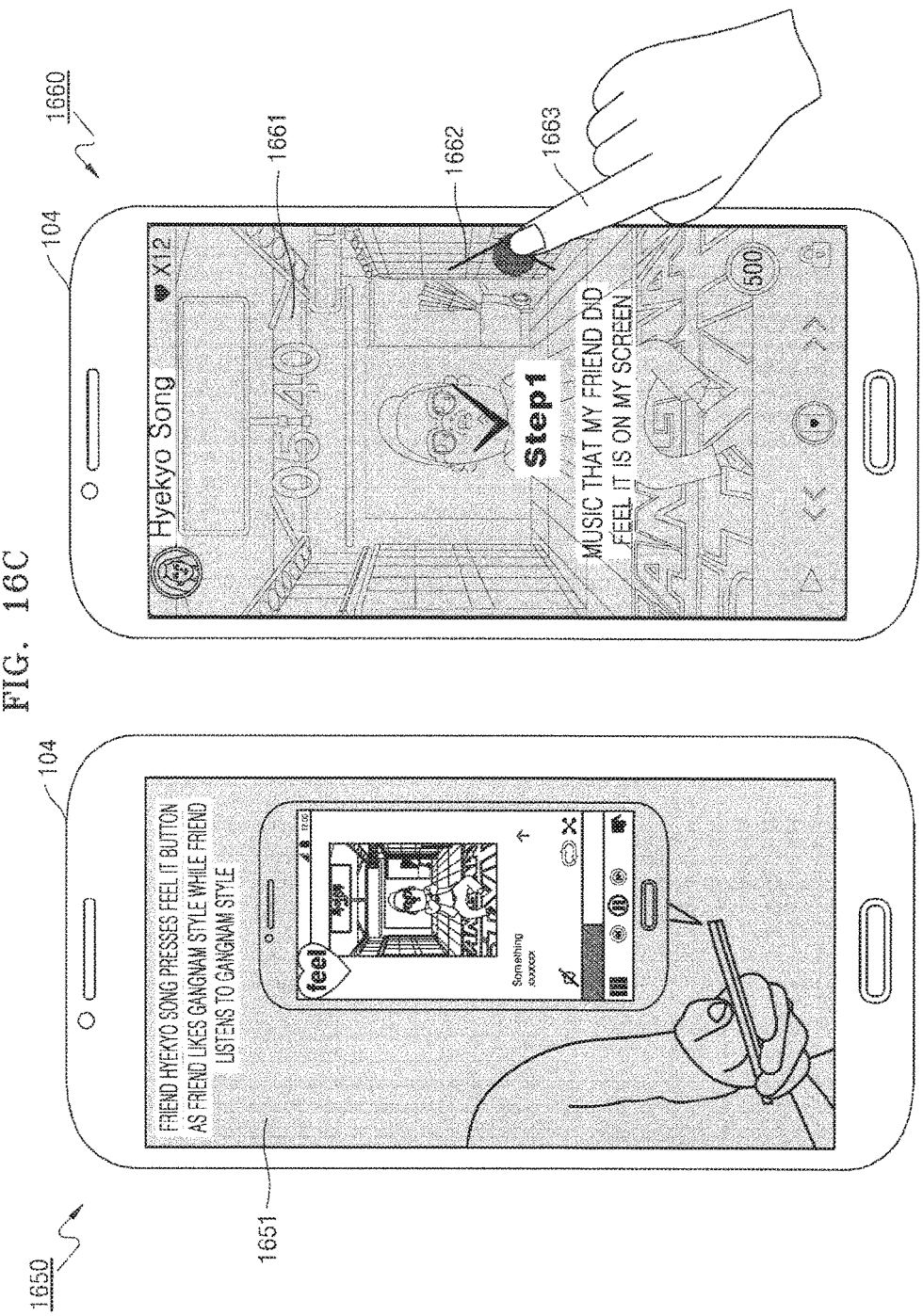

Referring to a screen 1650 of FIG. 16C, in response to the received input signal, the control unit 170 of the second user terminal device 104 may provide a next help screen 1651 to the display unit 110. The next help screen 1651 may include an image or a moving picture of selecting a 'Feel it' button as a way of recommending content to an acquaintance, by the user of the first user terminal device 101. The control unit 170 of the second user terminal device 104 may automatically provide a next help screen after a predetermined time.

Referring to a screen 1660 of FIG. 16C, the control unit 170 of the second user terminal device 104 may provide a next help screen 1661 to the display unit 110. The next help screen 1661 may include an image or a moving picture of displaying content recommended by an acquaintance. The next help screen 1661 may include a next experience button 1662 for providing a next help screen.

The control unit 170 of the second user terminal device 104 may receive an input signal for selecting the next experience button 1662. For example, the input signal may correspond to a signal generated in the touch panel 147 by a tap or touch gesture 1663 of the user on the next experience button 1662.

Figure 16D:
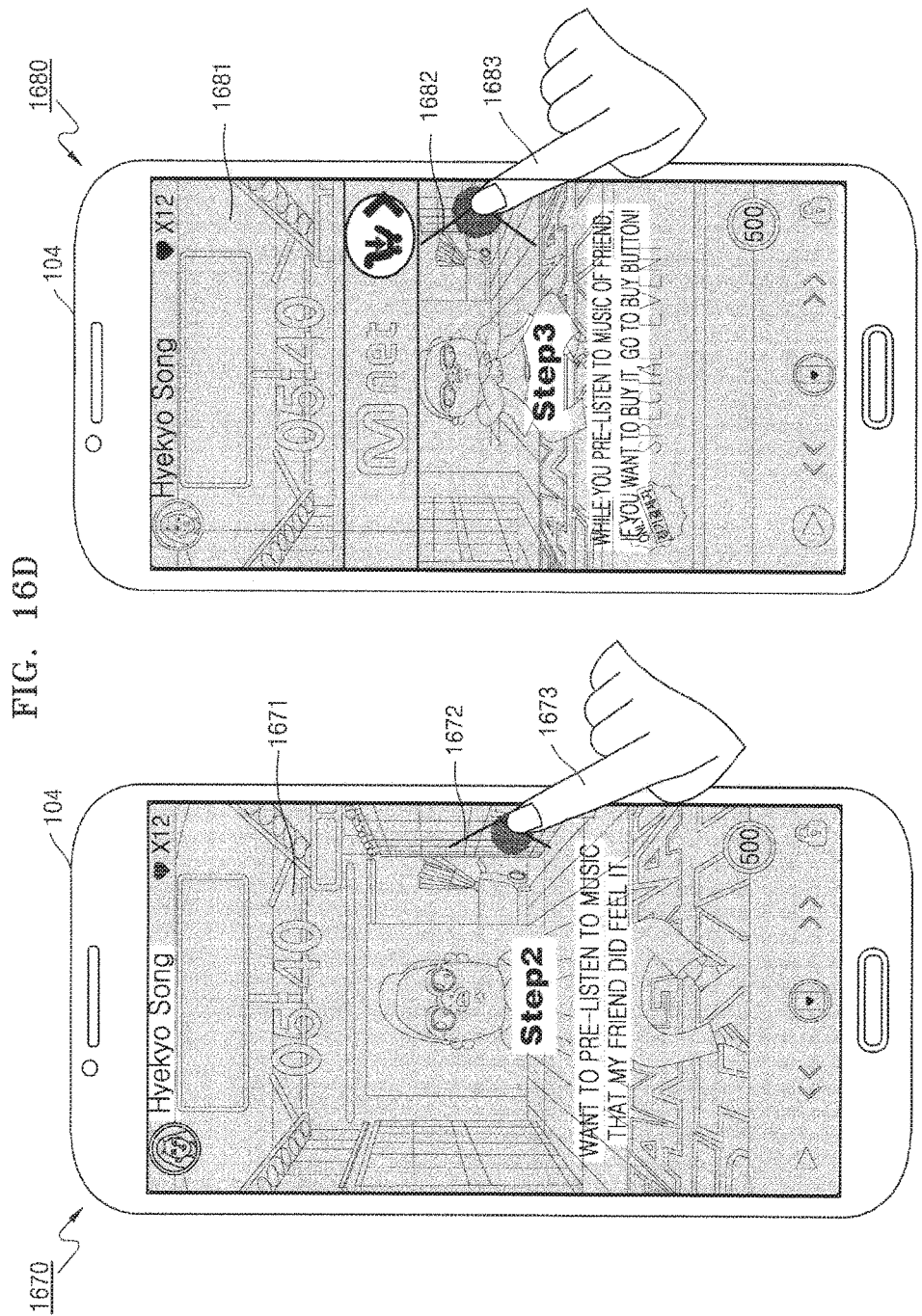

Referring to a screen 1670 of FIG. 16D, in response to the received input signal, the control unit 170 of the second user terminal device 104 may provide a next help screen 1671 to the display unit 110. The next help screen 1671 may include an image or a moving picture of performing a user gesture so as to perform previewing/pre-listening of recommended content. The next help screen 1671 may include a next experience button 1672 for providing a next help screen.

The control unit 170 of the second user terminal device 104 may receive an input signal for selecting the next experience button 1672. For example, the input signal may correspond to a signal generated in the touch panel 147 by a tap or touch gesture 1673 of the user on the next experience button 1672.

Referring to a screen 1680 of FIG. 16D, in response to the received input signal, the control unit 170 of the second user terminal device 104 may provide a next help screen 1681 to the display unit 110. The next help screen 1681 may include an image or a moving picture of performing a user gesture so as to purchase the recommended content. The next help screen 1681 may include a next experience button 1682 for providing a next help screen.

The control unit 170 of the second user terminal device 104 may receive an input signal for selecting the next experience button 1682. For example, the input signal may correspond to a signal generated in the touch panel 147 by a tap or touch gesture 1683 of the user on the next experience button 1682.

Figure 16E:
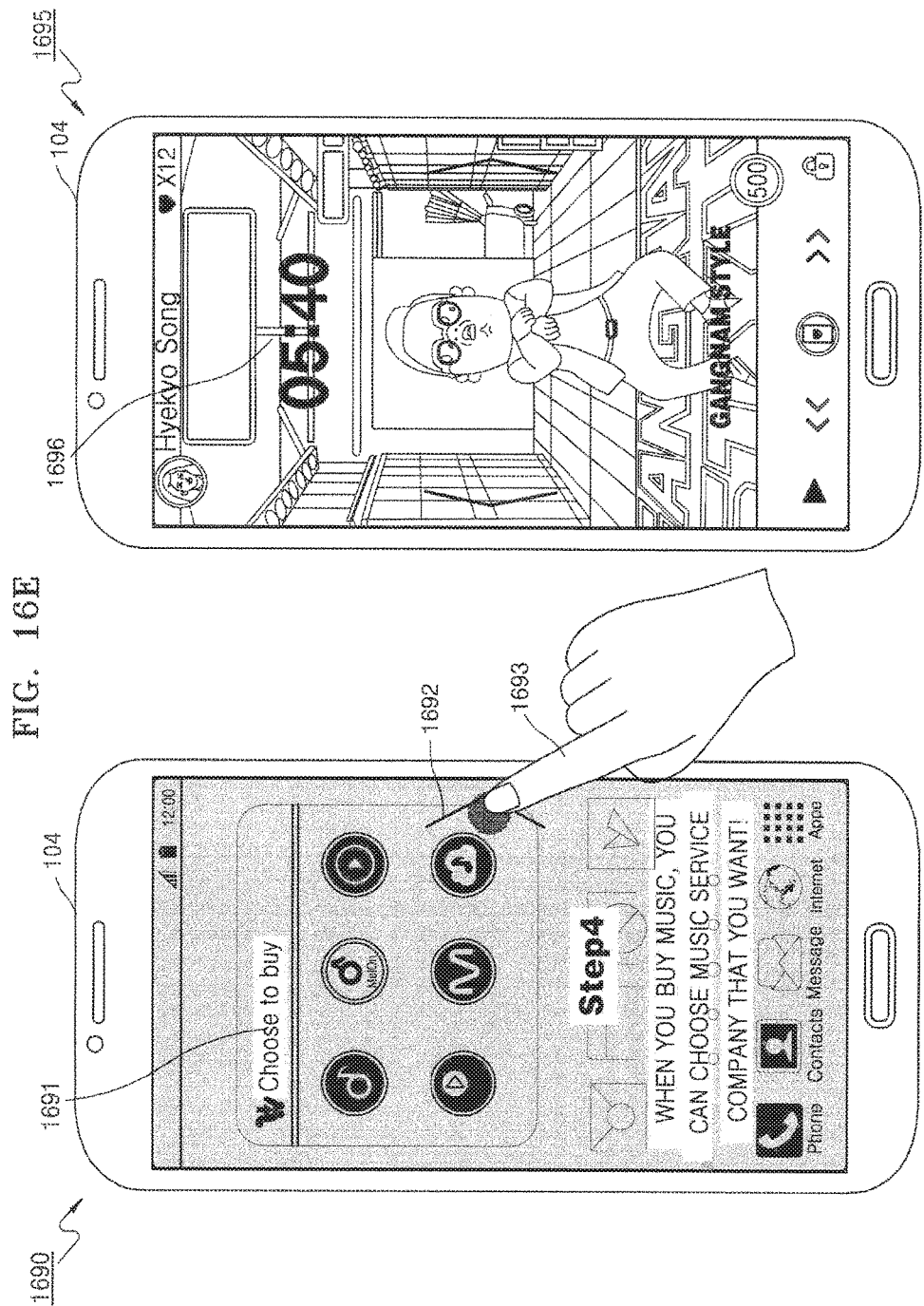

Referring to a screen 1690 of FIG. 16E, in response to the received input signal, the control unit 170 of the second user terminal device 104 may provide a next help screen 1691 to the display unit 110. The next help screen 1691 may include an image or a moving picture including a method for selecting purchase applications capable of purchasing contents. The next help screen 1691 may include a next experience button 1692 for providing a next help screen.

Referring to a screen 1695 of FIG. 16E, in response to the received input signal, the control unit 170 of the second user terminal device 104 may end providing help screens to the display unit 110. As a result of ending the help screen, a lock screen 1696 including content representative information may be displayed again on the display unit 110. The user may perform a function included in the lock screen 1696, based on the aforementioned help screens.

Figure 17A:
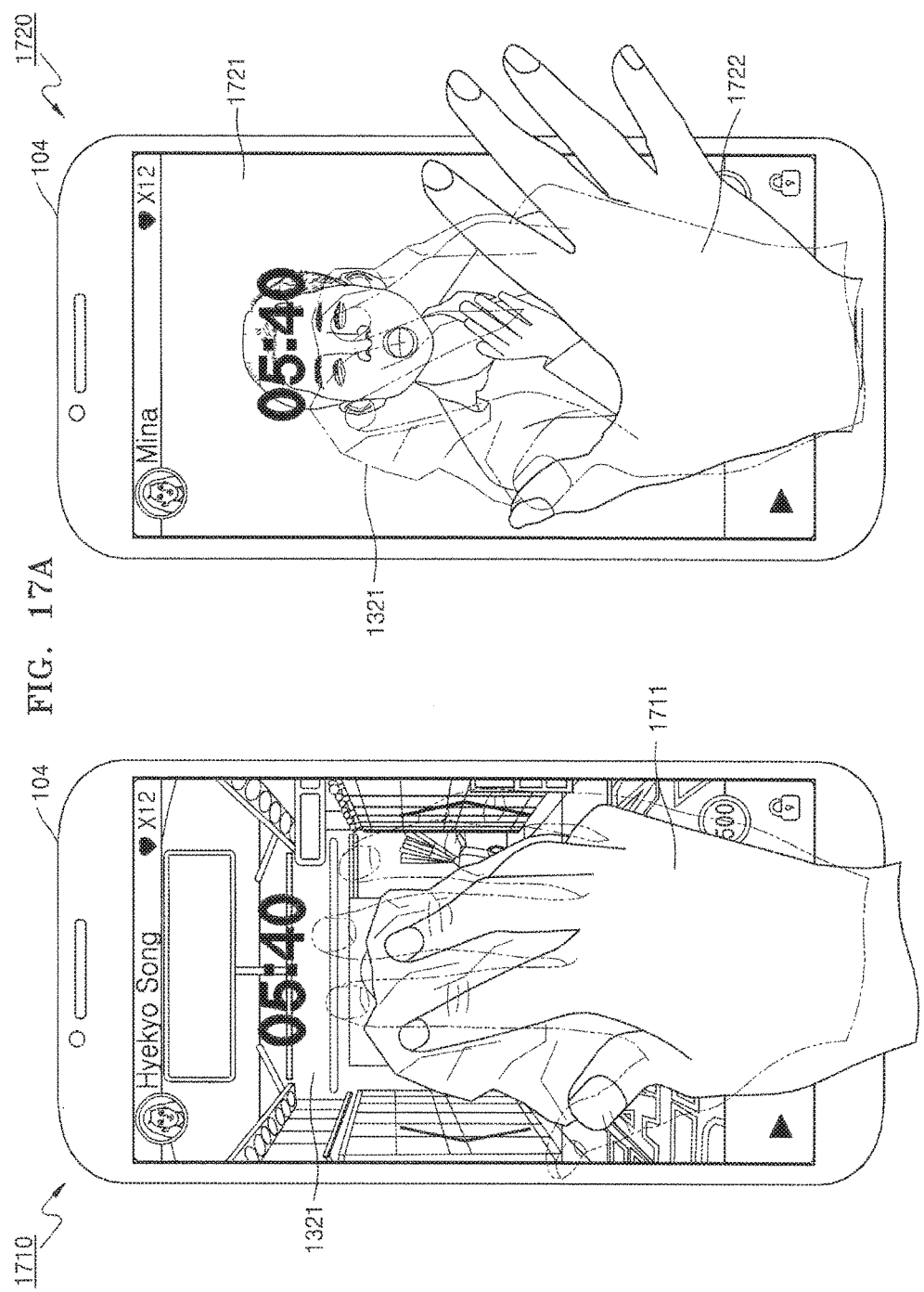
FIGS. 17A and 17B illustrate screens from which content displayed on a lock screen of the second user terminal device is removed according to an example embodiment.
Figure 17B:
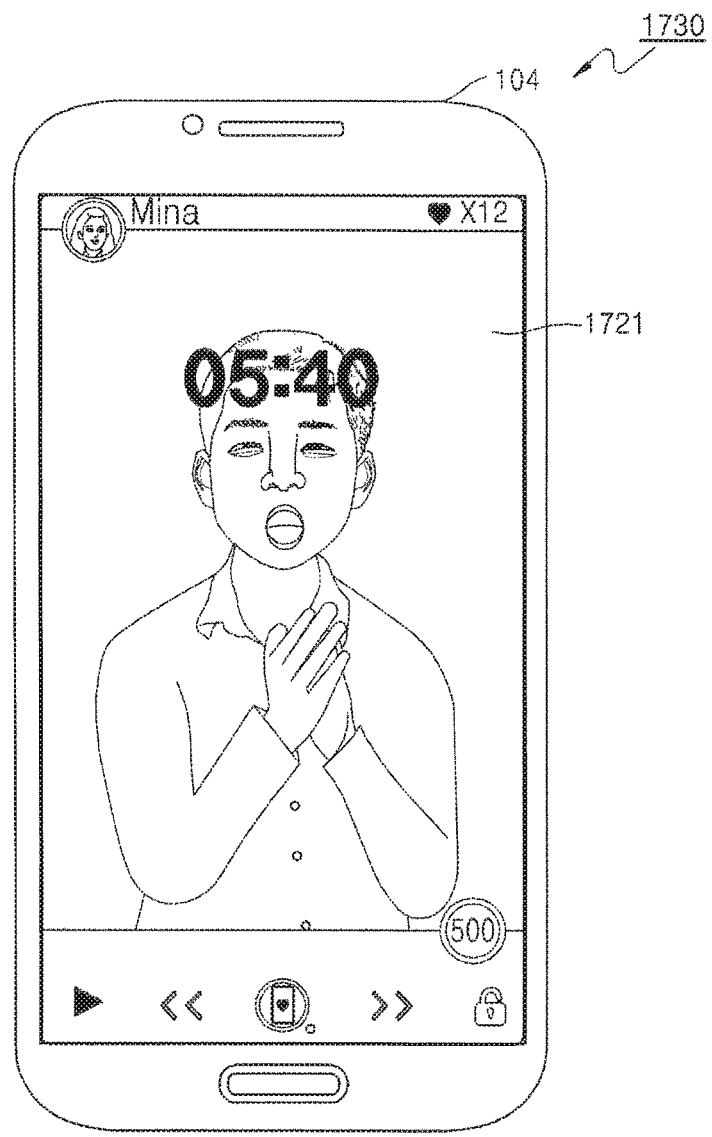

FIGS. 17A and 17B illustrate screens from which content displayed on a lock screen of the second user terminal device 104 is removed according to an example embodiment.

Referring to a screen 1710 of FIG. 17A, the control unit 170 of the second user terminal device 104 may display a lock screen including the content representative information 1321 of the recommended content on the display unit 110. If undesired content is recommended, a user may perform a user gesture for removing the recommended content from the lock screen. For example, the user gesture of removing the content may be a gesture of multiply touching and pinching the lock screen, and by doing so, a page of the content displayed on the lock screen may be removed from a screen of the second user terminal device 104 via an animation effect of crumpling the page like a piece of paper.

In this case, the control unit 170 of the second user terminal device 104 may receive an input signal of removing the content representative information 1321 displayed on the lock screen. For example, the input signal may correspond to a signal generated in the touch panel 147 by a user gesture 1711 of performing a plurality of touches on the display unit 110 and dragging the plurality of touches toward a certain area.

Referring to a screen 1720 of FIG. 17A, in response to the received input signal, the control unit 170 of the second user terminal device 104 may display the content representative information 1321 having the crumpled form on the display unit 110. Since the content representative information 1321 is crumpled, other content representative information 1721 may be simultaneously displayed on the display unit 110. When the content representative information 1321 is crumpled, the control unit 170 of the second user terminal device 104 may provide various visual effects of crumpling the content representative information 1321. For example, the control unit 170 may provide, by using a physics engine, a visual effect by which the content representative information 1321 is visually crumpled in correspondence with each of the plurality of touches.

The control unit 170 of the second user terminal device 104 may receive an input signal for removing the crumpled content representative information 1321 from the lock screen. For example, the input signal may correspond to a signal generated in the touch panel 147 by a user gesture 1722 of undoing the plurality of touches dragged on the display unit 110.

Referring to a screen 1730 of FIG. 17B, in response to the received input signal, the control unit 170 of the second user terminal device 104 may display the other content representative information 1721 on the display unit 110, as a result of removing the content representative information 1321 from the lock screen. Afterward, the removed content representative information 1321 may not be displayed on the lock screen even if an acquaintance of a user of the second user terminal device 104 recommends it again. Also, even if a content representative information conversion button is selected on the lock screen, it may not be displayed on the lock screen.

Figure 18:
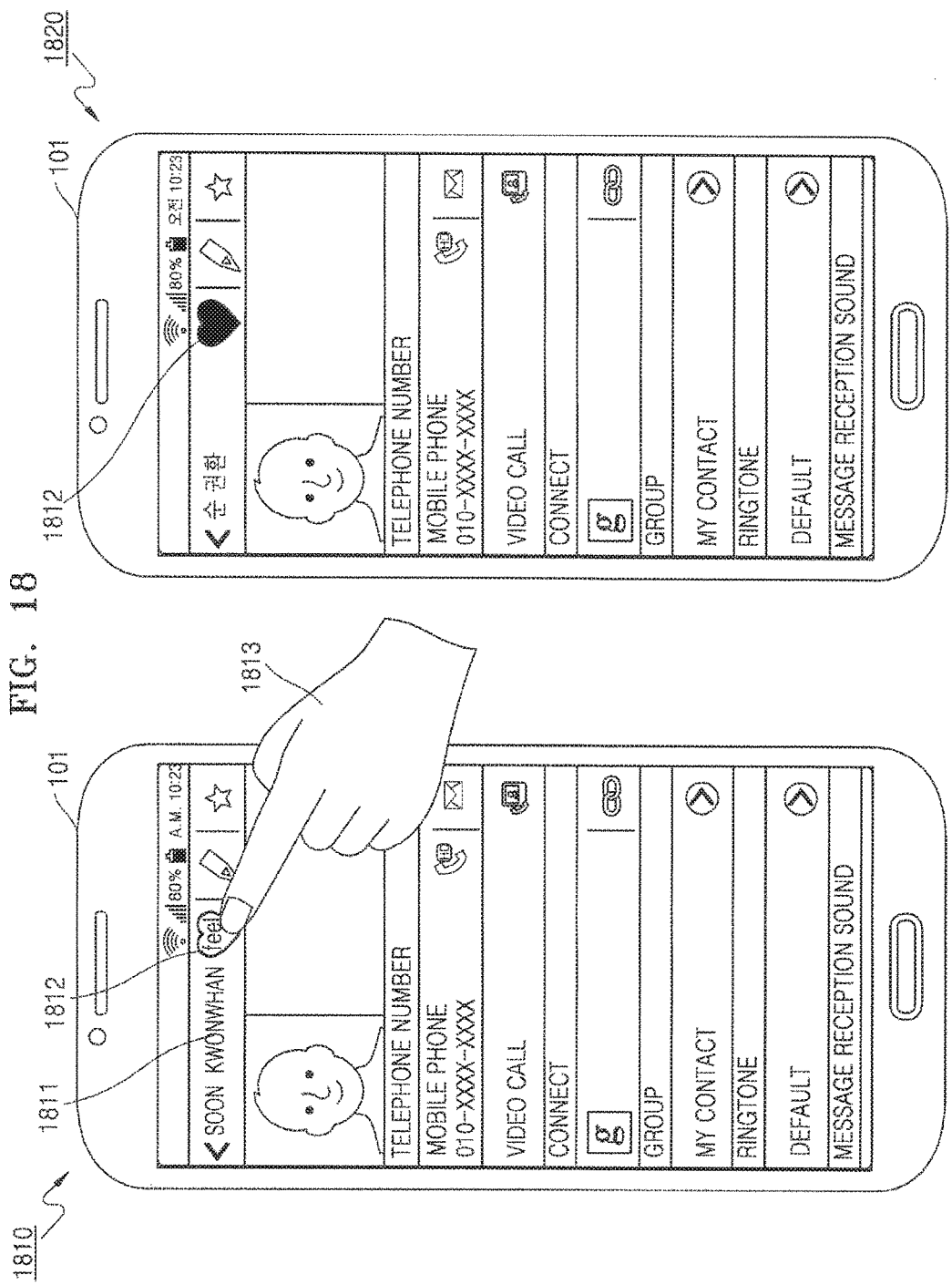
FIG. 18 illustrates screens for limiting sharing of content according to an example embodiment.

FIG. 18 illustrates screens for limiting sharing of content according to an example embodiment.

Referring to a screen 1810 of FIG. 18, the control unit 170 of the first user terminal device 101 may display, on the display unit 110, a detail information screen 1811 about a contact from a contact list. The detail information screen 1811 may include a user interface element 1812 for determining whether to transmit content to the second user terminal device 104 corresponding to the contact, wherein the content is recommended by a user of the first user terminal device 101. For example, the user interface element 1812 may be a 'feel' button 1812 on the detail information screen 1811. When the 'feel' button 1812 is activated, the content recommended by the user of the first user terminal device 101 may be displayed on a lock screen of the second user terminal device 104 that corresponds to the contact.

When the 'feel' button 1812 is activated, the control unit 170 of the second user terminal device 104 may receive an input signal for deactivating the 'feel' button 1812. For example, the input signal may correspond to a signal generated in the touch panel 147 by a tap or touch gesture 1813 of the user on the 'feel' button 1812.

Referring to a screen 1820 of FIG. 18, in response to the received input signal, the control unit 170 of the first user terminal device 101 may deactivate the 'feel' button 1812. As a result of deactivating the 'feel' button 1812, the control unit 170 of the first user terminal device 101 may not provide the content to the lock screen of the second user terminal device 104 corresponding to the contact, wherein the content is recommended by the user of the first user terminal device 101.

FIGS. 19A and 19B illustrate screens displayed on the display unit 110 of the second user terminal device 104 according to other example embodiments.

Referring to a screen 1910 of FIG. 19A, the control unit 170 of the second user terminal device 104 may display a lock screen on the display unit 110. Content representative information 1911 of content recommended by a user of the first user terminal device 101 may be displayed on the lock screen. Also, the lock screen may include a preview/pre-listen icon 1912, a content representative information display icon 1913, and a lock-screen unlock icon 1914.

The control unit 170 of the second user terminal device 104 may receive an input signal via a user interface for performing previewing/pre-listening of content. For example, the input signal may correspond to a signal generated in the touch panel 147 by a flick gesture 1915 of a user that starts at the content representative information display icon 1913 and moves toward the preview/pre-listen icon 1912.

Referring to a screen 1920 of FIG. 19B, in response to the received input signal, the control unit 170 of the second user terminal device 104 may provide, on the display unit 110, a lock screen including a portion of a popup window 1929 including preview/pre-listen content 1921. The popup window 1929 may be displayed while starting at a side of the display unit 110 and moving toward a center of the display unit 110. Here, the popup window 1929 may be displayed at the center of the display unit 110 when the popup window 1929 is gradually moved in correspondence with movement of the flick gesture 1915 of the user on the screen 1910 of FIG. 19A. In addition, the popup window 1929 may be displayed on the display unit 110 with various transition effects.

The popup window 1929 may further include at least one of content provision information 1922, advertisement information 1924, and a user interface element 1925 for controlling the preview/pre-listen content 1921.

Referring to a screen 1930 of FIG. 19B, as a result of moving the popup window 1929, the control unit 170 of the second user terminal device 104 may provide, on the display unit 110, a lock screen including an entire portion of the popup window 1929 including the preview/pre-listen content 1921. The popup window 1929 may include the content provision information 1922, the advertisement information 1924, the preview/pre-listen content 1921, or a user interface element 1923 for purchasing contents. For example, the user interface element 1923 may correspond to a purchase button 1923.

The control unit 170 of the second user terminal device 104 may receive an input signal for selecting the purchase button 1923. For example, the input signal may correspond to a signal generated in the touch panel 147 by a tap gesture 1935 of the user on the purchase button 1923.

Referring to a screen 1940 of FIG. 19B, in response to the received input signal, the control unit 170 of the second user terminal device 104 may display, on the display unit 110, a user interface element 1941 for receiving a password. When an input signal of inputting the password is received via the user interface element 1941, the control unit 170 of the second user terminal device 104 may display, on the display unit 110, a purchase window including shortcut icons of purchase applications capable of purchasing the contents.

Figure 20:
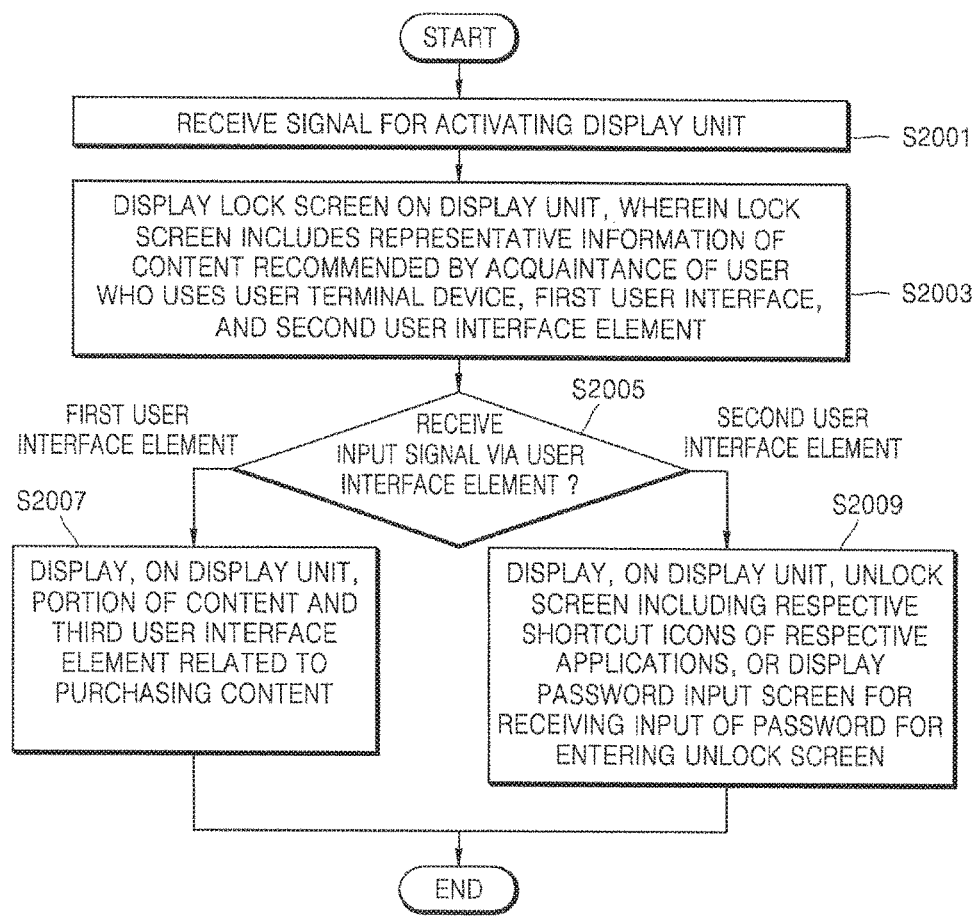
FIGS. 20 and 21 are flowcharts illustrating methods of displaying a lock screen, the methods performed by the user terminal device, according to example embodiments.

FIG. 20 is a flowchart illustrating a method of displaying a lock screen, the method performed by the user terminal device 100, according to an example embodiment.

In operation S2001, the user terminal device 100 may receive a signal for activating the display unit 110. For example, the user terminal device 100 may receive an input signal of pressing a button arranged in a side portion thereof.

In operation S2003, the user terminal device 100 may display the lock screen on the display unit 110, and the lock screen may include representative information of content recommended by an acquaintance of a user who uses the user terminal device 100, a first user interface element, and a second user interface element. Here, the lock screen may further include information about the acquaintance who recommends the content and/or information about points accumulated according to content purchased by the acquaintance.

In operation S2005, the user terminal device 100 may receive an input signal via the first user interface element or the second user interface element.

When the input signal is received via the first user interface element, in operation S2007, the user terminal device 100 may display, on the display unit 110, a portion of the content and a third user interface element related to purchasing the content. Here, the user terminal device 100 may further include a fourth user interface element for controlling the portion of the content on the display unit 110. When a user input signal is received via the fourth user interface element, the user terminal device 100 may control reproduction of the portion of the content. For example, the user terminal device 100 may pause the reproduction of the content, may reproduce the paused content, and may rapidly reproduce the portion of the content or may slowly reproduce the portion of the content.

When the input signal is received via the second user interface element, in operation S2009, the user terminal device 100 may display, on the display unit 110, an unlock screen including respective shortcut icons of respective applications. Alternatively, when a password is set in the user terminal device 100, the user terminal device 100 may display a password input screen for receiving an input of the password for entering an unlock screen.

Figure 21:
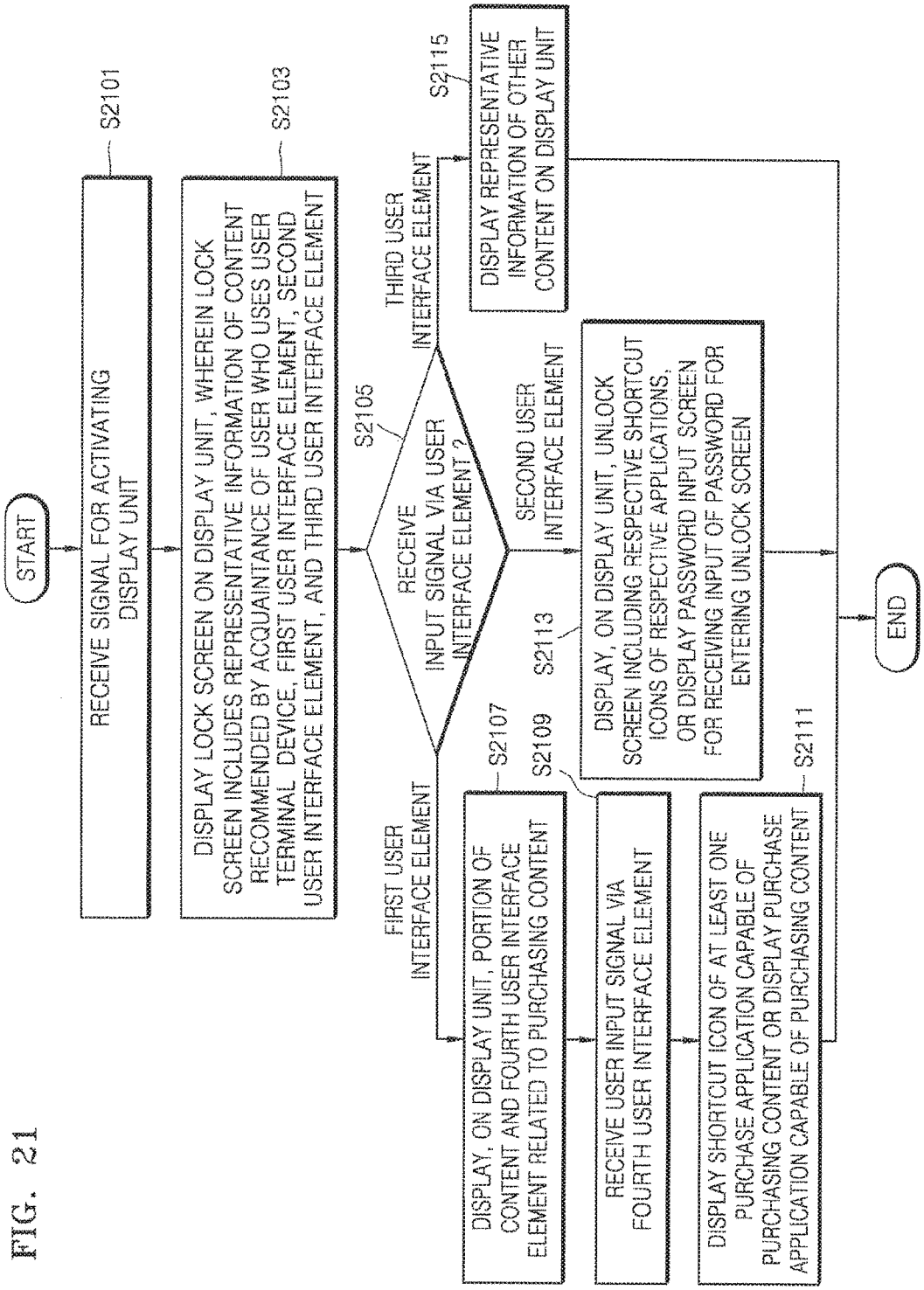

FIG. 21 is a flowchart illustrating a method of displaying a lock screen, the method performed by the user terminal device 100, according to another example embodiment.

In operation S2101, the user terminal device 100 may receive a signal for activating the display unit 110.

In operation S2103, the user terminal device 100 may display the lock screen on the display unit 110, and the lock screen may include representative information of content recommended by an acquaintance of a user who uses the user terminal device 100, a first user interface element, a second user interface element, and a third user interface element.

In operation S2105, the user terminal device 100 may receive an input signal via one of the first user interface element, the second user interface element, and the third user interface element.

In operation S2107, when the input signal is received via the first user interface element, the user terminal device 100 may display, on the display unit 110, a portion of the content and a fourth user interface element related to purchasing the content. In operation S2109, the user terminal device 100 may receive a user input signal via the fourth user interface element. In this case, in operation S2111, the user terminal device 100 may display a shortcut icon of at least one purchase application capable of purchasing the content or may display an execution screen of the purchase application capable of and operable for purchasing the content.

In operation S2113, when the input signal is received via the second user interface, the user terminal device 100 may display, on the display unit 110, an unlock screen including respective shortcut icons of respective applications. Alternatively, when a password is set in the user terminal device 100, the user terminal device 100 may display a password input screen for receiving an input of the password for entering an unlock screen.

In operation S2115, when the input signal is received via the third user interface element, the user terminal device 100 may display representative information of other content on the display unit 110. For example, when an input signal of selecting a content conversion button is received, the user terminal device 100 may display, on the display unit 110, the representative information of the other content recommended by an acquaintance of the user. Alternatively, when an input signal of removing the representative information of the content is received, the user terminal device 100 may delete the representative information of the content from the lock screen, and may display, on the display unit 110, the representative information of the other content recommended by the acquaintance of the user.

FIG. 22 is a flowchart illustrating a method of providing locked content, the method performed by the lock screen management server 200, according to an example embodiment.

In operation S2201, the lock screen management server 200 may receive identification information of content recommended by a user. For example, the lock screen management server 200 may receive the identification information of the content recommended by the user from the first user terminal device 101 or the content providing server 201. The identification information of the content may mean a value for distinguishing the content from other contents, and for example, the identification information of the content may include content representative information.

In operation S2203, the lock screen management server 200 may determine at least one acquaintance of the user, wherein the acquaintance will be provided the content corresponding to the received identification information of the content. For example, the lock screen management server 200 may obtain an acquaintance list of the user from at least one of the acquaintance list server 202, a contact list of the first user terminal device 101, and a contact list of the second user terminal device 104, and may determine at least one acquaintance to share the content from among the acquaintance list. Alternatively, the lock screen management server 200 may determine at least one acquaintance to receive the content, based on log information of the content recommended by the user of the first user terminal device 101. For example, the log information of the content may correspond to at least one of user activity information, date information, time information, and user location information about when the user of the first user terminal device 101 recommends the content.

In operation S2205, the lock screen management server 200 may transmit, to the second user terminal device 104 of the determined acquaintance, (i) at least one of content representative information of the content, a portion of the content, and (ii) information about a location where the content is stored, and content display screen information indicating that the content is displayed on a lock screen of the second user terminal device 104. In addition, the lock screen management server 200 may further transmit, to the second user terminal device 104 of the acquaintance, at least one of information about an acquaintance who recommended content, comment information about the content, information about points accumulated according to the content purchased by the acquaintance, advertisement information related to purchasing the content, and information about a service company who provides the content.

FIG. 23 is a diagram illustrating a system, according to another example embodiment.

Referring to FIG. 23, a user of the first user terminal device 101 may generate a message to be transmitted to the second user terminal device 104, and may include content 2301 in the message. Here, content included in a message may mean content included in the body of the message, or may mean content included as an attached file in the message. Also, when the message is registered in a social server, the content included in the message may mean content that is registered together with the message in the social server.

The content included in the message may correspond to various types of multimedia content. For example, the content may be one of music, sports, UCC (user created content), education, a recipe, a VOD (video on demand), a music video, webtoon, news, podcast, a coupon, a book, e-commerce contents, and social contents.

Also, in the present example embodiment, the content may mean a link address indicating a location where the content is stored. The link address may include an absolute path or a relative path, and content representative information may be included in the link address. Here, the content representative information may correspond to a content title, an extension name of a file indicating an attribute of the content, or the link address itself.

When the user of the first user terminal device 101 transmits the message including the content, the message may be transmitted as a message 2305 of FIG. 23 to the second user terminal device 104 via a server 2300. Alternatively, the message may be directly transmitted as a message 2306 of FIG. 23 to the second user terminal device 104 without passing the server 2300.

When the second user terminal device 104 receives a message including content information, the second user terminal device 104 may determine whether a user who provided the message is an acquaintance of a user of the second user terminal device 104. That is, the second user terminal device 104 may determine whether the user of the first user terminal device 101 is an acquaintance. In order to determine an acquaintance, the first user terminal device 101 may use an acquaintance list stored in the first user terminal device 101, or may determine the acquaintance by using an acquaintance list provided by the acquaintance list server 202. Alternatively, in the present example embodiment, the determination may be performed by using an acquaintance list provided by the lock screen management server 200 that obtains acquaintance lists from a plurality of social servers and manages the acquaintance lists.

When the first user terminal device 101 uses the stored acquaintance list, the acquaintance list may be a list of people included in an address book of the phone-book application 124-8. Alternatively, the acquaintance list may be an acquaintance list managed by a server integrated management application. Here, the server integrated management application may be an application that interoperates with a plurality of servers including the social server, integrates and manages functions commonly provided by the servers, and provides an integrated function to a user via a user interface. For example, the server integrated management application may obtain, from the plurality of servers, messages registered by acquaintances or mails transmitted from the acquaintances to the user, and may provide a message or mail list to the user via an integrated user interface. Also, the server integrated management application may obtain an acquaintance list of the user from each of the plurality of servers, and may provide an integrated list of acquaintances via the integrated user interface. Also, according to the related art, when the user accesses the plurality of servers, the user has to perform login in each of the servers, but by using the server integrated management application, the user may integrally check the messages or the mails provided by the plurality of servers, by performing login once.

As a result of the determination by the second user terminal device 104, if it is determined that the user of the first user terminal device 101 is an acquaintance of the user of the second user terminal device 104, the second user terminal device 104 may display a lock screen, and the lock screen may include content representative information 2310 representing the content attached to the message, and a first user interface element. Here, for example, when the content is music, the content representative information 2310 may correspond to a cover art image of the music, an image of a CD jacket, a pre-listening sound source, a title of the music, or the like. Also, when the content is a movie, the content representative information 2310 may correspond to a title of the movie, an image of a movie poster, a still image of the movie (or a thumbnail of the still image), a preview video, or the like. Alternatively, when the content is an electronic document, the content representative information 2310 may correspond to a thumbnail image of the electronic document, a title of the electronic document, or the like. Alternatively, content representative information may correspond to information indicating an attribute of content. In this case, if the content is an audio, the content representative information may indicate a note icon.

Also, the second user terminal device 104 may display, on the lock screen, message representative information 2311 representing details of a message. For example, the message representative information 2311 may correspond to a portion of a title of the message or a portion of the body of the message.

Also, the second user terminal device 104 may display, on the lock screen, identification information 2312 of an acquaintance that transmitted the message. For example, the identification information 2312 of the acquaintance may correspond to a name of the acquaintance, an ID of the acquaintance, an email address of the acquaintance, an image of the acquaintance, an image representing the acquaintance, a nickname of the acquaintance, or the like.

Figure 24A:
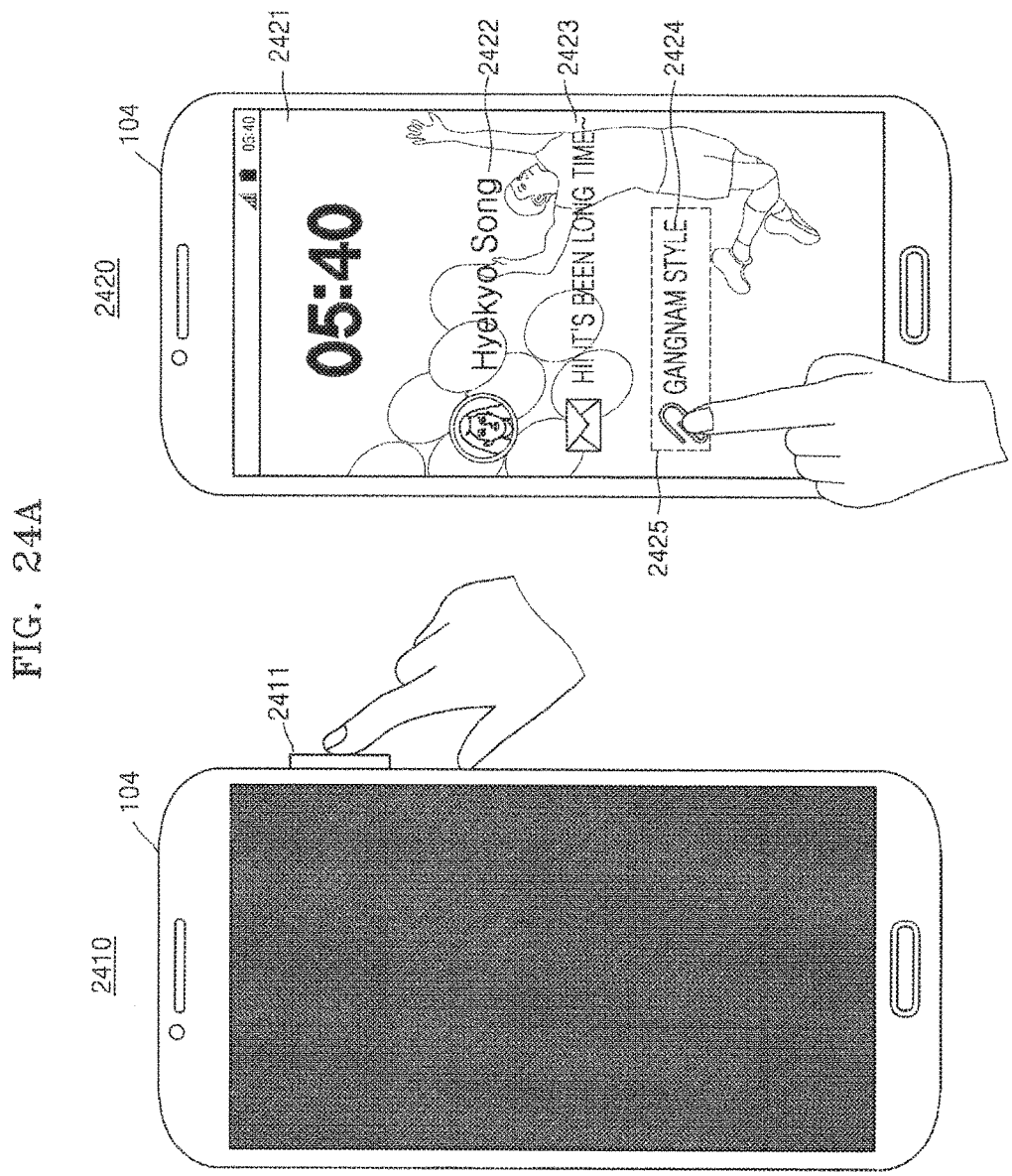
FIGS. 24A and 24B illustrate screens that display content representative information on a lock screen according to example embodiments.
Figure 24B:
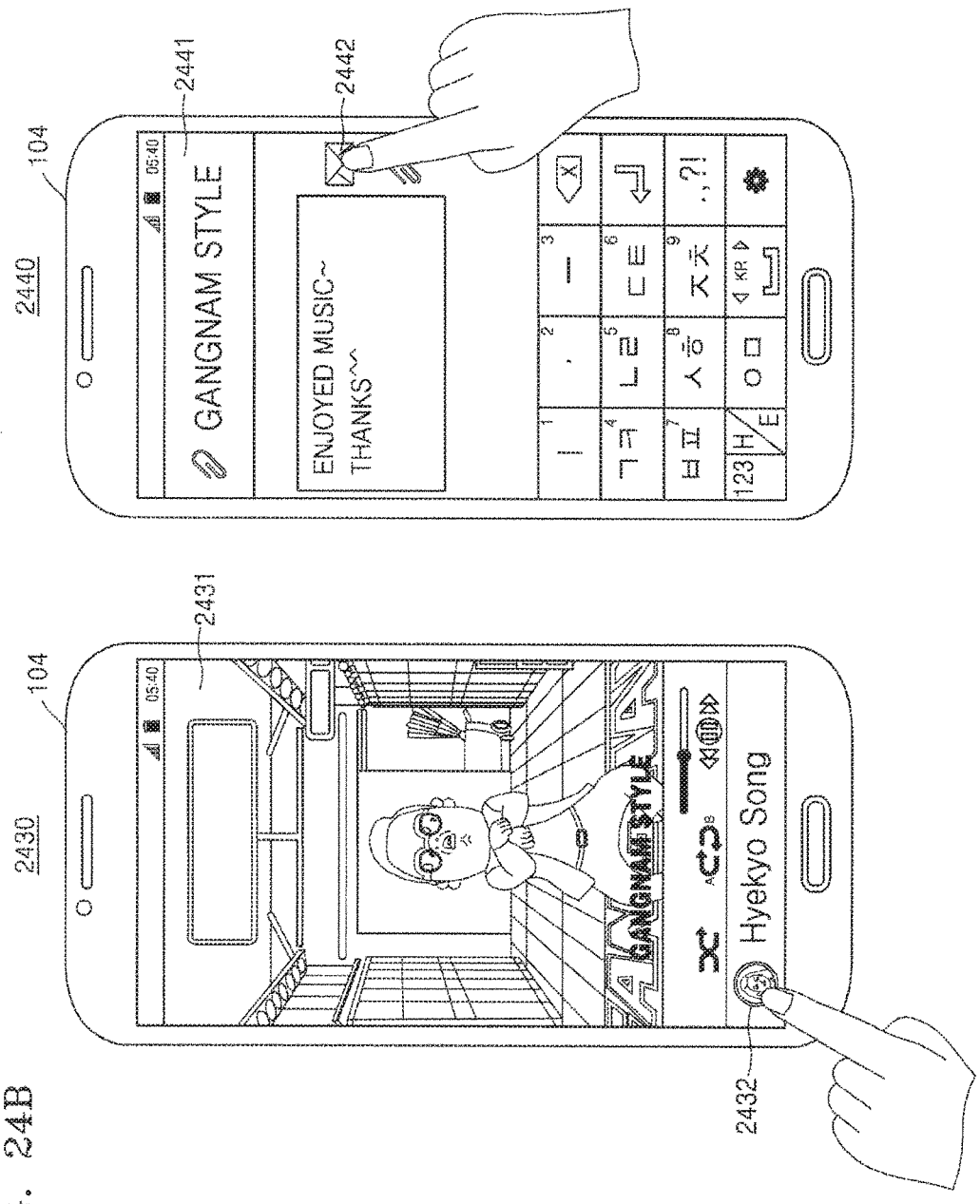

FIGS. 24A and 24B illustrate screens that display content representative information on a lock screen according to example embodiments.

Referring to a screen 2410 of FIG. 24A, the control unit 170 of the second user terminal device 104 may receive an input of a signal for activating the display unit 110 of the second user terminal device 104. For example, the control unit 170 of the second user terminal device 104 may receive an input signal associated with pressing a button 2411 arranged on a side of the second user terminal device 104.

Referring to a screen 2420 of FIG. 24A, in response to the received input signal, the control unit 170 of the second user terminal device 104 may display a lock screen 2421 on the display unit 110. Here, when an acquaintance provides a message including content, by using a message application, identification information 2422 of the acquaintance, message representative information 2423 representing details of the message provided by the acquaintance, and content representative information 2424 representing the content included in the message may be displayed on the lock screen 2421.

When the content representative information 2424 is displayed on the lock screen 2421, a user may want to directly check the content included in the message. Accordingly, the control unit 170 of the second user terminal device 104 may receive a user input signal via a first user interface element 2425. Here, a user input of selecting the content representative information 2424 may correspond to a user input via a first user interface element. Alternatively, a user input of selecting a button separately arranged on a lock screen may correspond to a user input via the first user interface element. Alternatively, a flick gesture moving in one direction on the lock screen may correspond to a user input via the first user interface.

When the user input signal is received, referring to a screen 2430 of FIG. 24B, the control unit 170 of the second user terminal device 104 may execute an application capable of providing the content. For example, when an attribute of the content included in the message indicates a music file, the control unit 170 of the second user terminal device 104 may execute a music application capable of reproducing the music file. Next, the control unit 170 may display, by using the executed application, a screen 2431 whereon the content included in the message is reproduced. When the content is a link address indicating a location where content is stored, the control unit 170 of the second user terminal device 104 may download, by using the link address, the content from a server or an external device in which the content is stored, and may reproduce the content, or while the control unit 170 of the second user terminal device 104 reproduces a portion of the content, the control unit 170 of the second user terminal device 104 may download another portion in real-time and may reproduce the content.

While or after the content is reproduced, the user may want to reply to the acquaintance. Accordingly, the control unit 170 of the second user terminal device 104 may receive a user input for selecting identification information 2432 of the acquaintance.

When a user input signal is received, referring to a screen 2440 of FIG. 24B, the control unit 170 of the second user terminal device 104 may execute an application for sending a reply with respect to the message. For example, the application may be a same application as an application by which the acquaintance generated the message. As a result of executing the application, the control unit 170 of the second user terminal device 104 may provide a message generating screen 2441. The user may generate a message for the acquaintance via the message generating screen 2441. After the user generates the message, when the user touches a send button 2442, the control unit 170 of the second user terminal device 104 may control the communication unit 130 to transmit the generated message to the first user terminal device 101.

FIGS. 25A through 25C illustrate screens that display content representative information on a lock screen according to example embodiments.

Referring to a screen 2510 of FIG. 25A, the control unit 170 of the second user terminal device 104 may receive an input of a signal for activating the display unit 110 of the second user terminal device 104. For example, the control unit 170 of the second user terminal device 104 may receive an input signal associated with pressing a button 2511 arranged on a side of the second user terminal device 104.

Referring to a screen 2520 of FIG. 25A in response to the received input signal, the control unit 170 of the second user terminal device 104 may display a lock screen 2521 on the display unit 110. Here, when an acquaintance registers a message (e.g., a tweet, a comment, etc.) with content (e.g., link information indicating a location where content is stored) in a social server, the social server or the lock screen management server 200 may transmit the message including the content to the second user terminal device 104. In this case, identification information 2522 of the acquaintance, message representative information 2523 representing details of the message registered in the social server, by the acquaintance, and content representative information 2524 representing the content registered with the message may be displayed on the lock screen 2521. Here, as another example, the message representative information 2523 may be a notice message by which the social server notifies that the message of the acquaintance has been registered.

When the content representative information 2524 is displayed on the lock screen 2521, a user may want to directly check the content included in the message. Accordingly, the control unit 170 of the second user terminal device 104 may receive a user input signal via a first user interface element 2525.

When the user input signal is received, referring to a screen 2530 of FIG. 25B, the control unit 170 of the second user terminal device 104 may execute an application capable of providing the content. Next, the control unit 170 may display, by using the executed application, a screen 2531 whereon the content included in the message is reproduced. When the content is a link address indicating a location where content is stored, the control unit 170 of the second user terminal device 104 may download, by using the link address, the content from a server or an external device in which the content is stored, and may reproduce the content, or while the control unit 170 of the second user terminal device 104 reproduces a portion of the content, the control unit 170 of the second user terminal device 104 may download another portion in real-time and may reproduce the content.

While or after the content is reproduced, the user may want to reply to the acquaintance. Accordingly, the control unit 170 of the second user terminal device 104 may receive a user input of selecting identification information 2532 of the acquaintance.

When a user input signal is received, referring to a screen 2540 of FIG. 25B, the control unit 170 of the second user terminal device 104 may execute an application for sending a reply with respect to the message. For example, the application may be the server integrated management application described above with reference to FIG. 23. The server integrated management application may provide a screen for selecting various ways to transmit a message to the acquaintance. For example, when the user wants to register a reply message (e.g., a tweet, a comment, etc.) in a social server, the user may select at least one of a plurality of pieces of social server identification information 2541. Alternatively, if the user wants to transmit the reply message via an email, the user may select email identification information 2542. Alternatively, if the user wants to transmit a text message as a reply to the acquaintance, the user may select text message identification information 2543.

When a user input signal for selecting a way to transmit the message to the acquaintance is received, referring to a screen 2550 of FIG. 25C, the control unit 170 of the second user terminal device 104 may provide, by using the server integrated management application, a message generating screen 2551 for generating a message to be registered in the social server. The user may generate the message for the acquaintance via the message generating screen 2551. When the user generates message and then touches a registration button 2552, the control unit 170 of the second user terminal device 104 may control the communication unit 130 to transmit the generated message to the social server.

The social server that receives the message from the second user terminal device 104 may register the received message by associating the received message with a message registered in the social server by the acquaintance. For example, referring to a screen 2559 of FIG. 25C, a social server 2555 may register a message 2559-2 as a comment, a reply, or a retweet of a message 2559-1 registered by the acquaintance, wherein the message 2559-2 is received from the second user terminal device 104.

Figure 26:
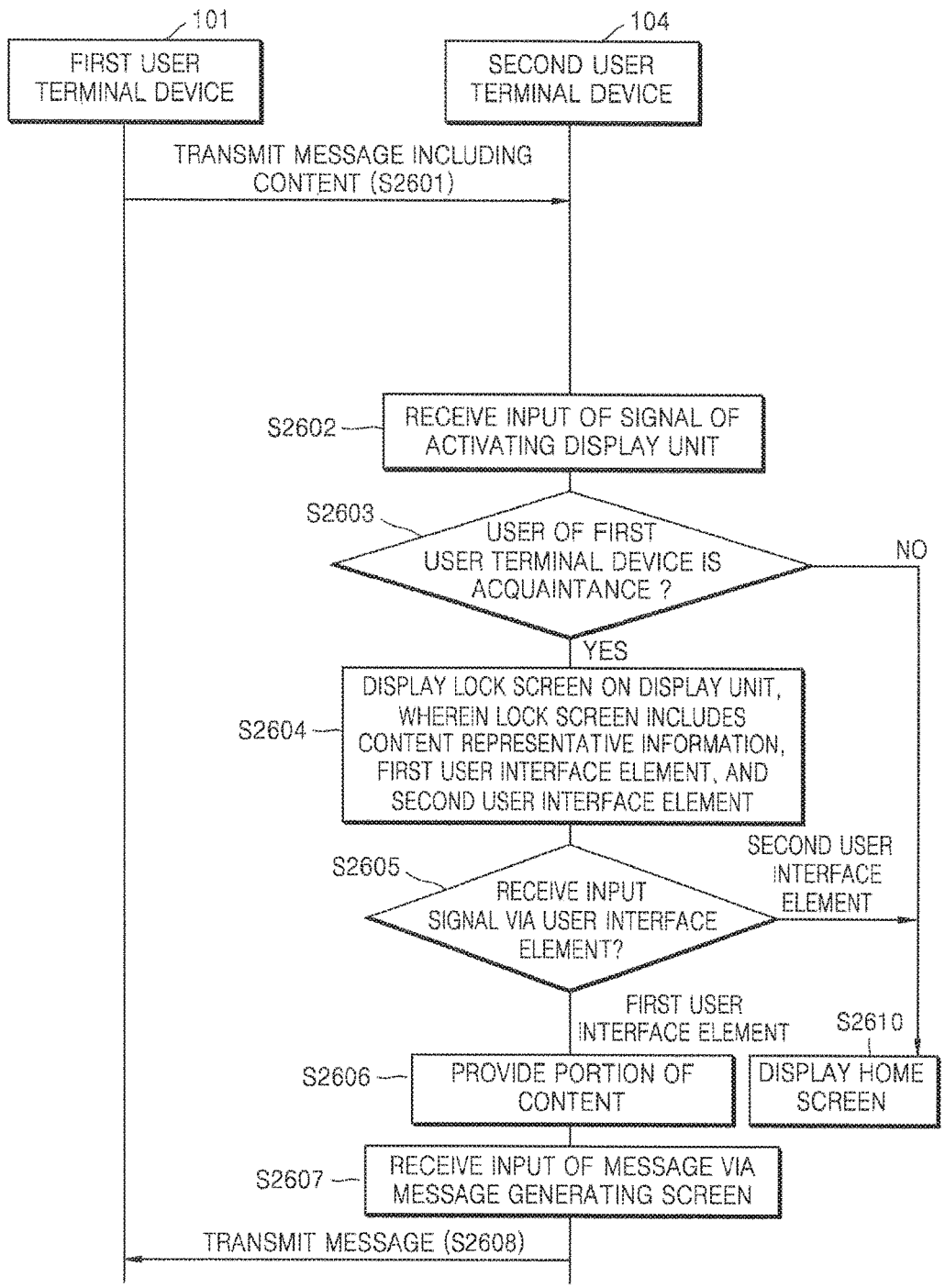
FIGS. 26 and 27 are flowcharts illustrating methods of displaying content representative information on a lock screen according to example embodiments.
Figure 27:
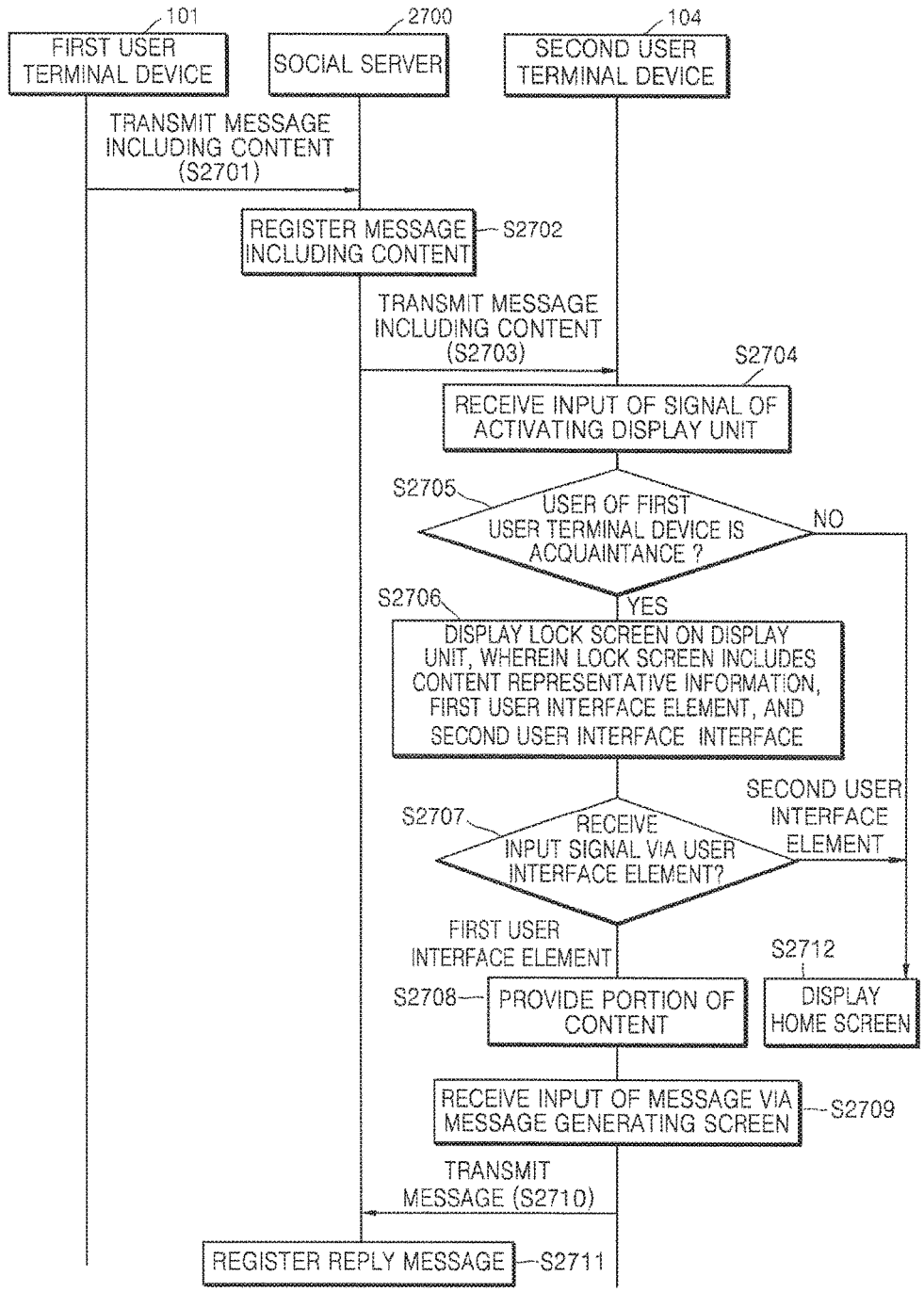

FIGS. 26 and 27 are flowcharts illustrating methods of displaying content representative information on a lock screen according to example embodiments.

FIG. 26 is a flowchart illustrating an example method of displaying content representative information on a lock screen when a message including content is received from the first user terminal device 101, the method being performed by the second user terminal device 104.

In operation S2601, the first user terminal device 101 may transmit the message including the content to the second user terminal device 104. Here, the message may be transmitted to the second user terminal device 104 via a server, or may be directly transmitted to the second user terminal device 104 without passing the server.

In operation S2602, the second user terminal device 104 may receive an input of a signal for activating the display unit 110 of the second user terminal device 104.

In operation S2603, the second user terminal device 104 may determine whether a user of the first user terminal device 101 that transmitted the message is an acquaintance of a user of the second user terminal device 104. A process of the operation S2603 may be performed before the operation S2602.

When it is determined that the user of the first user terminal device 101 is the acquaintance of the user of the second user terminal device 104 (S2603—Y), as in operation S2604, the second user terminal device 104 may display, on the display unit 110, a lock screen including content representative information, a first user interface element, and a second user interface element. On the other hand, when it is determined that the user of the first user terminal device 101 is not the acquaintance of the user of the second user terminal device 104 (S2603—N), as in operation S2610, the second user terminal device 104 may display a home screen on the display unit 110.

Next, in operation S2605, the second user terminal device 104 may receive a user input via the first user interface element or the second user interface element.

When an input signal is received via the first user interface element, in operation S2606, the second user terminal device 104 may execute an application capable of and operable for providing the content, and may provide a portion of the content via an execution screen of the application. For example, when the content is music or a movie, the second user terminal device 104 may reproduce a portion of the music or the movie. On the other hand, when the input signal is received via the second user interface element, in operation S2610, the second user terminal device 104 may display the home screen on the display unit 110. However, it is not limited thereto, and in operation S2610, the second user terminal device 104 may display, on the display unit 110, a lock screen unrelated to the message and the content of the acquaintance.

Next, in operation S2607, the second user terminal device 104 may execute an application for sending a reply to the message received from the first user terminal device 101. Then, the second user terminal device 104 may receive an input of a message to be transmitted to the acquaintance, from the user via a message generating screen.

When the message to be transmitted to the acquaintance is input, in operation S2608, the second user terminal device 104 may transmit the input message to the first user terminal device 101.

FIG. 27 is a flowchart illustrating an example method of displaying content representative information on a lock screen when a message including content is received from a social server, the method being performed by the second user terminal device 104.

In operation S2701, a user of the first user terminal device 101 may transmit a message including content to a social server 2700.

In operation S2702 and operation S2703, the social server 2700 may register the received message including the content, and may transmit the message to the second user terminal device 104.

In operation S2704, the second user terminal device 104 may receive an input of a signal for activating the display unit 110 of the second user terminal device 104.

In operation S2705, the second user terminal device 104 may determine whether the user of the first user terminal device 101 that registered the message in the social server 2700 is an acquaintance of a user of the second user terminal device 104. Here, a process of the operation S2705 may be performed before the operation S2704.

The aforementioned process of determining the acquaintance may be performed before the operation S2703 of transmitting, by the social server 2700, the message to the second user terminal device 104. For example, when the social server 2700 determines, by using an acquaintance list of the social server 2700, that the user of the first user terminal device 101 is the acquaintance of the user of the second user terminal device 104, the social server 2700 may transmit the message to the second user terminal device 104.

When it is determined that the user of the first user terminal device 101 is the acquaintance of the user of the second user terminal device 104 (S2705—Y), as in operation S2706, the second user terminal device 104 may display, on the display unit 110, a lock screen including content representative information, a first user interface element, and a second user interface element. On the other hand, when it is determined that the user of the first user terminal device 101 is not the acquaintance of the user of the second user terminal device 104 (S2705—N), as in operation S2712, the second user terminal device 104 may display a home screen on the display unit 110. However, it is not limited thereto, and in operation S2712, the second user terminal device 104 may display, on the display unit 110, a lock screen unrelated to the message and the content of the acquaintance.

Next, in operation S2707, the second user terminal device 104 may receive a user input via the first user interface element or the second user interface element.

When an input signal is received via the first user interface element, in operation S2708, the second user terminal device 104 may execute an application capable of providing the content, and may provide a portion of the content via an execution screen of the application. For example, when the content is music or a movie, the second user terminal device 104 may reproduce a portion of the music or the movie. On the other hand, when the input signal is received via the second user interface element, in operation S2712, the second user terminal device 104 may display the home screen on the display unit 110.

In operation S2709, the second user terminal device 104 may execute an application for sending a reply to the message received from the first user terminal device 101. For example, the application for sending the reply may be the server integrated management application. The second user terminal device 104 may receive an input of a message to be transmitted to the acquaintance, from the user via a message generating screen provided by the server integrated management application. As another example, the reply message may be a voice message, other than a text message.

In this case, the server integrated management application may receive an input of a user's voice.

When the message to be transmitted to the acquaintance is input, in operation S2710, the second user terminal device 104 may transmit the message that is input by using the server integrated management application, to the social server 2700. Here, when the input message is a voice message, the server integrated management application may transmit voice data to the social server 2700, or may convert the voice message into a text message and may transmit the text message to the social server 2700.

In operation S2711, the social server 2700 may register the received reply message.

Figure 28:
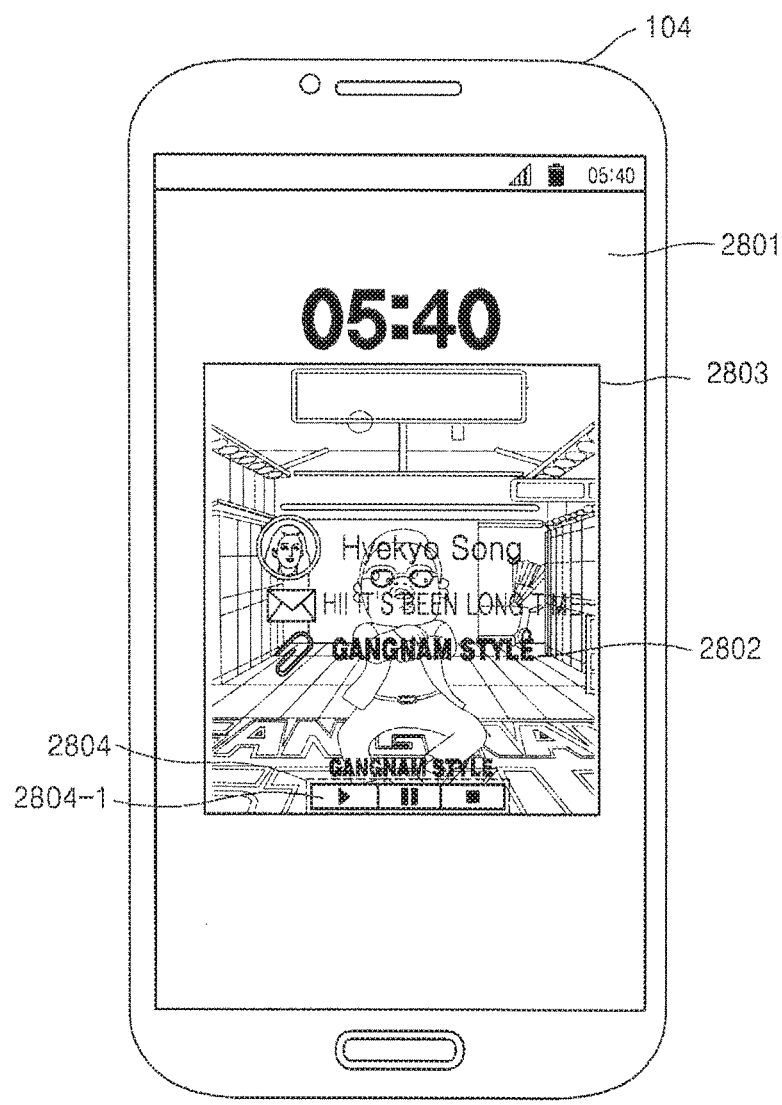
FIG. 28 illustrates an example of displaying content representative information on a lock screen according to another example embodiment.

FIG. 28 illustrates an example of displaying content representative information on a lock screen according to another example embodiment.

Referring to FIG. 28, when the second user terminal device 104 receives a message including content, the content may include an image, a moving picture, or an electronic document that may be displayed on a screen. In this case, the second user terminal device 104 may display, on a lock screen 2801, a title 2802 of the content and a portion 2803 of the content as content representative information. For example, when the content is music, a portion of the content may correspond to a cover art image 2803 of the music.

Here, when the content is reproducible content, the second user terminal device 104 may provide user interface elements 2804 for previewing/pre-listening the content to the lock screen 2801. In this case, when a user selects a user interface element 2804-1 for reproducing the content, the second user terminal device 104 may reproduce the content via the lock screen 2801. For example, if the content is a moving picture, the second user terminal device 104 may reproduce the moving picture. Also, if the content is audio such as music, the second user terminal device 104 may reproduce the audio.

Figure 29:
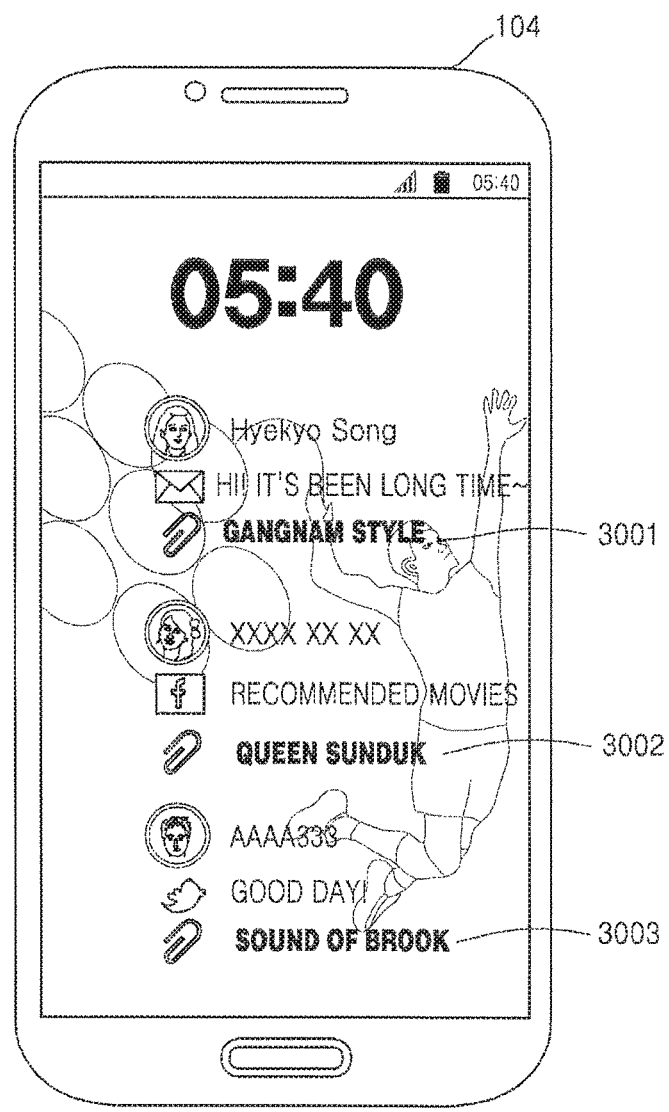
FIG. 29 illustrates an example of displaying, on a lock screen, a plurality of pieces of content representative information provided by a plurality of acquaintances, according to an example embodiment.

FIG. 29 illustrates an example of displaying, on a lock screen, a plurality of pieces of content representative information provided by a plurality of acquaintances, according to an example embodiment.

Referring to FIG. 29, the second user terminal device 104 may receive messages including contents provided by the plurality of acquaintances. For example, the messages provided by the plurality of acquaintances may be messages that are received after the display unit 110 of the second user terminal device 104 is deactivated and before the display unit 110 of the second user terminal device 104 is reactivated. In this case, the second user terminal device 104 may display a plurality of pieces of content representative information 3001, 3002, and 3003 of the messages, respectively, on the lock screen.

Here, a priority order of displaying the plurality of pieces of content representative information 3001, 3002, and 3003 of the plurality of acquaintances on the lock screen may be determined in an order according to when the messages including the contents are received. Alternatively, the priority order may be determined according to an order of closeness to the user. Here, the order of closeness may be determined according to a frequency of exchanging messages with the user. Alternatively, the priority order may be determined according to an order of recent contacts with the user. Alternatively, the priority order may be determined according to an order of bookmarks of acquaintances that were registered by the user. Alternatively, the priority order may be determined according to an ascending or descending order of an alphabet or a Korean alphabet of names or nicknames of acquaintances. In addition, the priority order may be determined according to sizes of the contents, generation dates of the contents, and types of the contents.

In FIG. 29, when at least one of the plurality of pieces of content representative information 3001, 3002, and 3003 is selected by the user, the second user terminal device 104 may execute an application for providing at least one content representative information. If a plurality of pieces of content representative information are selected, the second user terminal device 104 may simultaneously or sequentially execute a plurality of applications. Alternatively, the second user terminal device 104 may provide a popup screen requesting a priority order of applications to be executed to the display unit 110.

Figure 30:
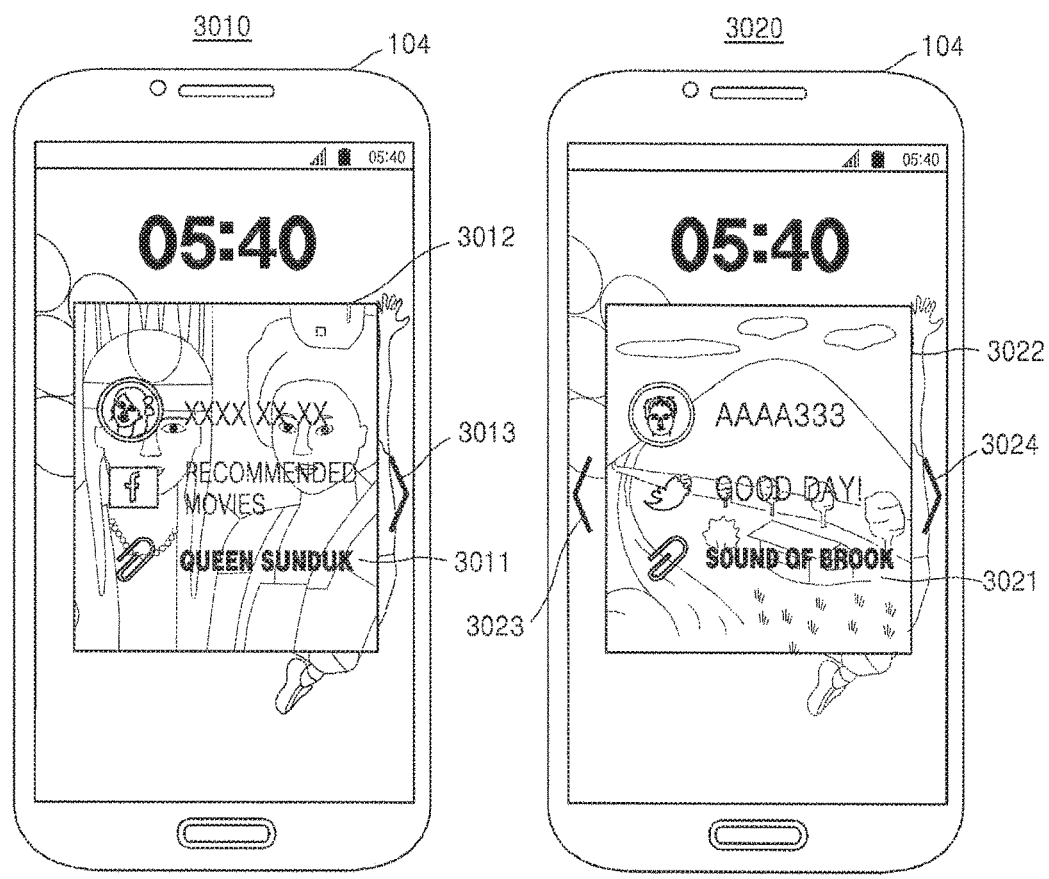
FIG. 30 illustrates an example of displaying, on a lock screen, a plurality of pieces of content representative information provided by a plurality of acquaintances, according to another example embodiment.

FIG. 30 illustrates an example of displaying, on a lock screen, a plurality of pieces of content representative information provided by a plurality of acquaintances, according to another example embodiment.

Referring to a screen 3010 of FIG. 30, the second user terminal device 104 may receive messages including contents provided by the plurality of acquaintances. In this case, the second user terminal device 104 may display, on a lock screen, a plurality of pieces of content representative information 3011 and 3012 provided by an acquaintance from among the plurality of acquaintances. Also, the lock screen may include a button 3013 for displaying a lock screen that includes message information provided by another acquaintance. When the button 3013 is selected, as in a screen 3020 of FIG. 30, the second user terminal device 104 may display, on the lock screen, a plurality of pieces of content representative information 3021 and 3022 provided by the other acquaintance from among the plurality of acquaintances. Also, the lock screen may include buttons 3023 and 3024 for displaying lock screens including a plurality of pieces of message information of other acquaintances. When the previous button 3023 among the buttons 3023 and 3024 is selected, the second user terminal device 104 may re-display the screen 3010 of FIG. 30 including received message information provided by the acquaintance. On the other hand, when a next button 3024 is selected, the second user terminal device 104 may display the lock screen that includes the message information provided by the other acquaintance from among the plurality of acquaintances.

Figure 31:
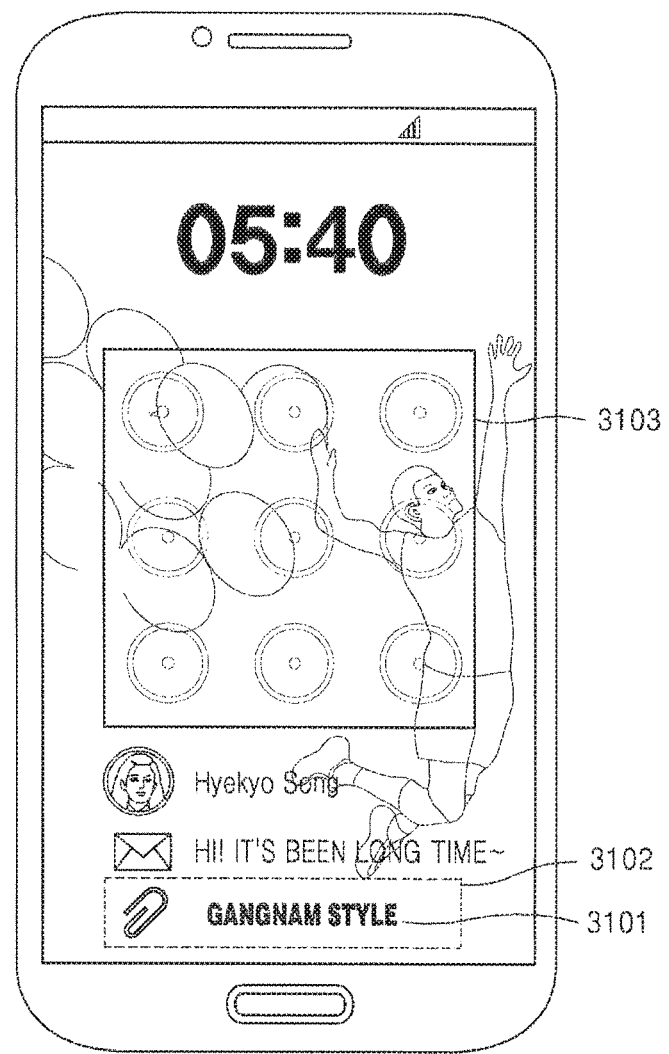
FIG. 31 illustrates a password input screen according to an example embodiment.

FIG. 31 illustrates a password input screen according to an example embodiment.

In the present example embodiment, when content representative information and a first user interface element are displayed on a lock screen, the user terminal device 100 may receive an input signal of requesting provision of content via the first user interface element. In this case, when a password is set in the user terminal device 100, before the user terminal device 100 provides the content, the user terminal device 100 may provide a screen for requesting the password. Here, the password may be a letter and/or a number, or a predetermined pattern, and also, may be biological information such as a fingerprint, an iris, a voice, a blood vessel, or the like. If the password is a pattern, when a user of the user terminal device 100 is authenticated in response to a user input of inputting a pre-decided pattern, the user terminal device 100 may execute a content providing application, and may provide the content via the content providing application.

For example, as shown in FIG. 31, all of content representative information 3101, a first user interface element 3102, and a second user interface element 3103 for receiving an input of the password may be displayed on the lock screen. In this case, when the user of the user terminal device 100 is authenticated according to a password input via the second user interface element 3103, the user terminal device 100 may automatically execute the content providing application, and may provide the content to the user via the content providing application. Here, the second user interface element 3103 for the password input may be provided to the lock screen in such a manner that the second user interface element 3103 does not overlap with the first user interface element 3102 to prevent a user input period overlapping with a user input period of the second user interface element 3103.

Figure 32:
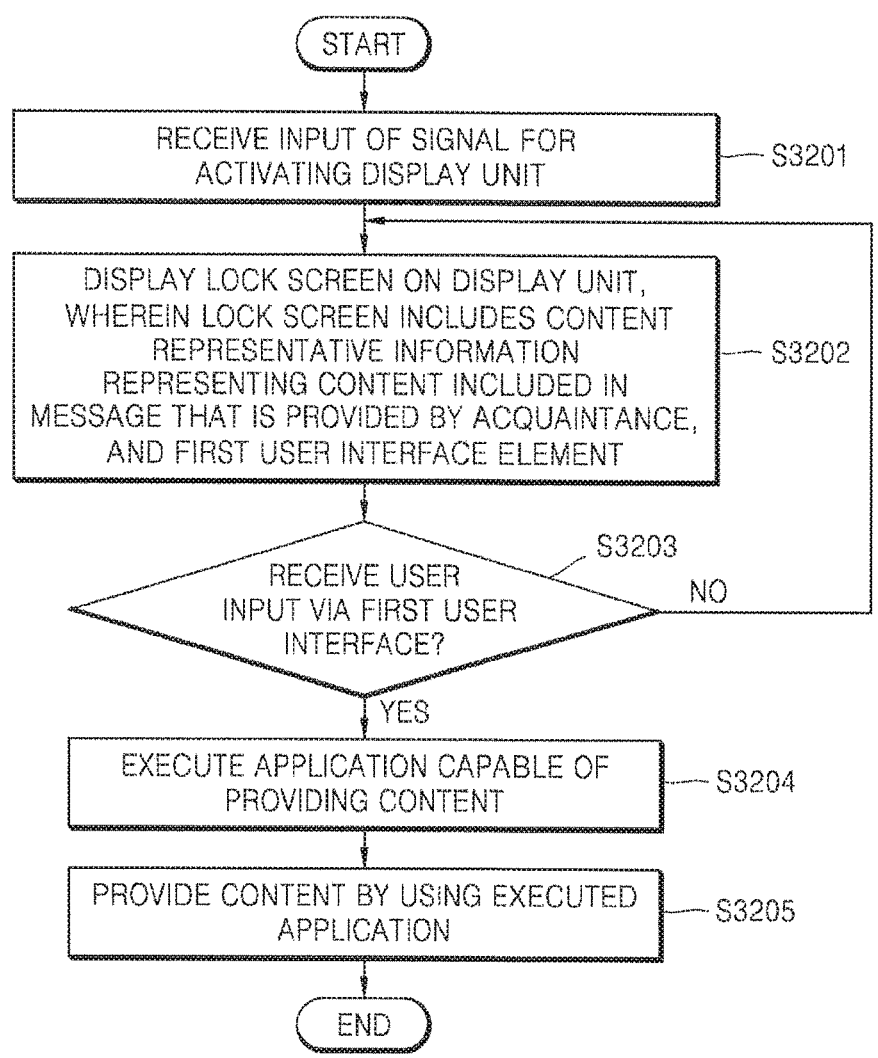
FIG. 32 is a flowchart illustrating a method of displaying content representative information on a lock screen according to another example embodiment.

FIG. 32 is a flowchart illustrating a method of displaying content representative information on a lock screen, according to another example embodiment.

In operation S3201, the second user terminal device 104 may receive an input of a signal for activating the display unit 110.

In response to the signal of activating the display unit 110, as in operation S3202, the second user terminal device 104 may display a lock screen on the display unit 110, and the lock screen may include content representative information representing content included in a message that is provided by an acquaintance, and a first user interface element.

Next, in operation S3203, the second user terminal device 104 may determine whether a user input is received via the first user interface element.

When the user input is received (S3203—Y), as in operation S3204, the second user terminal device 104 may execute an application capable of providing the content. In operation S3205, the second user terminal device 104 may provide the content by using the executed application. For example, if the content is a moving picture, the second user terminal device 104 may display a reproduction screen of the moving picture. Also, if the content is audio, the second user terminal device 104 may reproduce the audio via the speaker unit 160.

Here, the content may be provided while the lock screen is displayed. For example, if the content is the moving picture, the content may be provided in the form of a background of the lock screen or a popup screen while the lock screen is displayed. If the content is the audio, the content may be provided as background music while the lock screen is displayed.

Next, when provision of the content is ended (e.g., reproduction of music or moving picture content is ended) or execution of the application that has been providing the content is ended, the second user terminal device 104 may display again the lock screen. Here, the lock screen may be displayed in such a manner that the content representative information representing the content that was provided to the user via the application is removed from the lock screen. Alternatively, when provision of the content is ended or execution of the application that has been providing the content is ended, the second user terminal device 104 may display a home screen.

The example embodiments may be embodied as hardware, software, or a combination of hardware and software. The software that is erasable or is re-recordable may be embodied as a non-transitory volatile or non-volatile storage device such as a ROM, a memory such as a RAM, a memory chip, or an integrated circuit, or a storage medium such as a CD, a DVD, a magnetic disc or a magnetic tape that is optically or magnetically recordable and simultaneously is readable by a machine (e.g., a computer).

The systems and methods described herein of providing and managing content of a lock screen may be embodied by a computer or a user terminal device including a controller and a memory, and the memory may be a non-transitory machine-readable recording medium enabled to store a program or programs including instructions for implementing the example embodiments. The systems and methods may include a program including codes for implementing a device or a method defined in the following claims, and a non-transitory recording medium that is readable by a machine (e.g., a computer) and stores the program. Also, the program may be electronically delivered via a medium such as a communication signal transmitted via wired or wireless connection. Also, the user terminal device and the server may receive the program from a program providing apparatus connected in a wired or wireless manner, and may store the program. In addition, a user may adjust settings of the user terminal device and the server and thus may selectively use limited operations of the example embodiments only in the user terminal device or extend the operations by inter-operating with another server via a network.

We claim:

1. A method of displaying a lock screen on a user terminal device comprising communication circuitry, a display, a memory, and a processor, the method comprising:
   storing, by the processor, a list including at least one friend user in the memory, wherein the at least one friend user is a friend of a user of the user terminal device;
   receiving, via the communication circuitry, a message, the message including content capable of being reproduced;
   determining whether a user who provided the message is a friend user included in the list;
   if the user who provided the message is a friend user, displaying, under control of the processor, a lock screen on the display while the user terminal device is locked, the lock screen comprising information indicative of the content included in the received message, a first user interface element, and a second user interface element;
   when a user input signal is received via the first user interface element, executing, by the processor, an application for reproducing the content, and displaying reproduced content on the lock screen while the user terminal device is locked; and
   when a user input signal is received via the second user interface element on the lock screen, initiating, by the processor, unlocking of the locked user terminal device.

2. The method of claim 1, wherein the initiating comprises displaying a password input screen for receiving input of a password.

3. A user terminal device comprising:
   a memory;
   communication circuitry configured to receive a message, the message including content capable of being reproduced;
   a display; and
   a processor in communication with the memory, the communication circuitry and the display, the processor being configured to at least:
      control the memory to store a list including at least one friend user, wherein the at least one friend user is a friend of a user of the user terminal device;
      determine whether a user who provided the message is a friend user included in the list;
      if the user who provided the message is the friend user, control the display to display a lock screen while the user terminal device is locked, the lock screen comprising information indicative of the content in the received message, a first user interface element and a second user interface element;

when a user input signal is received via the first user interface element on the lock screen, execute an application for reproducing the content, and control the display to display the reproduced content on the lock screen while the user terminal device is locked; and when a user input signal is received via the second user interface element on the lock screen, initiate unlocking of the locked user terminal device.

4. The user terminal device of claim 3, wherein the initiating comprises displaying a password input screen for receiving input of a password.

5. A non-transitory computer readable recording medium for storing a program for displaying a lock screen on a user terminal device comprising communication circuitry, a display, a memory, and a processor, the program, when executed by the processor, controlling the user terminal device to perform operations comprising:

storing a list including at least one friend user in the memory, wherein the at least one friend user is a friend of a user of the user terminal device;

receiving, via the communication circuitry, a message, the message including content capable of being reproduced;

determining whether a user who provided the message is a friend user included in the list;

if the user who provided the message is a friend user, displaying a lock screen on the display while the user terminal device is locked, the lock screen comprising information indicative of the content included in the received message, a first user interface element and a second user interface element;

when a user input signal is received via the first user interface element, executing an application for reproducing the content, and displaying reproduced content on the lock screen while the user terminal device is locked; and when a user input signal is received via the second user interface element on the lock screen, initiating unlocking of the locked user terminal device.

6. The method of claim 1, wherein the list comprises at least one of a contact list and a social friend list of the user of the user terminal device.

7. The user terminal device of claim 3, wherein the list comprises at least one of a contact list and a social friend list of the user of the user terminal device.

\* \* \* \* \*